Oct. 13, 1925. 1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920     21 Sheets-Sheet 7
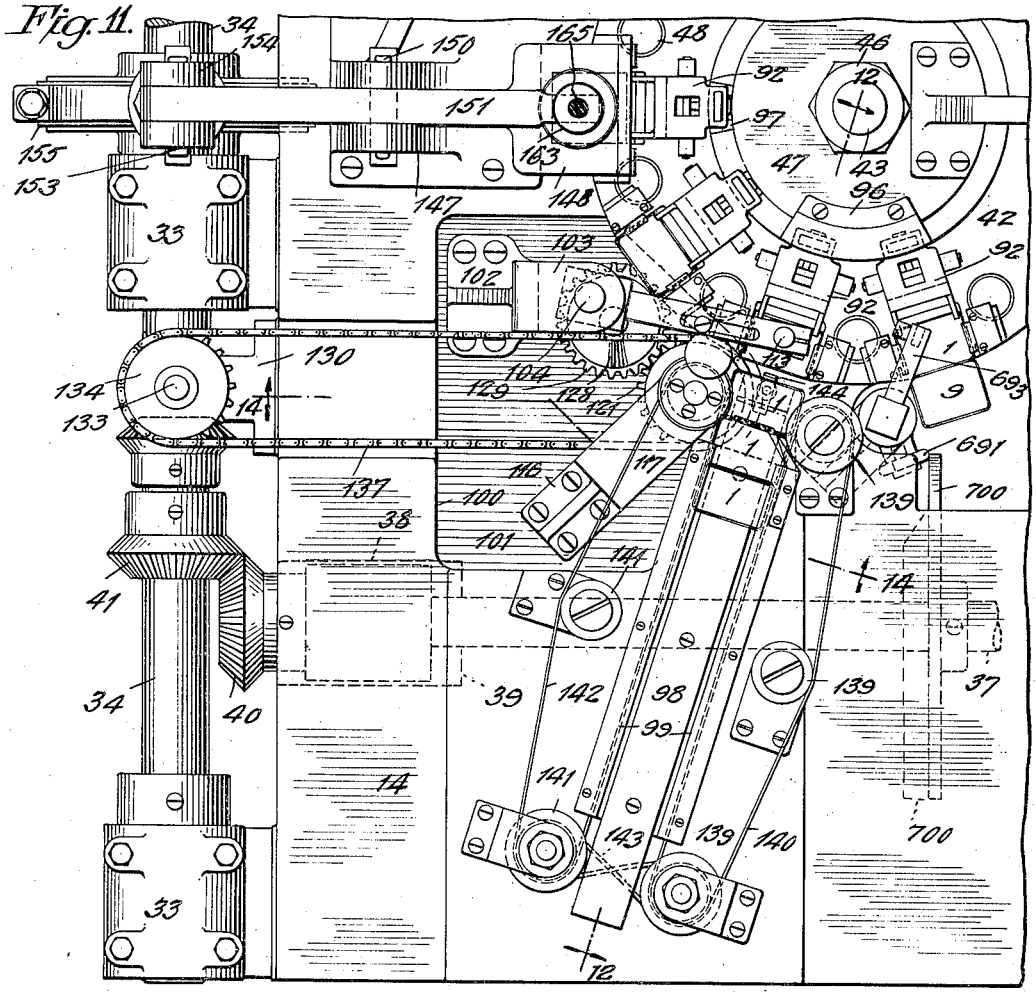
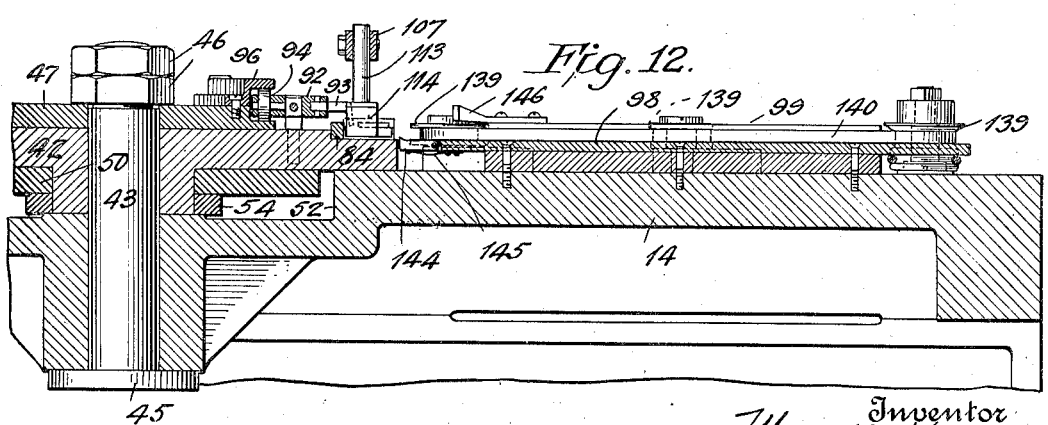
Inventor
Marcelle Kugel
By his Attorneys
Townsend & Decker Oct. 13, 1925. 1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920     21 Sheets-Sheet 8
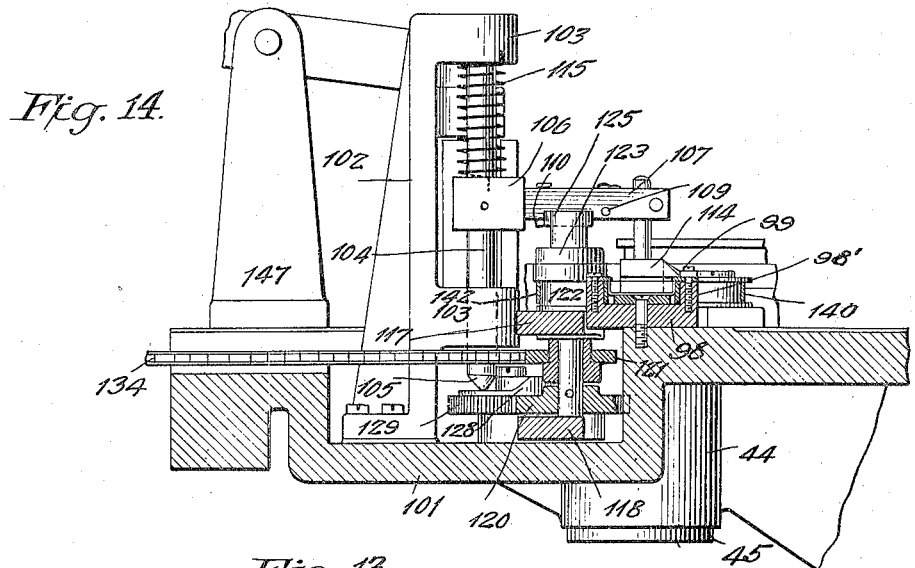
Fig. 14.
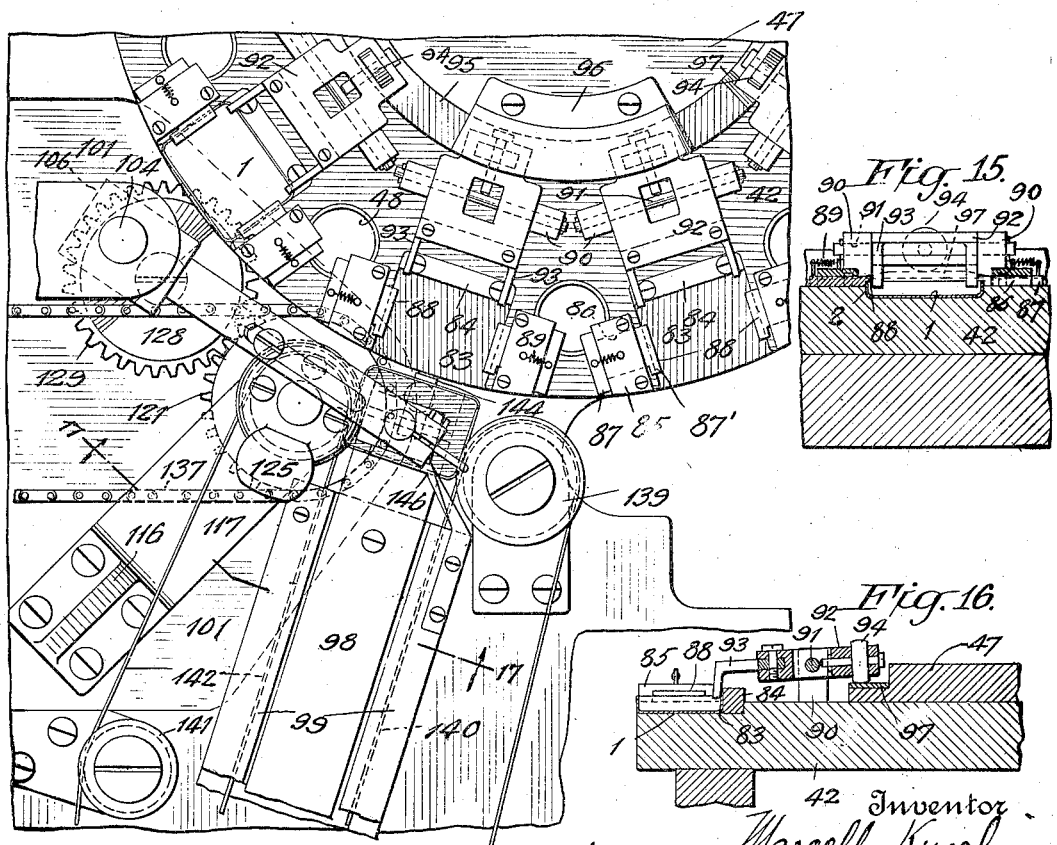
Fig. 13.
Fig. 15.
Fig. 16.
Inventor
Marcelle Kugel
By his Attorneys
Townsend + Decker Oct. 13, 1925.                                                                    1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920                    21 Sheets-Sheet 9
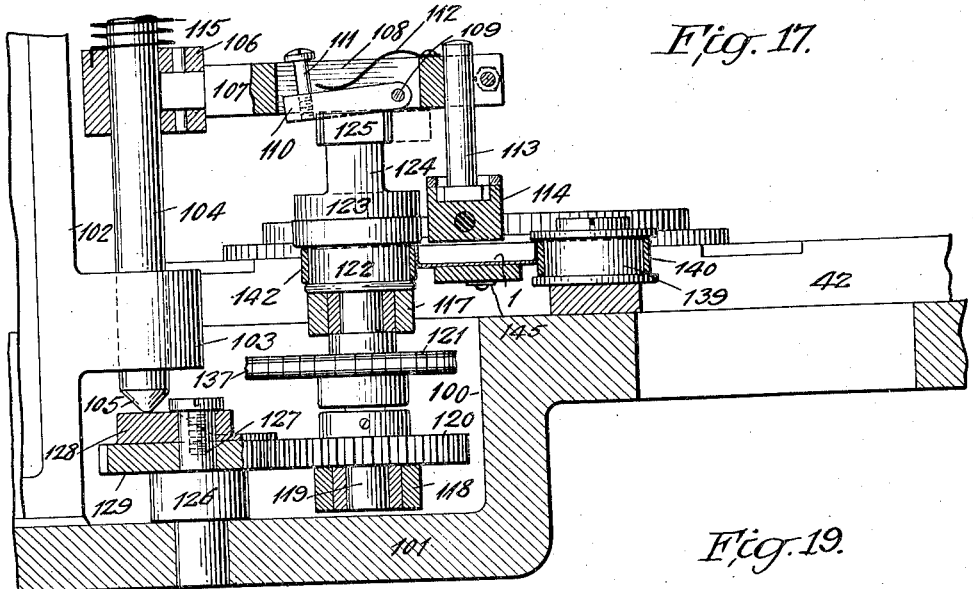
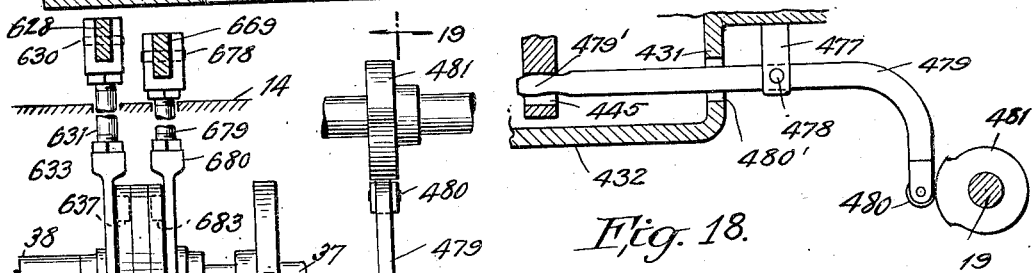
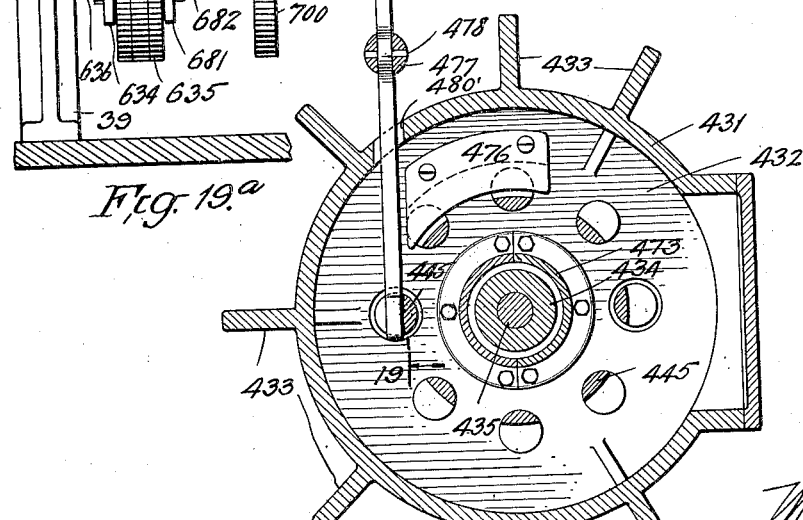

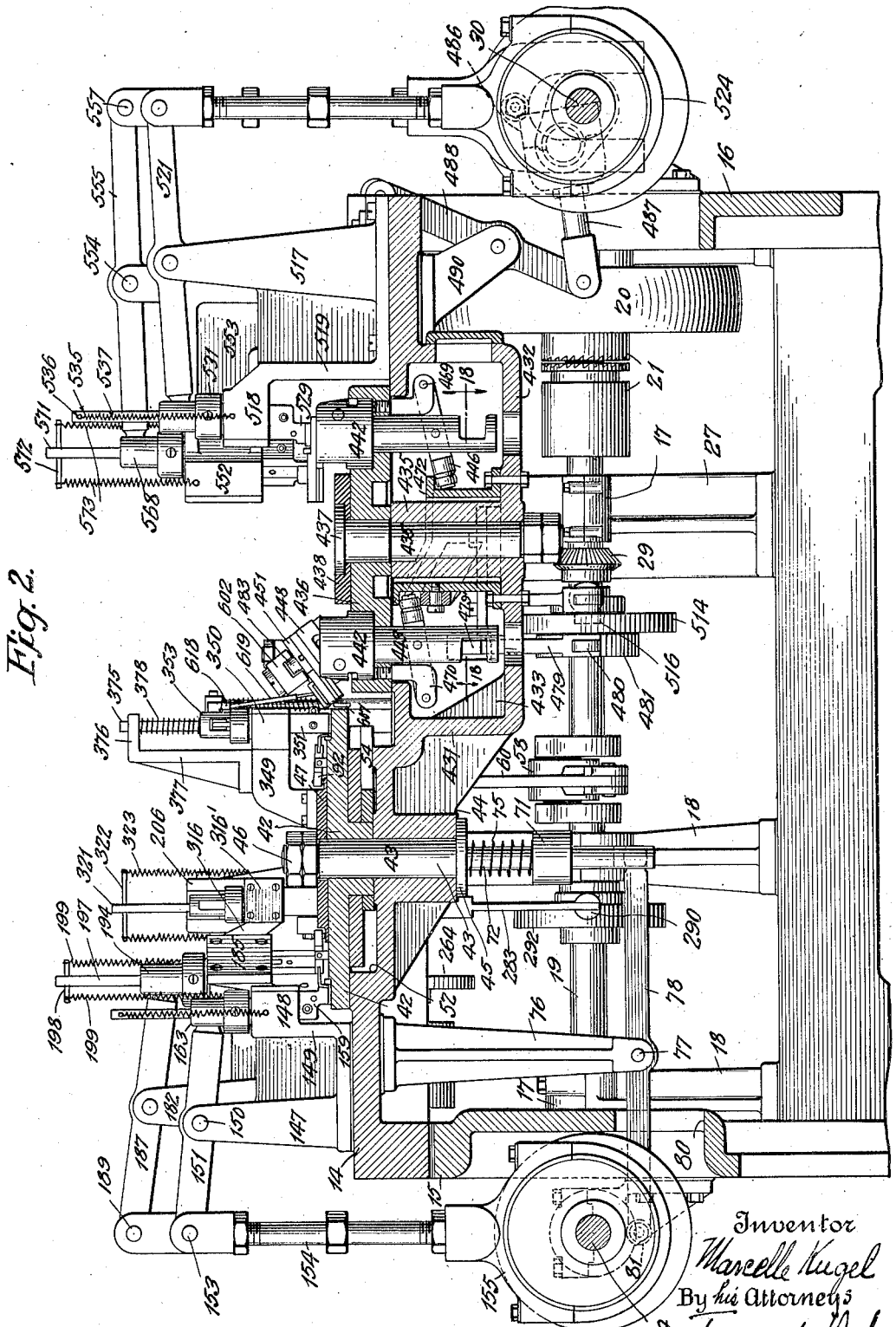

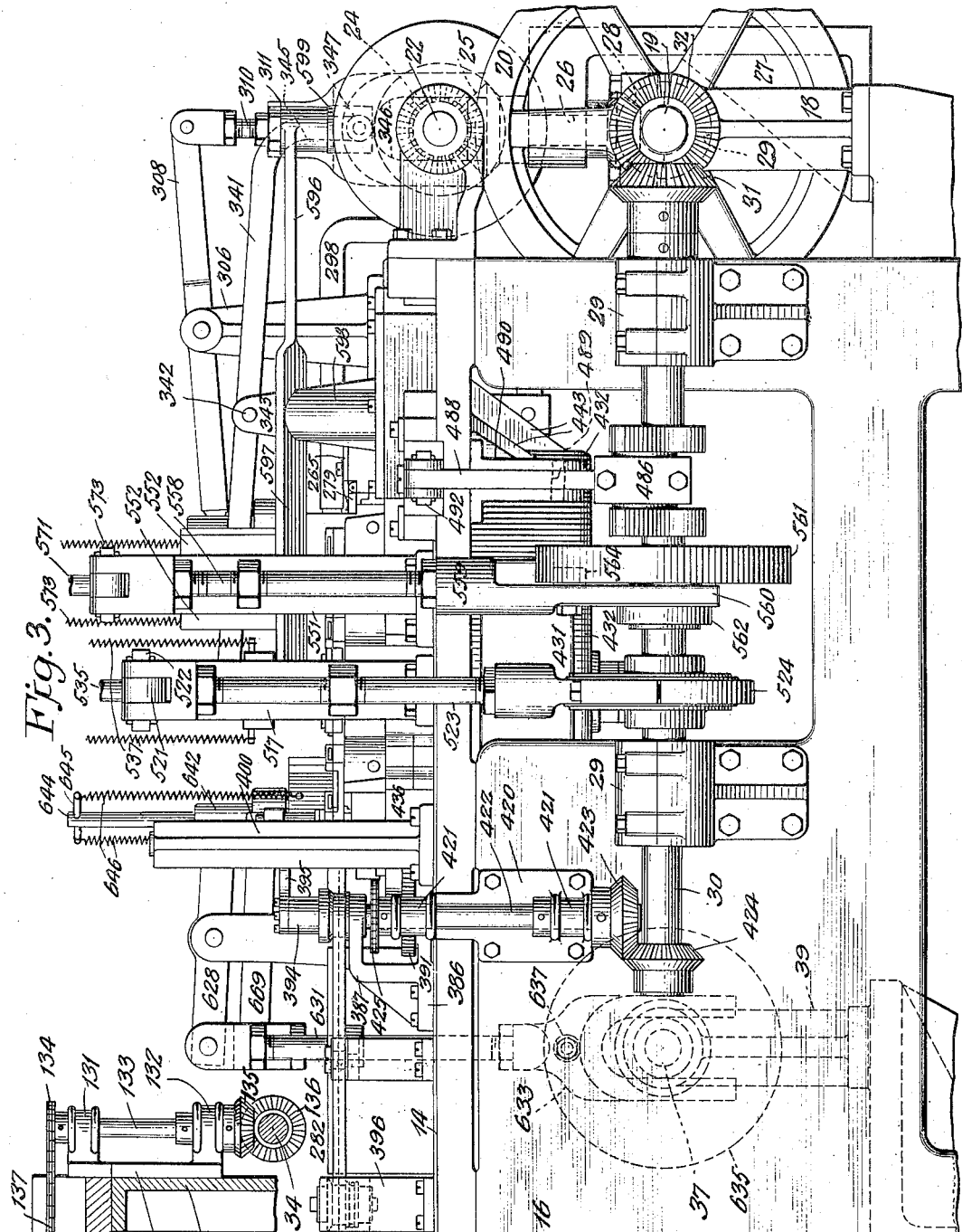

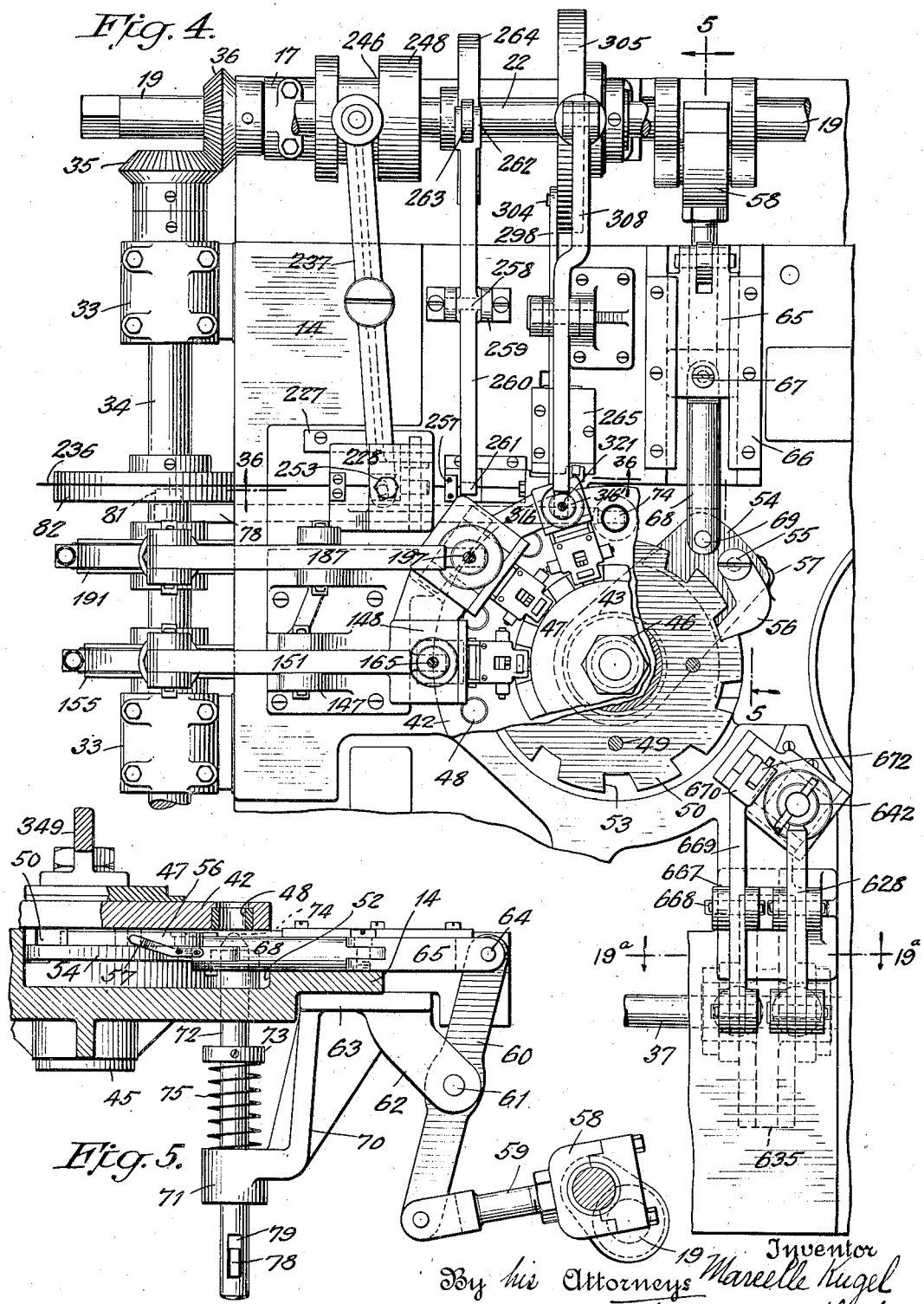

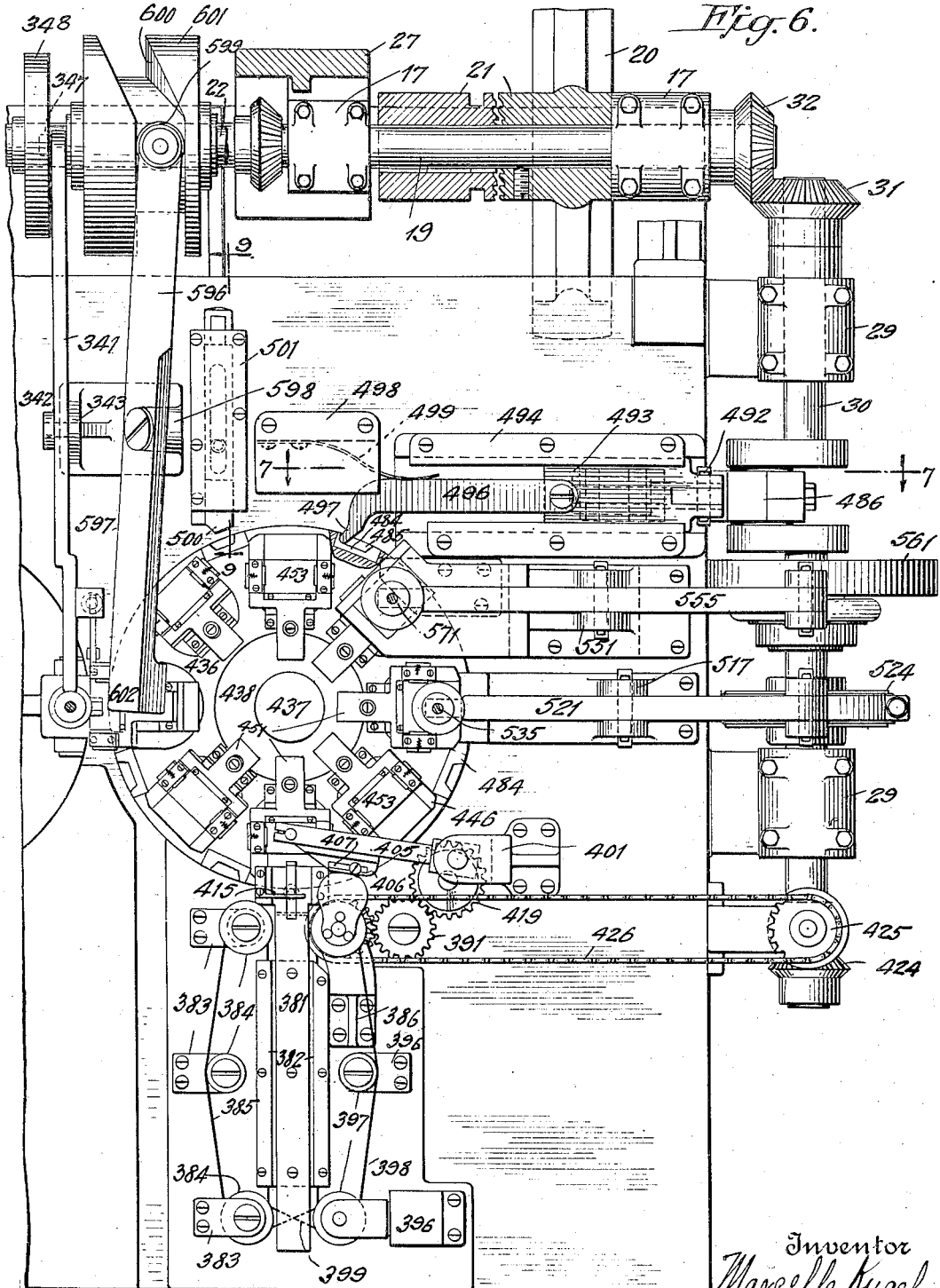

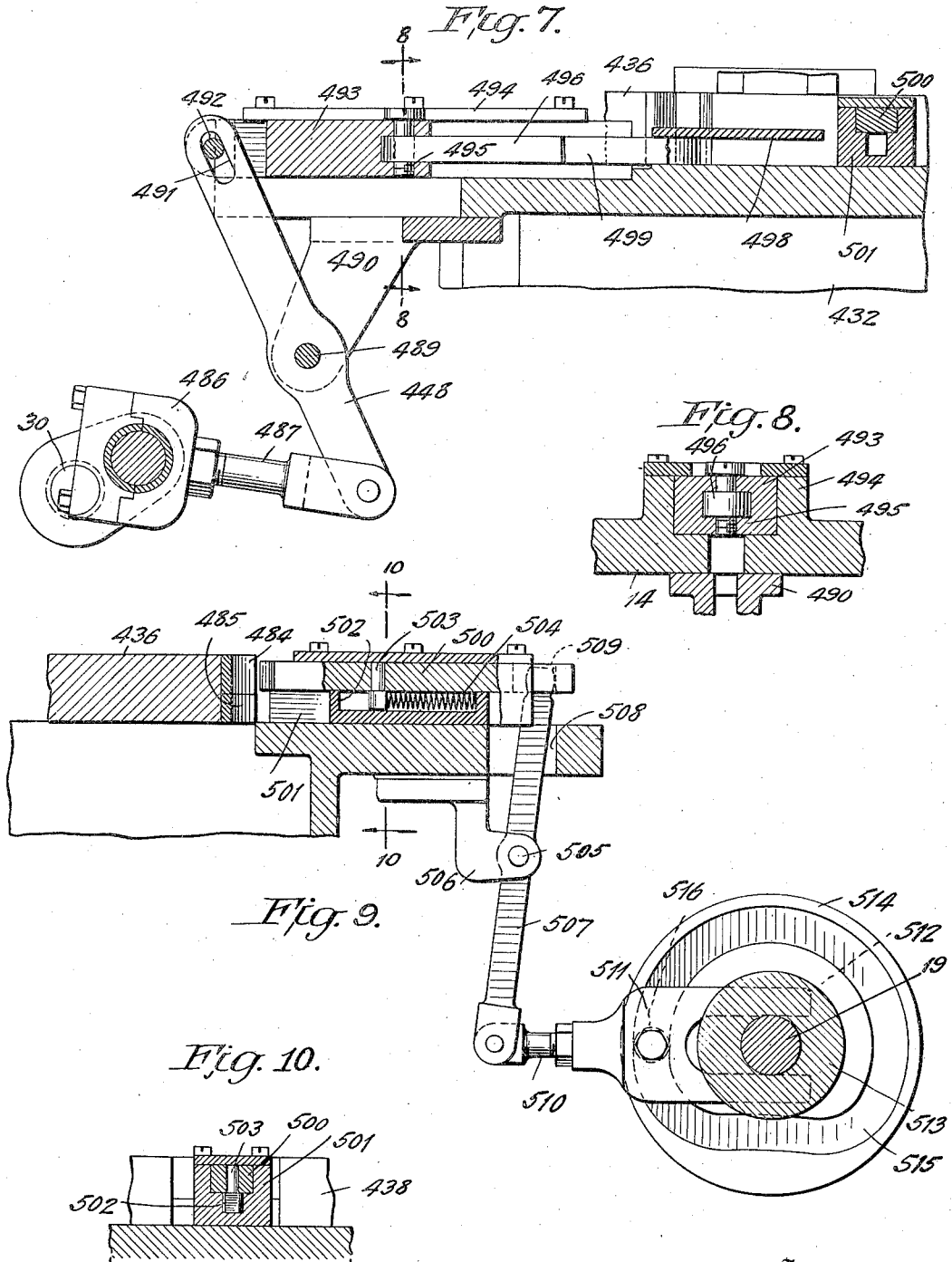

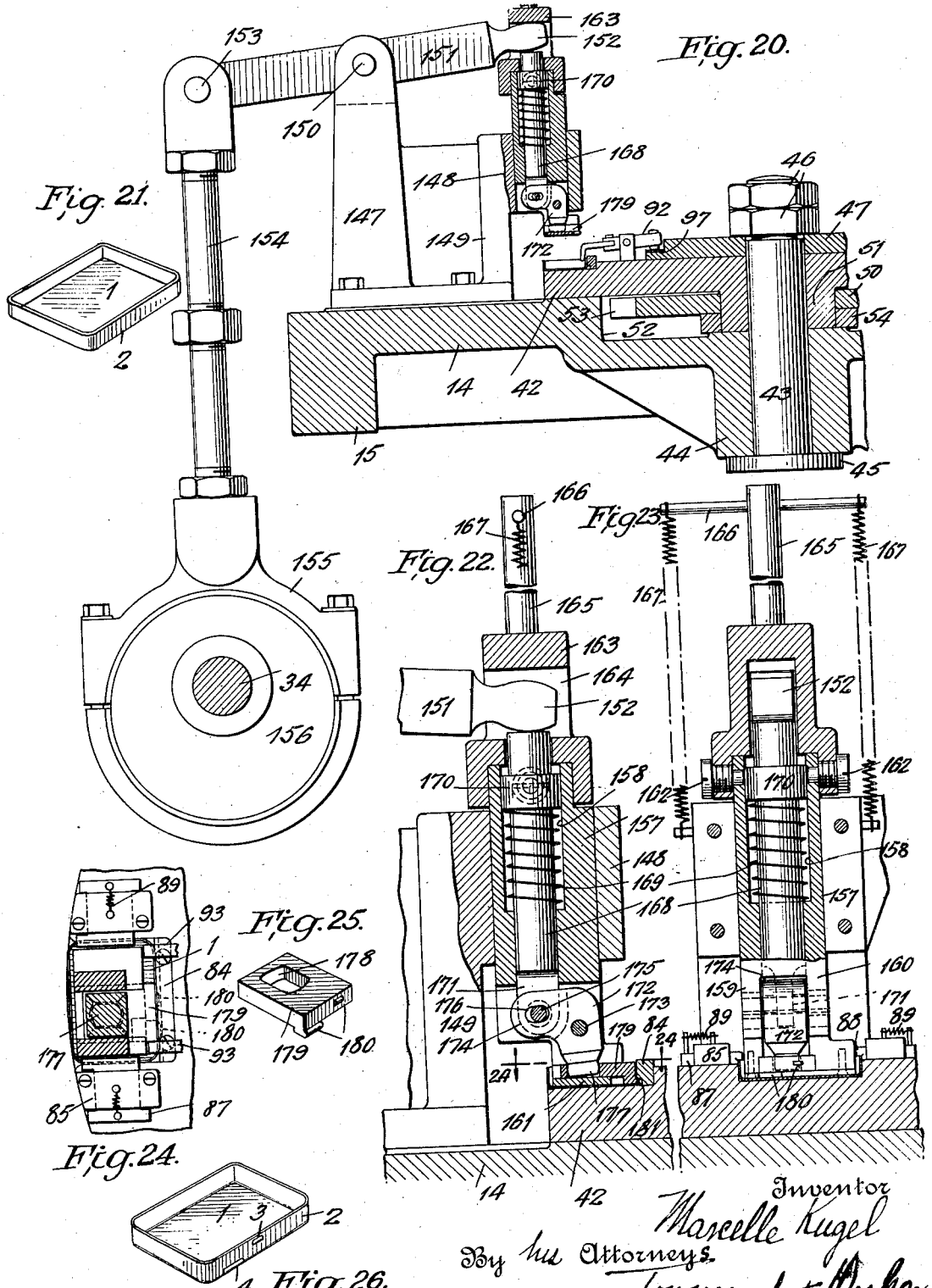

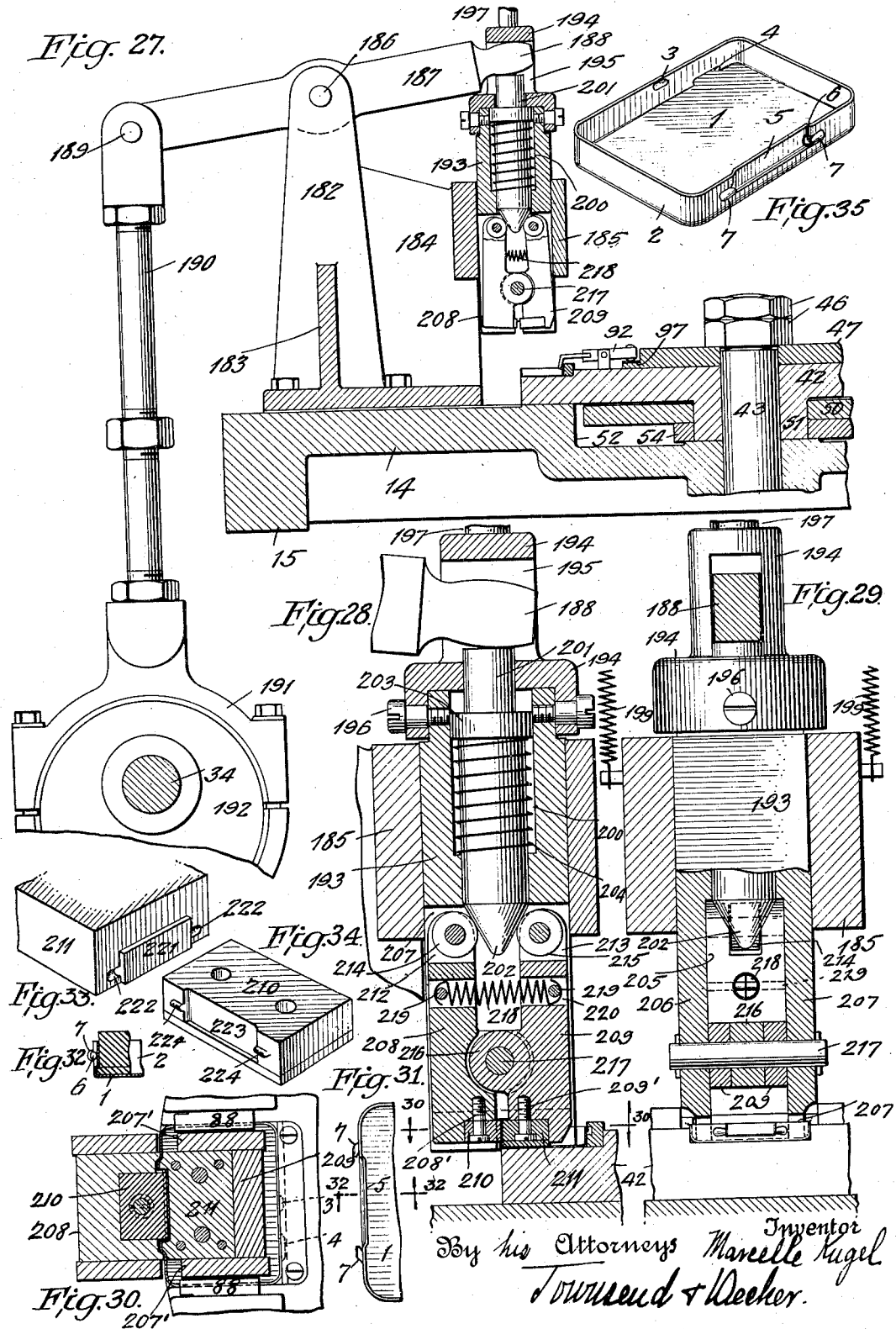

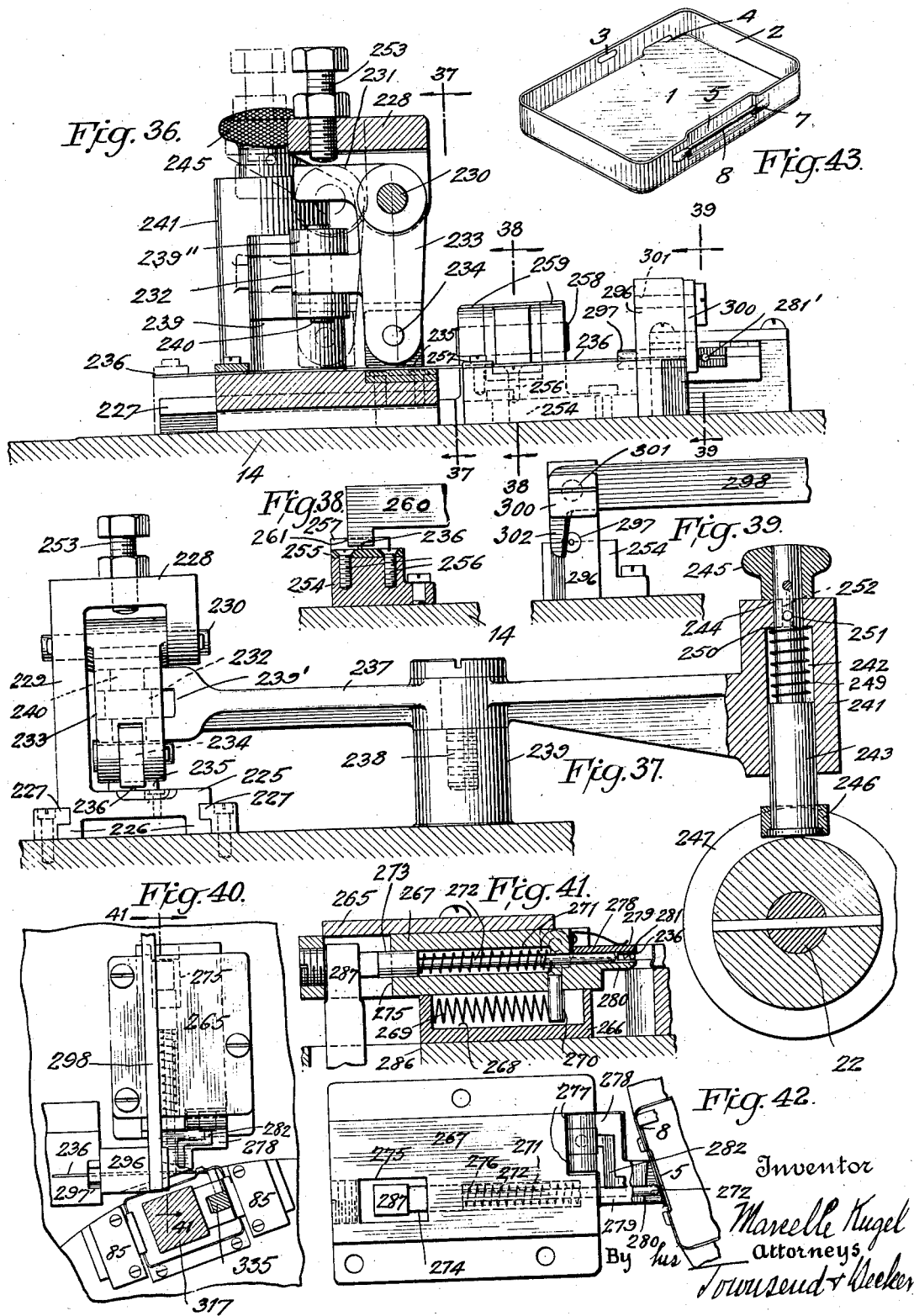

Oct. 13, 1925.  1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920  21 Sheets-Sheet 13
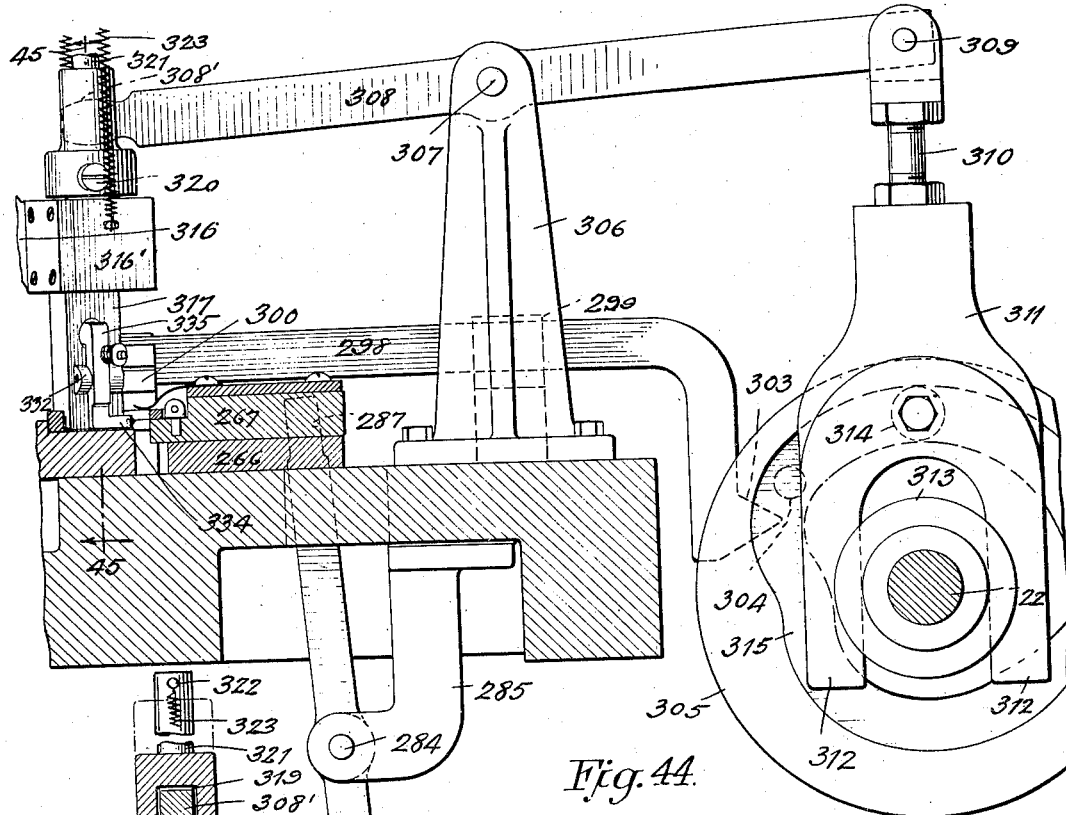
Fig. 44.
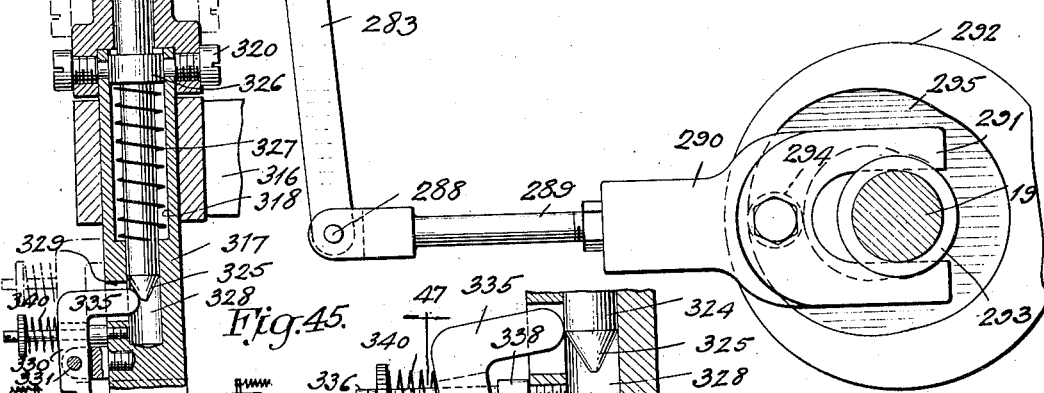
Fig. 45.  Fig. 46.
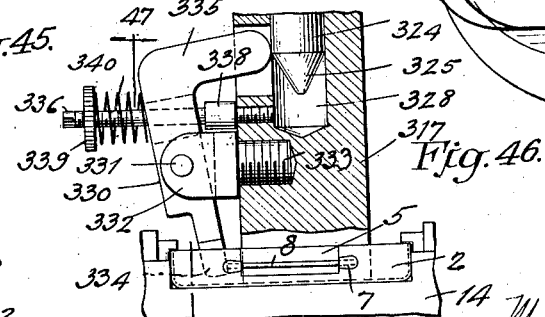
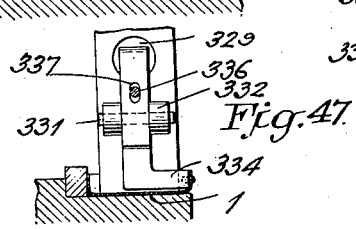
Fig. 47.
Inventor
Marcelle Kugel
By his Attorneys
Townsend + Decker.

Oct. 13, 1925. 1,557,539

M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920  21 Sheets-Sheet 14

Inventor
Marcelle Kugel
By his Attorneys
Townsend & Decker

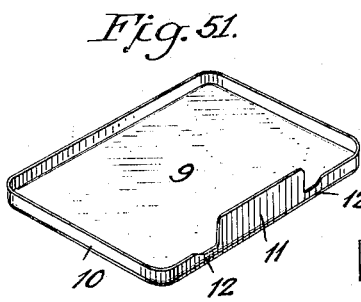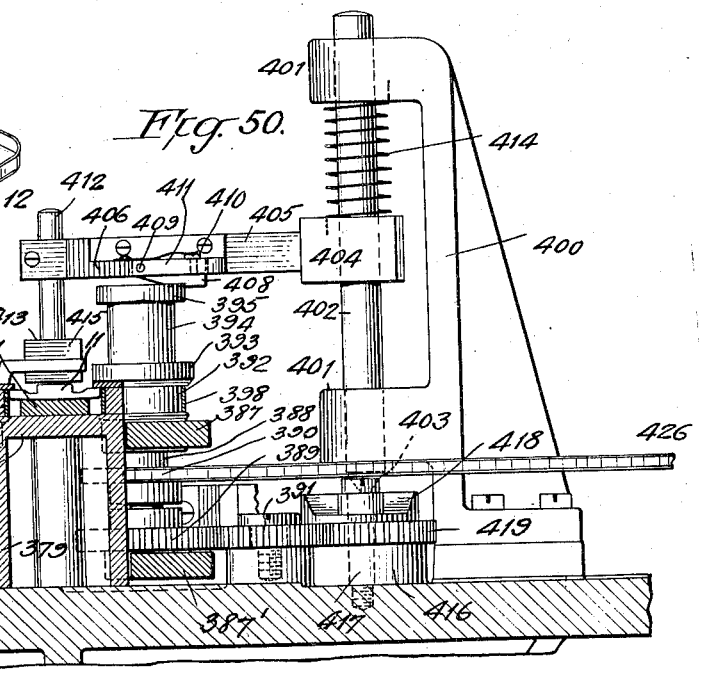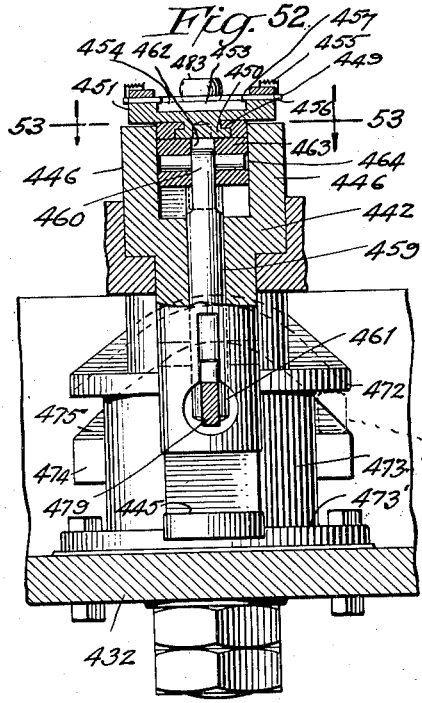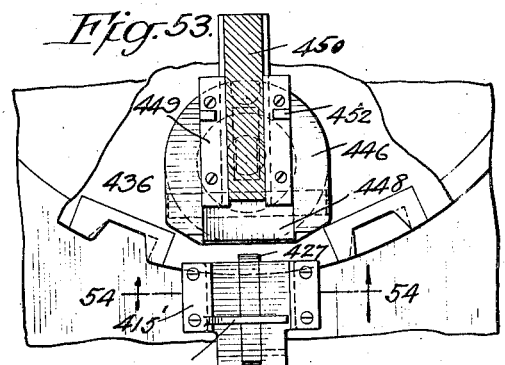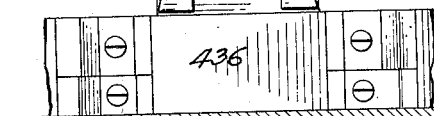

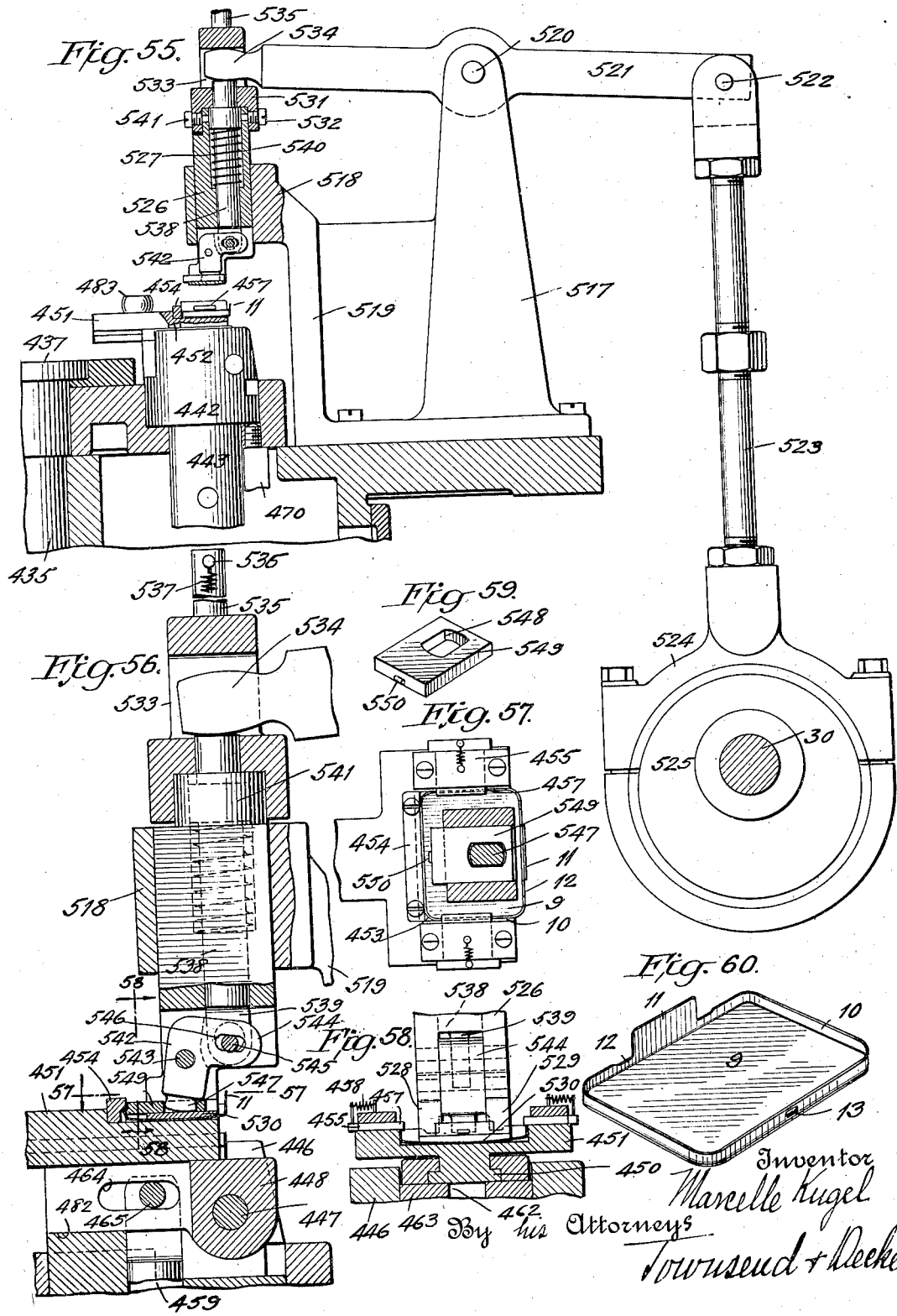

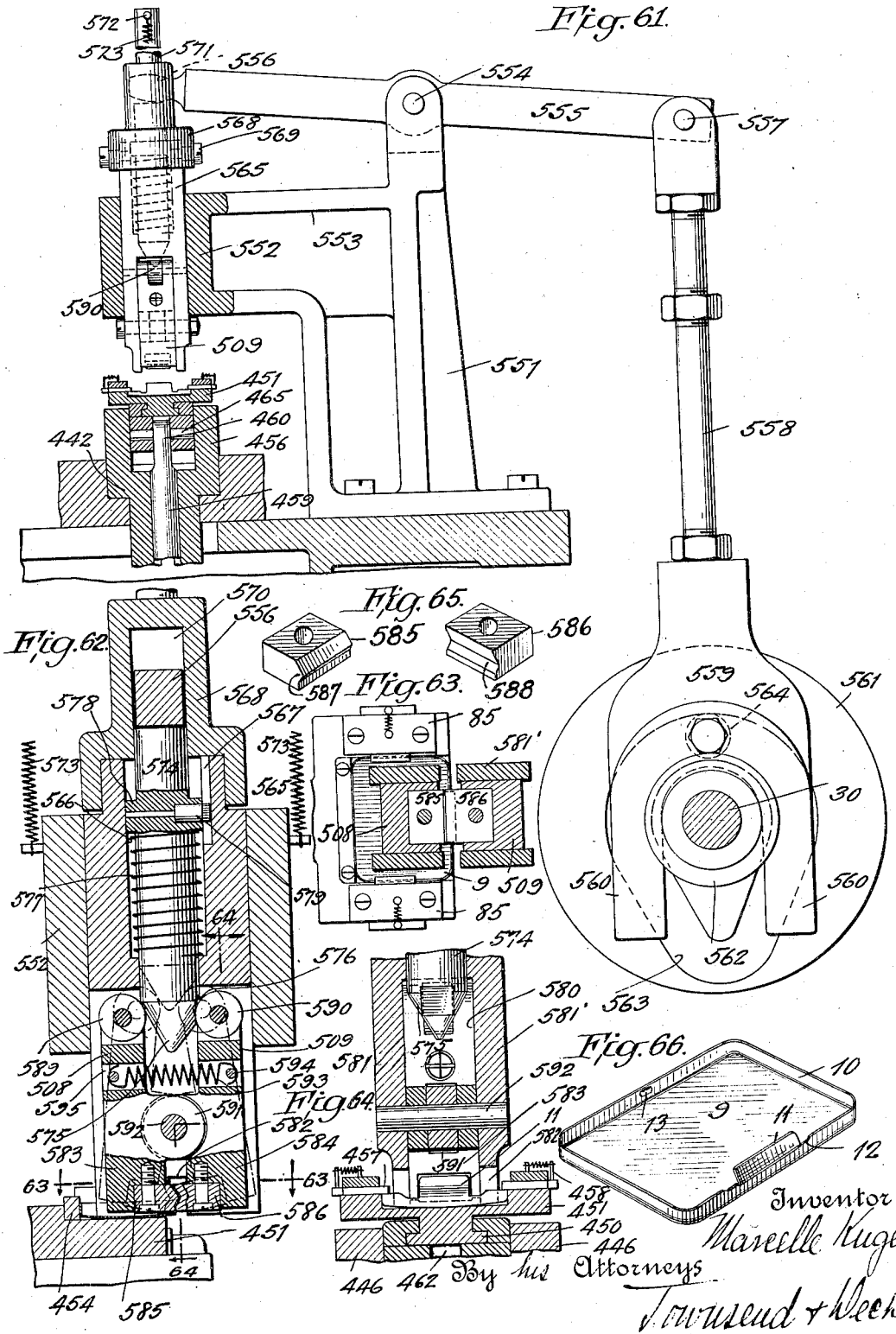

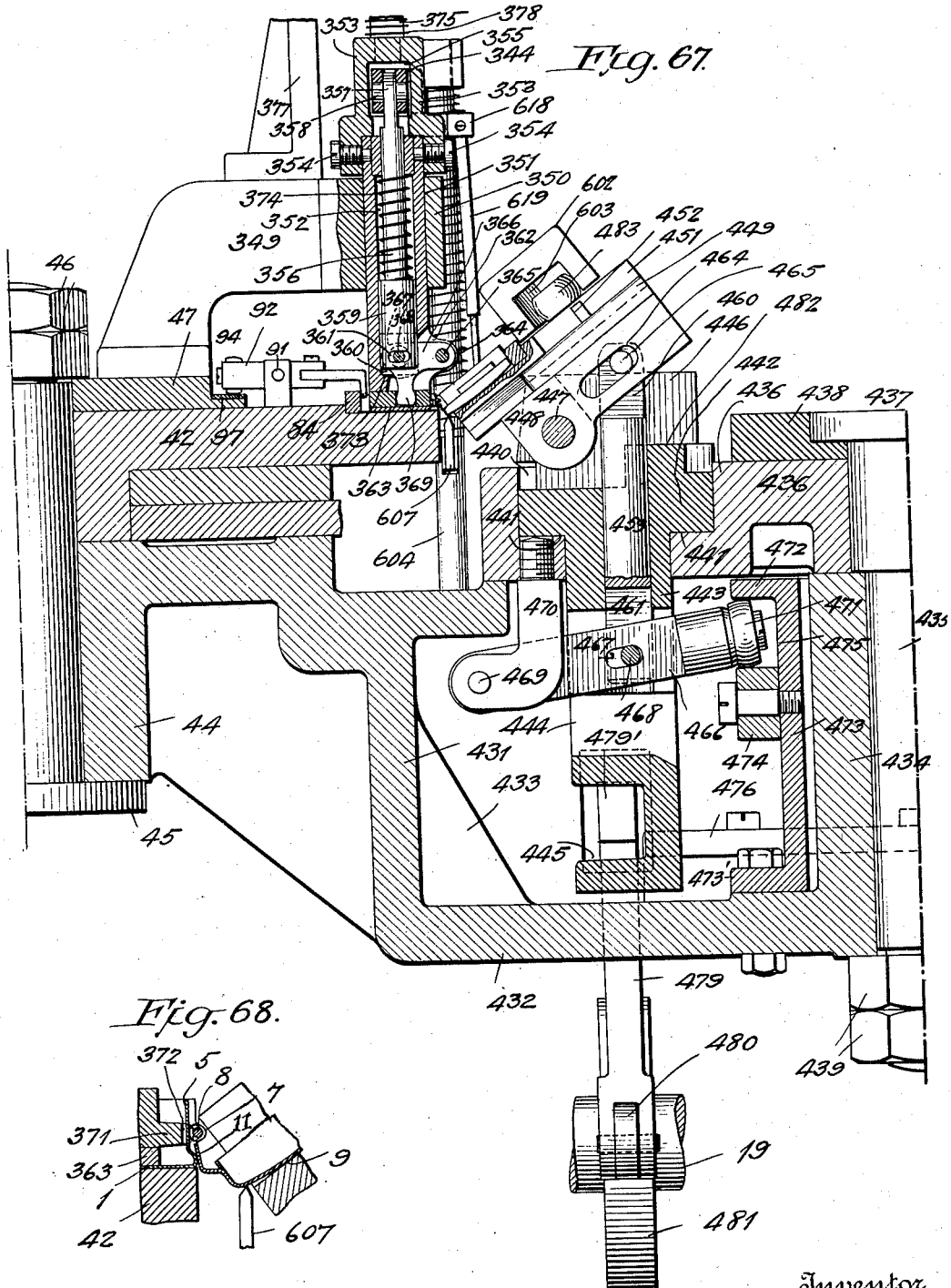

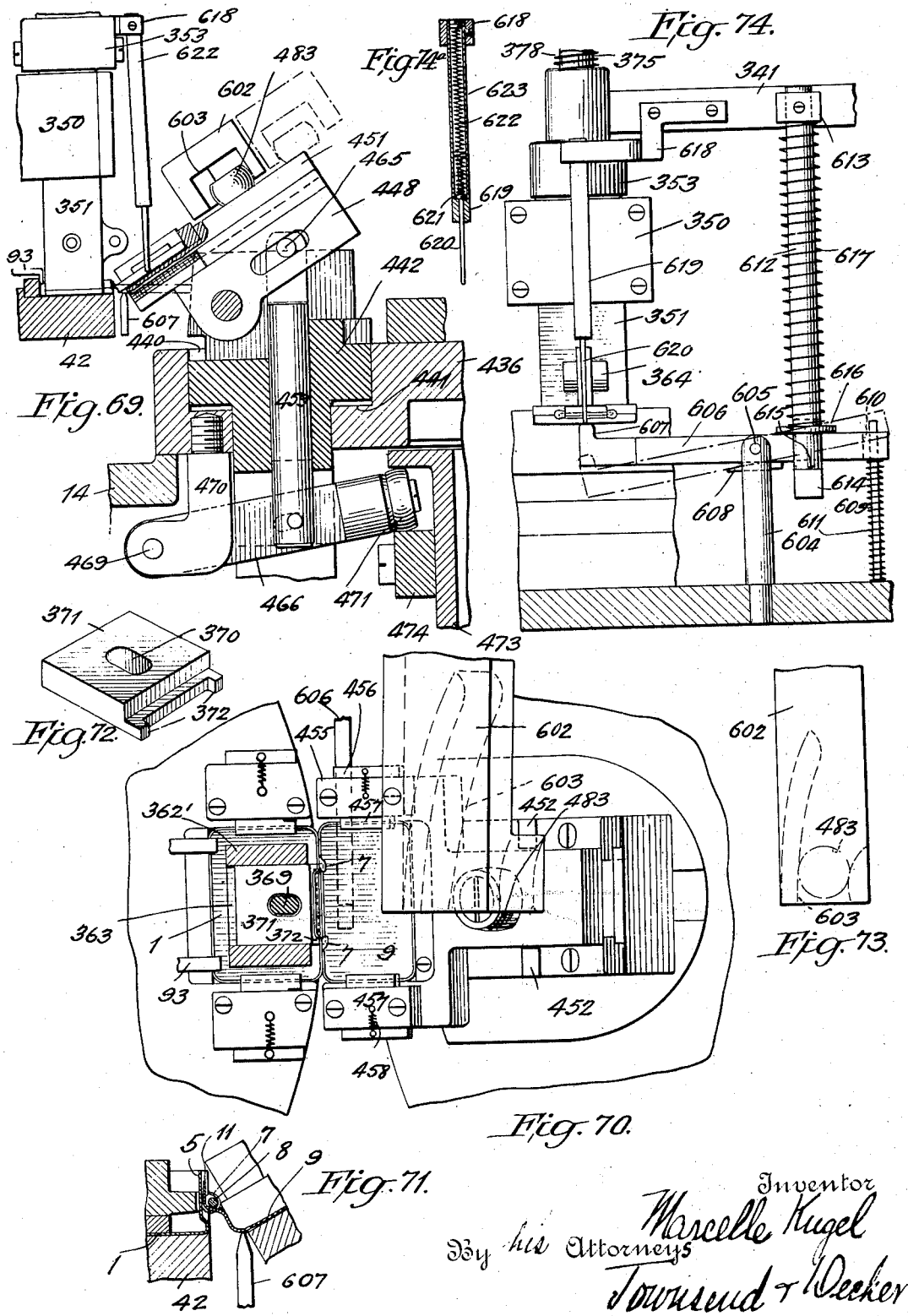

Oct. 13, 1925. 1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920 21 Sheets-Sheet 20
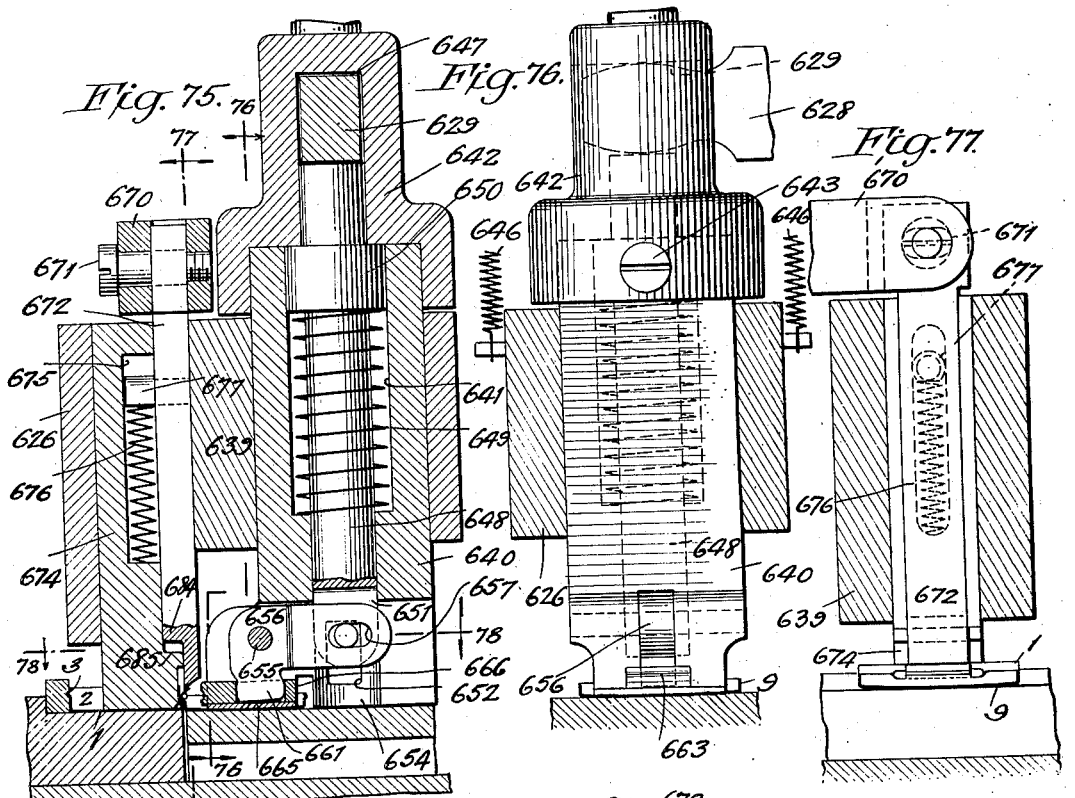

Oct. 13, 1925. 1,557,539
M. KUGEL, NOW BY JUDICIAL CHANGE OF NAME C. K. MARCELL
MACHINE FOR AUTOMATICALLY HINGING THE BODIES AND COVERS OF RECEPTACLES
Filed Sept. 3, 1920 21 Sheets-Sheet 21
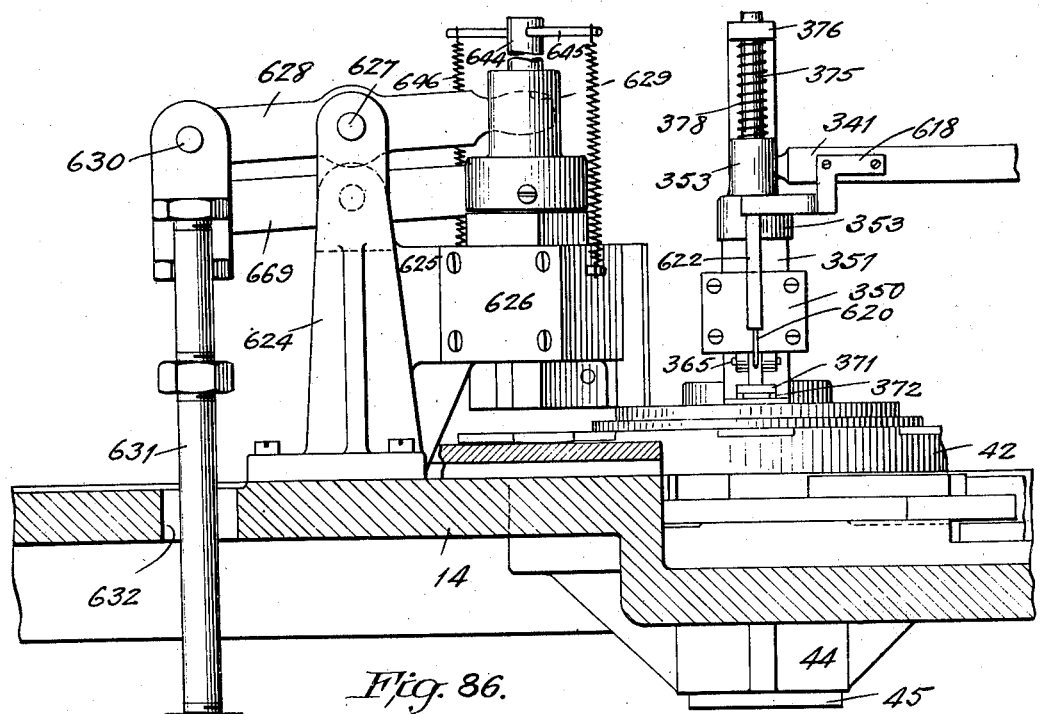
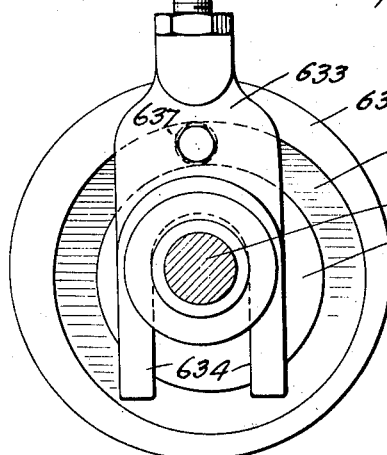
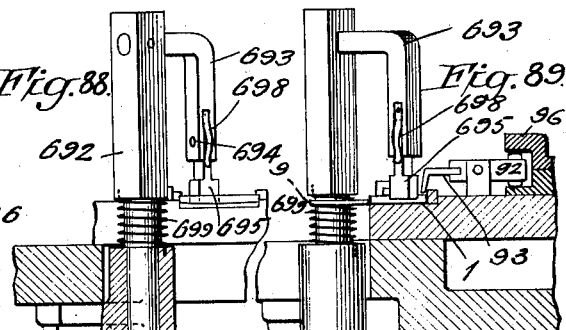
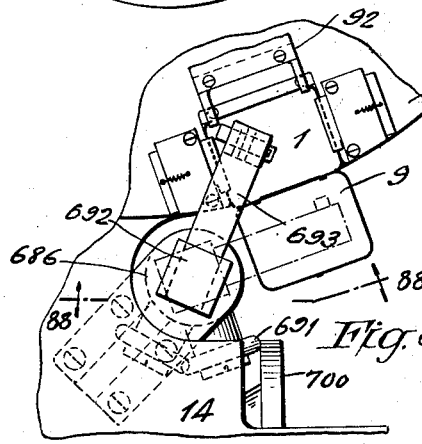
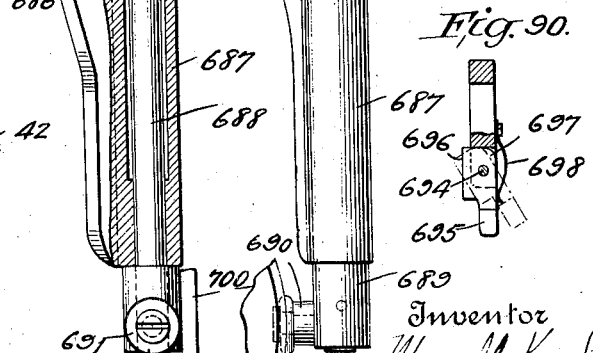

Patented Oct. 13, 1925.

1,557,539

UNITED STATES PATENT OFFICE.

MARCELLE KUGEL, NOW BY JUDICIAL CHANGE OF NAME CARROLL K. MARCELL, OF BROOKLYN, NEW YORK, ASSIGNOR TO METAL PACKAGE CORPORATION OF NEW YORK, OF BROOKLYN, NEW YORK, A CORPORATION OF NEW YORK.

MACHINE FOR AUTOMATICALLY HINGING THE BODIES AND COVERS OF RECEPTACLES.

Application filed September 3, 1920. Serial No. 407,920.

*To all whom it may concern:*

Be it known that I, MARCELLE KUGEL, by judicial decree CARROLL K. MARCELL, a citizen of the Republic of Czechoslovakia, and a resident of Brooklyn, in the county of Kings and State of New York, have invented certain new and useful Improvements in Machines for Automatically Hinging the Bodies and Covers of Receptacles, of which the following is a specification.

My invention has for its principal object the production of a machine of novel construction by means of which two box members having one or more flat sides and comprising the body and cover of the box may be expeditiously and automatically hingedly joined together.

My improved machine is particularly and peculiarly adapted for hingedly joining together the bodies and covers of small pill or medicine boxes which may be conveniently carried in the pocket, such for instance as aspirin tablet boxes. Boxes of this character, as is well known, have their body and cover members provided with continuous upstanding walls or sides engaging and interfitting with each other when the box is closed.

Generally speaking, my invention contemplates among other features the provision of a suitable carrier for the body members of the box as well as a suitable carrier for the cover members, both of which carriers are preferably movable although the invention is not so limited, novel means for feeding the body members and cover members each to their particular carrier, means for providing the members with tits adapted to engage each other to form a clasp for the box, means for providing the body members with an opening-lug to facilitate the opening of the box, means for providing the body members with pintle-bearings or other pintle-holding means and the forming and inserting of the pintle in the pintle-holding means, means for turning the flange with which the cover members are provided at the proper angles whereby the hinging of the two members may be effected, the hinging of the members by inserting the turned flange on the cover behind the pintle held by the body and the bending over and closing or curling of said turned flange around the pintle and the ejecting of the box from the machine after the members thereof have been hinged together.

My invention as herein illustrated and described also embodies various other meritorious and novel devices and parts by means of which the several steps just enumerated may be effected with facility and expedition so that the box members are accurately and automatically operated on and hinged together in the manner to be presently described in detail. Said additional devices and parts comprise, among others, means for feeding, clamping and cutting the wire from which the pintle for each box is formed, means for inserting the pintle in the pintle-holding means in the box body, means for positively and intermittently driving the body member carrier and cover member carrier which, in the preferred form of the invention, comprise discs rotating in opposite directions whereby the body and cover are brought into juxtaposition for the joining operation, means for backing and holding the pintle away from engagement with the rear wall of the box-body during the hinging operation, means for positively locking each carrier disc after it has been driven or rotated a predetermined distance, means for momentarily supporting the cover member of the box prior to, during and immediately after the connecting or partial hinging of the cover thereto and means to press the cover member downwardly to insure the proper connecting together of the body and the cover while the cover is thus supported.

Still other and further objects and advantages of the invention will appear from the accompanying description, the invention consisting in the novel parts and combinations of parts hereinafter more particularly described and then specified in the claims.

In the accompanying drawings:

Fig. 2 is a horizontal section on the line 2—2 of Fig. 1.

Fig. 3 is a side elevation of the machine looking from the right-hand or box-cover side thereof.

Figure 1:
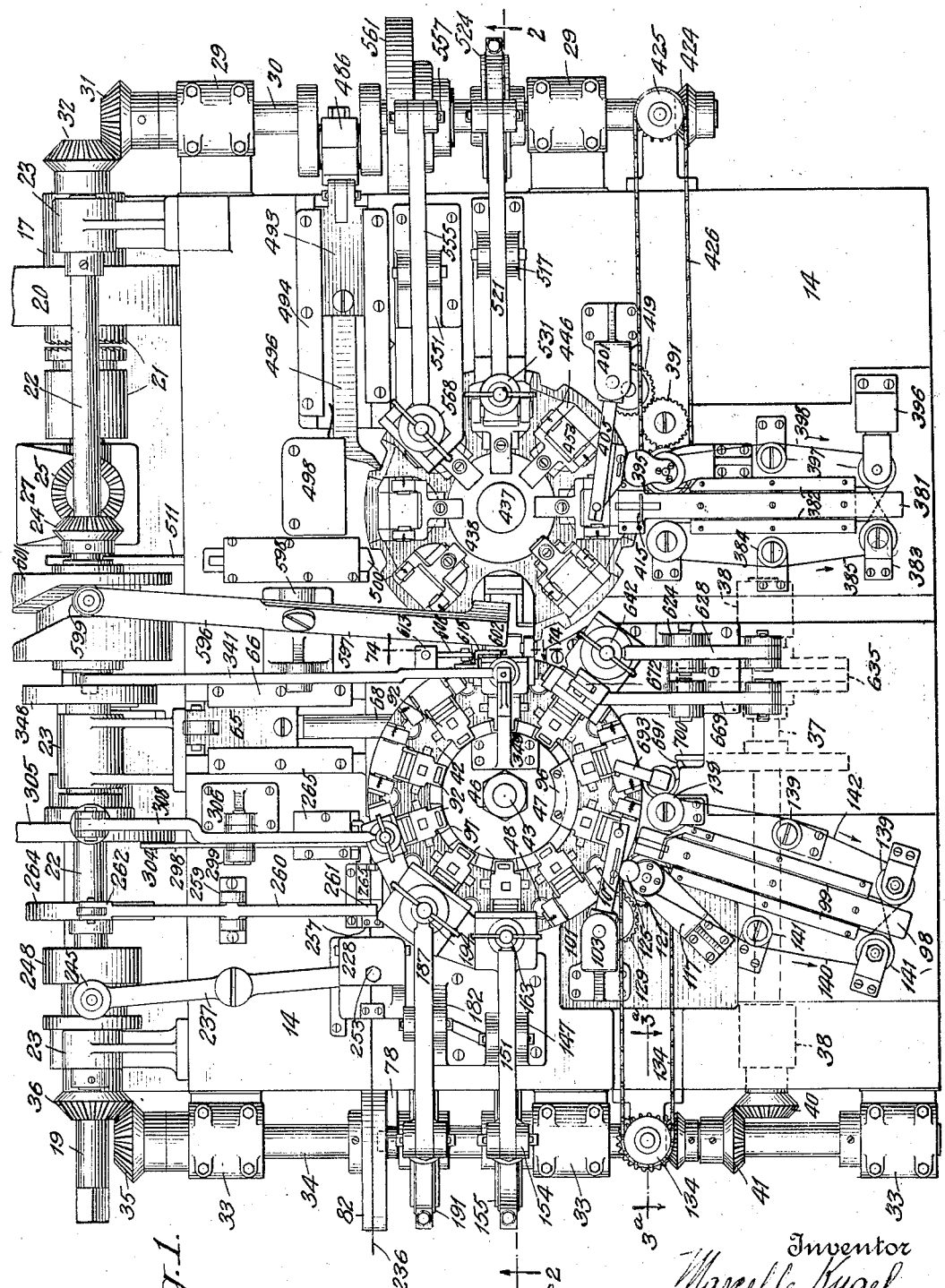
Fig. 1 is a plan view of my improved machine.

Fig. 3ᵃ is a horizontal section on the line 3ᵃ—3ᵃ of Fig. 1.

Fig. 4 is an enlarged plan view of a portion of the left-hand or box-body side of the machine.

Fig. 5 is a vertical cross-section on the line 5—5 of Fig. 4 showing the box-body disc driving and locking mechanism.

Fig. 6 is an enlarged plan view of the right-hand or box-cover side of the machine.

Fig. 7 is a horizontal section on the line 7—7 of Fig. 6 showing the box-cover disc driving mechanism.

Fig. 8 is a vertical cross-section on the line 8—8 of Fig. 7 showing a detail of said mechanism.

Fig. 9 is a vertical cross-section on the line 9—9 of Fig. 6 showing the box-cover disc locking mechanism.

Fig. 10 is a vertical cross-section on the line 10—10 of Fig. 9 showing a detail of said mechanism.

Fig. 11 is an enlarged plan view of a portion of the left-hand or box-body side of the machine showing the feeding mechanism for the box-bodies.

Fig. 12 is a vertical cross-section on the line 12—12 of Fig. 11.

Fig. 13 is an enlarged plan view of a portion of the box-body side of the machine showing the feeding mechanism in a different position from that shown in Fig. 11.

Fig. 14 is an enlarged horizontal section on the line 14—14 of Fig. 11 showing a portion of the feeding mechanism for the box-bodies.

Fig. 15 is a front elevation of one of the box-body grippers.

Fig. 16 is a horizontal section taken through the box-body grippers.

Fig. 17 is a horizontal section (enlarged) on the line 17—17 of Fig. 13.

Fig. 18 is a horizontal section on the line 18—18 of Fig. 2 showing the means for raising the box-cover holding device so that the hinging operation may be performed.

Fig. 19 is a vertical cross-section on the line 19—19 of Fig. 18.

Fig. 19ª is a horizontal section on the line 19ª—19ª of Fig. 4.

Fig. 20 is a horizontal section through the mechanism for performing the first operation on the box-bodies showing the same in inoperative position.

Fig. 21 is a perspective view of one of the box-bodies.

Fig. 22 is an enlarged view of a portion of the apparatus shown in Fig. 20 in operative position.

Fig. 23 is a side elevation (partly in section) of the parts shown in Fig. 22.

Fig. 24 is a horizontal section on the line 24—24 of Fig. 22.

Fig. 25 is a perspective view of the particular form of die employed for performing the first operation on the box-bodies.

Fig. 26 is a perspective view of one of the box-bodies after the first operation has been performed thereon.

Fig. 27 is a horizontal section taken through the mechanism for performing the second operation on the box-bodies, that is, the forming of the pintle-ears or bearings and showing the same in inoperative position.

Fig. 28 is an enlarged view of a portion of the mechanism shown in Fig. 27 in operative position.

Fig. 29 is a side elevation (partly in section) of the parts shown in Fig. 28.

Fig. 30 is a horizontal section on the line 30—30 of Fig. 28.

Fig. 31 is a fragmentary plan view of the rear part of the box-body after completion of the second operation thereon.

Fig. 32 is a horizontal section on the line 32—32 of Fig. 31.

Figs. 33 and 34 are perspective views of the male and female dies respectively for performing the second operation on the box-bodies.

Fig. 35 is a perspective view of one of the box-bodies after the first and second operations have been performed thereon.

Fig. 36 is a horizontal section on the line 36—36 of Fig. 4 showing the feeding, clamping, cutting and inserting and supporting mechanism for the wire from which the pintles are formed for the boxes.

Fig. 37 is a vertical cross-section on the line 37—37 of Fig. 36 showing the wire feeding mechanism in side elevation.

Fig. 38 is a vertical cross-section on the line 38—38 of Fig. 36 showing another view of the wire clamping device.

Fig. 39 is a vertical cross-section on the line 39—39 of Fig. 36 showing the wire cutting mechanism.

Fig. 40 is a plan view of the wire cutter and of the wire block containing the inserting and other mechanism showing the position of the parts just after the wire has been cut to form a pintle for the box.

Fig. 41 is a vertical cross-section on the line 41—41 of Fig. 40 showing the block containing the wire inserting and other mechanism.

Fig. 42 is a plan view similar to Fig. 40 but showing the pintle in a different position with the cover of the wire block removed.

Fig. 43 is a perspective view of a box-body after its pintle has been inserted in position and ready to have the cover hinged thereto.

Fig. 44 is a side elevation of the wire cutting mechanism and also the pintle-pushing device whereby the free end of the pintle, after the wire has been cut, is pushed into one of the bearings or ears on the box-body.

Fig. 45 is a vertical cross-section on the line 45—45 of Fig. 44 showing the pintle pusher in inoperative position.

Fig. 46 is an enlarged sectional view of the lower portion of the pintle pusher shown in Fig. 45 but in operative position.

Fig. 47 is a vertical cross-section on the line 47—47 of Fig. 46 showing the pintle pusher in front elevation.

Figure 48:
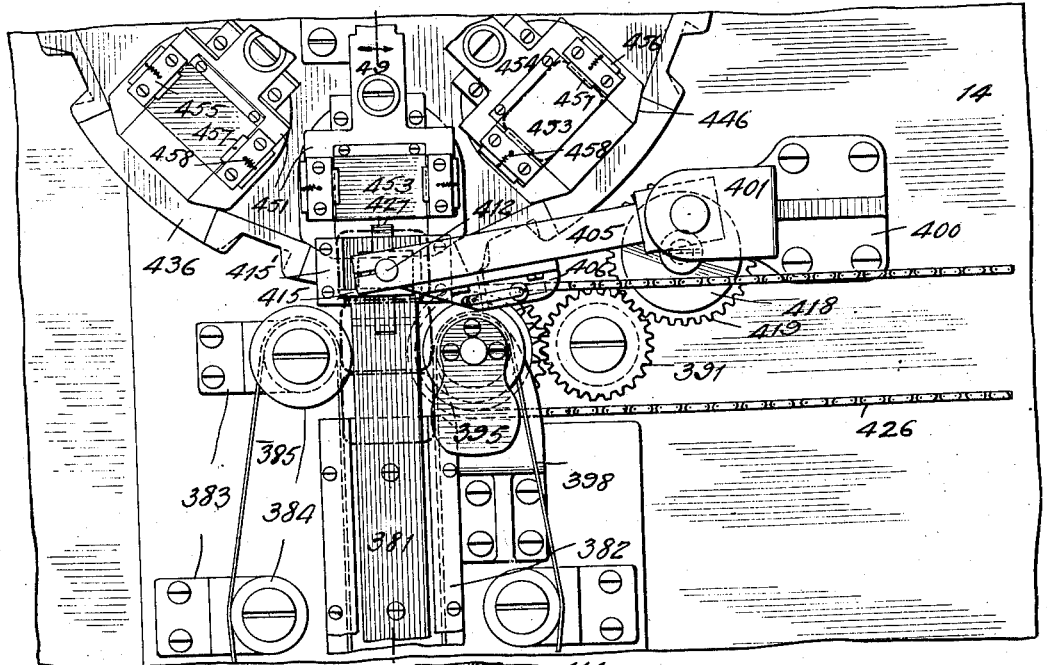

Fig. 48 is an enlarged plan view of the box-cover feeding mechanism.

Figure 49:
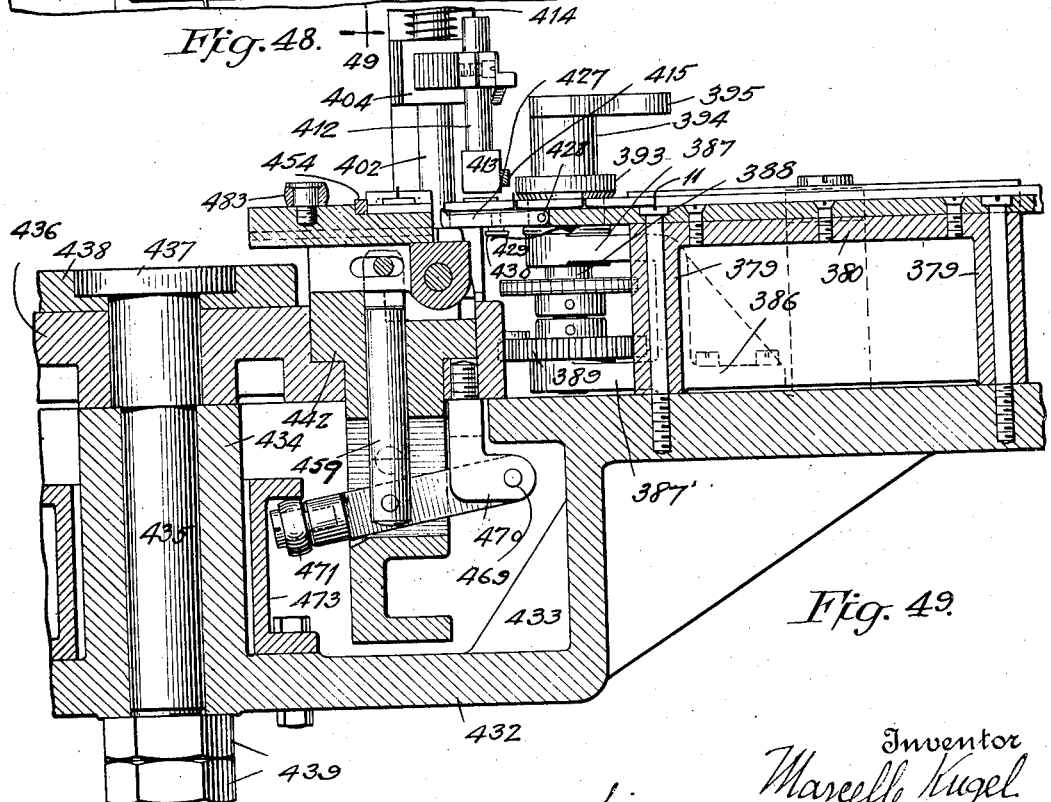

Fig. 49 is a vertical cross-section on the line 49—49 of Fig. 48.

Fig. 50 is an enlarged side elevation (partly in section) of the box-cover feeding mechanism.

Fig. 51 is a perspective view of one of the box-covers before any operations have been performed thereon.

Fig. 52 is a horizontal section taken through the box-cover holder.

Fig. 53 is a horizontal section on the line 53—53 of Fig. 52.

Fig. 54 is a horizontal section on the line 54—54 of Fig. 53.

Fig. 55 is a side elevation (partly in section) of the mechanism, in inoperative position, for performing the first operation on the box-covers.

Fig. 56 is an enlarged view of a portion of the apparatus shown in Fig. 55, but in operative position.

Fig. 57 is a horizontal section on the line 57—57 of Fig. 56.

Fig. 58 is a vertical cross-section on the line 58—58 of Fig. 56.

Fig. 59 is a perspective view of the particular form of die employed for performing the first operation on the box-covers.

Fig. 60 is a perspective view of one of the box-covers after the first operation has been performed thereon.

Fig. 61 is a side elevation (partly in section) showing in raised or inoperative position the mechanism for performing the second operation on the box-covers, that is, the turning of the flange thereon in the proper direction for the hinging operation.

Fig. 62 is an enlarged view of a portion of the apparatus shown in Fig. 61 but in operative position.

Fig. 63 is a horizontal section on the line 63—63 of Fig. 62.

Fig. 64 is a vertical cross-section on the line 64—64 of Fig. 62.

Fig. 65 is a perspective view of the male and female dies for performing the second operation on the box-covers.

Fig. 66 is a perspective view of one of the box-covers after the second operation has been performed thereon.

Fig. 67 is a horizontal section through that portion of the apparatus at which the connecting together of the box members or partial hinging operation takes place.

Fig. 68 is an enlarged horizontal section showing the box-body and box-cover in position just before they are connected together.

Fig. 69 is an enlarged view of a portion of the apparatus shown in Fig. 67 showing the box members after they have been connected together and the positions of the parts in dotted lines after the connection has been effected.

Fig. 70 is a plan view (partly in section) of that portion of the apparatus where the connecting of the box members is effected.

Fig. 71 is an enlarged horizontal fragmentary section through a box-body and box-cover in the position shown in Fig. 69.

Fig. 72 is a perspective view of the pintle backer.

Fig. 73 is a fragmentary plan view of the lever for actuating the slidable plate of the box-cover holder.

Fig. 74 is a vertical cross-section on the line 74—74 of Fig. 1 showing in elevation the box-cover supporting member and pressing member.

Fig. 74ᵃ is a section taken through the box-cover pressing device.

Fig. 75 is a horizontal section of the box-cover flange bending and closing or curling device.

Fig. 76 is a vertical cross-section on the line 76—76 of Fig. 75.

Fig. 77 is a vertical cross-section on the line 77—77 of Fig. 75.

Fig. 78 is a horizontal section on the line 78—78 of Fig. 75.

Fig. 79 is a fragmentary view in section of the box-cover flange bending and closing or curling devices showing the position of the parts at the start of the bending operation.

Fig. 80 is a view similar to Fig. 79 showing the bending device in operative position.

Fig. 81 is a similar view showing the closing or curling device in operative position.

Fig. 82 is a perspective view of the closing or curling die.

Fig. 83 is a rear elevation of the completed box.

Fig. 84 is a perspective view of the completed box in closed position.

Fig. 85 is a perspective view of the completed box in open position.

Fig. 86 is a side elevation of the box-cover flange bending and closing or curling device.

Fig. 87 is a plan view of the box ejector or throw-out.

Fig. 88 is a horizontal section on the line 88—88 of Fig. 87.

Fig. 89 is a side elevation of the ejector or throw-out device taken at right angles to Fig. 88.

Fig. 90 is a detail sectional view of the ejecting finger.

According to my invention, I provide a plurality of metallic box-bodies 1, preferably similar to that shown in Fig. 21, which have continuous up-standing walls or sides 2. These box-bodies may be stamped out or made in any suitable machine which forms no part of my invention. The box-bodies are fed progressively and intermittently to the machine as will presently be described in detail. The first operation on the bodies is the forming or pressing out of tits 3 and opening lugs 4, as shown in Fig. 26, on one of the longer walls or sides thereof which tits and lugs are formed or pressed out simultaneously. The said tits 3 are adapted to engage similar tits on the box-covers to form a clasp for the box and the lugs 4 are provided merely as convenient means which may be gripped by the thumb-nail when it is desired to open the box.

The second operation on the box-bodies consists in providing the rear wall thereof, that is the wall opposite to the one on which the tit and lug are formed, with a depression 5 perforated at either end as at 6 and provided with pintle-bearings or ears 7 at or adjacent the perforations, all as shown in Fig. 35. The third operation on the bodies is the insertion of a pintle 8 through said perforations 6 and within the said pintle-ears or bearings 7 as shown in Fig. 43 whereupon the bodies are ready for having the covers hinged thereto.

I also provide a plurality of box-covers 9 of the style shown in Fig. 51 which likewise have continuous up-standing sides or walls 10 one of the longer of which is provided with a somewhat elongated upwardly extending flange 11 with notches 12 in said wall at either side of said flange. Said covers may also be stamped out or made in any suitable manner and in any suitable machine forming no part of my invention. Said covers are fed intermittently and progressively to the machine and are first provided with tits 13 as shown in Fig. 60 which are pressed out in the wall or side opposite the wall having the flange 11. The said tit 13 is adapted to frictionally engage the tit 3 on the box-body when the body and cover of the box are hinged together in order to hold the body and cover together and providing a clasp for the box.

The second operation on the box-covers is the turning of the flange 11 first outwardly away from the cover and then the upper portion comprising approximately one-half of the flange inwardly towards the cover so that the configuration of said flange is similar to that shown in Fig. 66 after this operation. The turned flange 11 is then inserted behind the pintle 8 supported in the pintle-ears 7 on the box-body and it is then bent over and curled around said pintle to form the complete hinged box shown in Figs. 83 to 85 inclusive.

My improved machine and the operation thereof will now be described in detail with reference to the accompanying drawings in which like figures of reference indicate corresponding parts in all the views.

14 indicates the upper horizontal wall or table of the frame of the machine which is provided with the supporting sides 15 and 16. Mounted at the rear of the machine in the bearings 17 which are carried by the vertical bearing supports 18 is the lower and main driving shaft 19 carrying the main driving pulley 20 which may be connected by a belt (not shown) with any suitable source of power. Said main shaft 19 is also provided with conventional clutch members 21 for connecting or disconnecting the main shaft at will with the source of power. 22 indicates an upper rear shaft which is journalled in the outwardly extending bearings 23 fastened to the rear side or back of the frame, which upper rear shaft carries a bevel gear 24 meshing with a bevel gear 25 on the upper end of a short vertical shaft 26 which is supported by a U-shaped bracket 27 fastened to the base of the frame or to the floor adjacent the rear side of the frame. The lower end of said vertical shaft 26 also carries a bevel gear 28 meshing with a bevel gear 29 on the main driving shaft 19 so that, obviously, a rotation of said main driving shaft 19 effects a rotation of said upper rear shaft 22.

29 indicates suitable bearings bolted to the side 16 of the frame and in which are journalled the right-hand shaft 30 extending at right angles to the main driving shaft 19 and connected therewith by the bevel gear 31 carried on the end of the shaft 30 and which meshes with a bevel gear 32 on the end of the main driving shaft. On the other side of the frame and bolted to the wall or side 15 thereof are the bearings 33 in which are journalled the left-hand shaft 34 which likewise extends at right angles to the main driving shaft 19 and which is connected therewith by the bevel gear 35 on the end of shaft 34 meshing with bevel gear 36 carried by the main shaft. 37 indicates the front shaft running parallel to the main driving shaft and which is journalled in suitable bearings 38 at either end thereof, which bearings are held or supported by the vertical bearing supports 39 which are fastened to the base of the frame or to the floor. Said front shaft 37 carries a bevel gear 40 on the end thereof meshing with a bevel gear 41 carried by the left-hand shaft 34. As is obvious, a rotation of the main driving shaft not only effects a rotation of the upper rear shaft 22 as has been described but it also effects a rotation of the right-hand shaft 30, the left-hand shaft 34 and the front shaft 37 due to the interconnection of said shafts.

42 indicates a disc hereinafter called the box-body disc or body disc which is loosely mounted on a vertical fixed shaft 43 held in a bearing 44 preferably cast integral with the frame and depending downwardly therefrom. Said vertical shaft 43 is provided with an end plate 45 engaging the under side of the bearing 44 and with nuts 46 on the upper screw-threaded end thereof engaging an upper stationary annular plate 47 fixed to the shaft 43 (Figs. 2, 20 and 27). The body disc 42 which may thus be rotated while the shaft 43 and plate 47 are fixed is provided adjacent its periphery with a plurality of holes 48 extending therethrough, preferably ten in number, which are spaced apart equidistantly (Figs. 1, 4 and 5).

Fixed to the body disc 42 by pins 49, (Fig. 4) or otherwise, is a lower disc 50 which is also mounted on the hub 51 of said body disc 42 within a depression 52 with which the frame is provided. If so desired the said body disc 42 and lower disc 50 may be cast together as an integral structure as they rotate together and are in reality one element. The said lower disc 50 is provided at its periphery with a plurality of notches 53 (Figs. 4 and 20) preferably ten in number which are equidistantly spaced apart.

Loosely mounted on the hub 51 of the body disc 42 is a pawl-carrier 54 (Figs. 4 and 5) lying intermediate the lower disc 50 and that portion of the frame forming the lower wall or base of the depression 52. Said pawl-carrier has pivoted thereto as at 55 a pawl 56 the end of which is held in engagement with the periphery of the lower disc 50 or with the notches 53 therein by a spring 57 fastened to said pawl-carrier and engaging said pawl.

A conventional form of crank 58 (Figs. 4 and 5) is connected to the main driving shaft 19 in the usual manner. The connecting rod 59 of the crank is pivotally connected with a link 60 fulcrumed as at 61 to the downwardly depending supporting arm 62 of a bracket 63 which is bolted or otherwise fastened to the under side of the upper wall 14 of the frame. The upper end of said link 60 is pivoted as at 64 to a cross-head 65 adapted to be reciprocated in the flanged guideway 66 which is bolted to the upper wall of the frame. Pivoted to the cross-head 65 as at 67 is a pawl-carrier actuating rod 68 the forward end of which is likewise pivoted as at 69 to the pawl-carrier 54.

70 indicates an arm extending from the bracket 63 and carrying a vertical bearing 71 supporting therein a locking rod 72 provided with a collar 73 fixed thereto and having an upper beveled end 74. Encircling the locking rod 72 is a compression spring 75 which engages the bearing 71 and the collar 73 and tends by its action to force the locking rod upwardly. A downwardly extending standard or post 76 (Fig. 2) is fastened to the under side of the upper wall 14 of the frame and has fulcrumed thereto at 77 a locking-rod actuator 78, one end of which extends through a slot 79 (Fig. 5) in the lower end of the locking-rod 72 and the other or lower end of which extends through an opening 80 in the side wall 15 of the frame and carries a roller 81 engaging a cam groove or slot (not shown) in the side of a face cam 82 carried by the left-hand shaft 34. The connection between the roller and cam groove is not shown or described in detail but will be understood from the detailed explanation and illustration of other similar parts hereinafter referred to.

The body disc 42 is driven by the crank 58 in a clockwise direction and for each revolution of said crank the body disc rotates one-tenth of a revolution or 36°. When the main shaft 19 rotates and the crank 58 revolves, the cross-head 65 and the pawl carrier 54 are moved or thrown forwardly and the lower disk 50 (as well as the body disc 42) is partially rotated due to the engagement of the pawl 56 with one of the notches 53 in the lower disc 50, as is obvious. At the end of the forward stroke of the cross-head and pawl-carrier, the pawl 56 is forced out of the particular notch 53 which it engaged at the start of the stroke and on the return stroke rides along the periphery of the lower disc against the action of the spring 57. At the end of said return stroke it is forced into the next succeeding notch 53 in the lower disc by said spring and the same operation is then repeated.

It is important on account of the timing of the various parts of the machine and because the parts must have a definite and accurate relative position to each other while the several operations are being performed that the body disc 42 be rotated a predetermined and definite distance, in this case 36°, for each revolution of the crank and that it be not allowed to slip or ride beyond this distance for each revolution of said crank. Accordingly I have provided a lock which releases the body disc at or immediately prior to the beginning of every stroke of the crank and which locks the body disc when it has been rotated the predetermined distance. Said lock comprises the locking rod 72 which has just been referred to, the upper beveled end 74 of which is adapted to lockingly engage the holes 48 in the body disc to prevent rotation of the same. The parts are so timed that immediately prior to the forward movement of the cross-head 65 and pawl-carrier 54 the locking rod is withdrawn from the hole 48 against the action of spring 75 by the rocking of the actuator 78 on its pivot 77 due to the engagement of the roller 81 with the cam groove or slot of the face cam 82 and at the proper point in said groove. As soon as the locking rod 72 has been positively withdrawn from its engagement with the hole 48 and the body disc 42 has been partially rotated, the actuator 78 is rocked in an opposite direction by the cam action of the roller 81 in the cam groove of the face cam 82, thereby permitting the beveled end 74 of the locking rod to engage the under-surface or side of the body disc due to the action of the spring 75 and to ride against said surface until the body disc has completed its predetermined distance of rotation and the locking rod has been brought into alignment with the next succeeding hole 48. The locking rod will then immediately be projected by the spring 75 into the next succeeding hole 48 to lock the body disc against further rotation until said locking rod has been withdrawn in the manner hereinbefore described. The parts are so timed that the body disc is held in locked position momentarily while various operations on the box-bodies are being performed as will be presently described and after each operation the body disc is released and again rotated through an angle of 36°. Thus, it will be seen from the above description, that the locking of the body disc is effected by the action of the spring 75 while the unlocking thereof is due to the cam action of roller 81 in the cam groove of the face cam 82.

The said body disc 42 is provided on its upper face adjacent its periphery with a plurality of body-holding nests 83 (Figs. 13, 15 and 16) each provided with a rear block 84 fastened therein comprising the rear wall of the nest as well as the female die for the first body operation to be hereinafter described. The said nests are equidistantly spaced apart, there being preferably ten of them in number. Fastened to the body disc at either side of said nests are slotted blocks 85 through the slots of which positioning plates 86 extend which plates are provided with rear and front stops 87, 87' respectively and with overhanging guide flanges 88. The ends of said positioning plates are adapted to engage and support the box-bodies when the bodies are in position in said nests with the overhanging guide flanges 88 extending over and engaging the tops of the walls or sides 2 of said box-bodies as shown in Fig. 15. 89 indicates tension springs which are fastened to the blocks 85 and to the rear stops 87 of the positioning plates, the function of which is to hold the plates in engagement with the sides of the box-bodies in the nests.

90 indicates a plurality of pairs of posts mounted on the body disc 42, each pair carrying a rod 91 on which is pivoted a box-body gripper 92, one for each nest 83. Fastened to each box-body gripper 92 are angle-hooks 93 the ends of which are adapted to engage the front walls of the box-bodies when the same are properly positioned in their respective nests 83 as shown in Figs. 15 and 16. Each of said grippers 92 carries a roller 94 adapted to ride, when the body disc is rotated, on a shoulder 95 at the edge of the stationary, annular plate 47. The said annular plate 47 has fastened thereto at the place indicated an overhanging plate 96 adapted for engagement on the under side thereof by the rollers 94, whereby the grippers will be rocked positively on their pivots to throw the angle-hooks 93 upwardly from their normal position and from disengagement with the box-bodies. This is necessary, as is obvious, when the bodies are first fed to the machine, that is, to their nests 83 and when the hinged boxes are ejected from the machine.

At the several locations where the box-bodies are operated on, the shoulder 95 on the annular plate 47 is provided with a raised or elevated surface 97 so that when the rollers 94 pass thereover the hooks 93 of the grippers 92 are positively held in engagement with the box-bodies. At other "stations" or places where the bodies are not operated on they may be removed from their nests by merely swinging the grippers upwardly manually on their pivots 91 to release the hooks thereof from engagement with the bodies and then withdrawing the bodies from the nests and from engagement with the positioning plates 86.

The table or upper wall 14 of the frame is provided with a channel or chute 98 screwed thereto and leading to the body disc and which lies in the same horizontal plane as the plane of the nests 83 (Figs. 11 to 14 inclusive and 17). Said channel is provided intermediate its ends with side walls 98' having flanges 99 fastened thereto and providing guides for the box-bodies. Adjacent said channel the table 14 is provided with a depression 100 having side walls and a base 101 preferably integral with said table. Bolted to the base of said depression is a bracket 102 the horizontal arms 103 of which support and act as bearings for a vertical shaft 104 having a lower beveled end 105. Said shaft 104 is capable of partial rotation as well as vertical reciprocation in its bearings.

Fastened to said shaft 104 is a block 106 carrying a horizontal operating arm 107 having a slot 108 extending therethrough in which is pivoted as at 109 a lever 110. Fastened to the free end of said lever 110 and extending through the slot 108 is a screw 111 the head of which extends outwardly from the operating arm 107 spanning the slot 108 and acting to limit the downward movement of said lever on its pivot 109 in an obvious manner. A spring 112 is fastened to the top of the operating arm 107 and the free end thereof engages the top of said lever 110 and acts to retain the lever in its lower position as shown in Fig. 17 with the head of the screw 111 engaging the operating arm 107.

Vertically adjustably fastened to the outer free end of the operating arm 107 is a vertical rod 113 to the lower end of which a square feed block or shoe 114 is secured. 115 indicates a compression spring encircling the shaft 104 and fastened to the upper bearing 103 of bracket 102 as well as to the block 106. Said spring tends by its action not only to hold the beveled end 105 of the shaft 104 in engagement with the face of a cam plate 128 to be presently described but to swing and retain the operating arm 107 towards the front of the frame in the position shown in Fig. 13.

Secured to the base 101 of the depression 100 is a second bracket 116 provided with forwardly extending and parallel upper and lower horizontal arms 117, 118 respectively, the ends of which are perforated and provide bearings for the vertical rotatable shaft 119 which is mounted therein. Keyed to said shaft 119 is a gear 120 and a sprocket 121 and rigidly mounted on the shaft above the upper arm 117 of the bracket 116 is a flanged roller 122. Said shaft 119 terminates in a head 123 provided with an upstanding neck 124 adjacent the periphery thereof and an actuating finger 125 extending outwardly from said neck and preferably integral therewith. Mounted in the base 101 of the depression 100 is a cam support 126. Pivotally secured to the cam support 126 by a screw-threaded pivot 127 is a cam plate 128 having a beveled or cam face as indicated. The periphery of the annular base of said cam plate is provided with cogs so that said base constitutes a gear 129 meshing with the gear 120 on the shaft 119. The beveled end 105 of the vertical shaft 104 engages the face of the cam plate 128 due to the expansive action of the spring 115, as previously described.

Bolted to the side 15 of the frame (Figs. 3ª and 11) is a U-shaped bracket 130 the horizontal arms 131 and 132 of which provide bearings for a vertical shaft 133 carrying on its upper end a sprocket 134 and on its lower end a bevel gear 135 meshing with a bevel gear 136 carried by the left-hand shaft 34. 137 indicates a chain connecting the sprocket 134 and the sprocket 121 so that, as is obvious, a rotation of the shaft 34 effects a rotation of the sprockets 134 and 121 and also the cam plate 128 (due to the meshing of the gears 120 and 129) and a consequent reciprocation of the shaft 104 in its bearings because of the engagement of the beveled end thereof with the face of the cam plate 128 as has been explained.

139 indicates flanged rollers mounted on the table 14 at the forward and rear ends of the right-hand side of channel 98 and intermediate said ends, which rollers are connected by an endless belt 140 extending adjacent the right-hand side wall 98' of the channel and beneath the flanged guide 99 thereof. Likewise, adjacent the forward end and center of the left-hand side of the channel 98 I have provided two flanged rollers 141 which are connected together and to the flanged roller 122 by an endless belt 142 running adjacent the left-hand side wall 98' of the channel beneath its flanged guide. The flanged rollers 139 and 141 at the forward end of the channel are interconnected by a crossed belt 143 so that, obviously, when the shaft 119 is rotated, inasmuch as the roller 122 is mounted thereon, the endless belts 140 and 142 travel around their respective rollers on either side of the channel 98.

The box-bodies 1 are placed in the channel 98 and are carried forwardly therein by the frictional engagement of their sides with the belts 140 and 142. When they reach the end of the channel they are held momentarily against further forward movement by a stop 144 pivoted to the underside of the end of the channel and held in normal position by a spring 145 bearing thereagainst and fastened to the channel (see Fig. 12). When the main driving shaft 19 is rotated, the body disc 42 is rotated intermittently, as has been explained, a tenth of a revolution, so that for each revolution of the main shaft and the crank 58 one of the nests 83 is brought into alignment with the end of the channel 98. The parts are so timed that during the return stroke of the cross-head 65 and pawl-carrier 68 and before the body disc is again rotated another 36° to bring the next succeeding nest 83 in alignment with the end of the channel 98, the box-body at the rear end of the channel which engages the spring-pressed stop 144 is fed into the nest 83 which is then in alignment therewith in the following manner:

The feed block or shoe 114 is at this moment directly in vertical alignment with the box-body which engages the stop 144 due to the turning action of the spring 115 which has swung the operating arm 107 towards the front of the frame and into engagement with a stop 146 which is secured to the table 14 and which acts to limit the swing or movement of the operating arm 107 and consequently of the feed block or shoe 114. (Fig. 13). The beveled end 105 of the shaft 104 then rides into engagement with the high portion of the face of the cam plate 128 (Fig. 17). Meanwhile shaft 119 and the cam plate 128 are rotating due to the interconnection of these parts with the left-hand shaft 34 as hereinbefore described. The rotation of these parts causes the beveled end 105 of the shaft 104 to slide down the inclined, beveled face of the cam plate 128 and to engage the low portion thereof, thereby permitting the spring 115 by its action to force the feed block or shoe 114 within the box-body.

The extended or forward end of the actuating finger 125 then forces the operating arm 107 forwardly, due to the rotation of shaft 119, the feed block 114 thus carrying the box-body with it by engagement with the front wall of the box-body. The box-body is carried over the pivoted stop 144 pressing it downwardly against the action of its spring 145 and is fed into the nest 83 on the body disc 42 against the block 84 therein, intermediate the positioning plates 86 and beneath the overhanging guide flanges 88, the angle-hooks 93 at this time having been swung upwardly due to the engagement of the roller 94 with the under side of the plate 96.

Immediately after the box-body has been fed into its nest the feed block is raised upwardly by the rotation of the cam plate 128 and the engagement of the beveled end 105 of the shaft 104 with the high portion of the face of the cam plate and against the compressive action of the spring 115. The turning action of said spring thereupon forces the operating arm 107 backwardly and it rides back into the position it assumed at the beginning of its feed stroke and into engagement with the stop 146 and the same movement is then repeated.

Upon the return movement of the operating arm 107 the spring-pressed lever 110 engages the actuating finger 125 which it should be noted is rotating so that said operating arm and actuating finger ride back together until the operating arm engages the stop 146, the actuating finger then continuing its rotation and riding clear of the operating arm as shown in Fig. 13. The actuating finger 125 thus prevents too sudden a return of the operating arm 107, due to the turning action of the spring 115, and a consequent violent striking of said arm against the stop 146 which would damage the parts. The lever 110 is made movable rather than fixed for the reason that if the operating arm 107 or connected parts should become jammed at certain points in their movement, when the actuating finger 125 is rotating and is brought into engagement positively with said finger it would merely force the same upwardly on its pivot against the action of its spring 112 and pass beneath the operating arm 107 without injury thereto or to the parts connected therewith.

The motion of the feed block 114 is in a rectangular path as is apparent, being downwardly into the box-body, forwardly carrying the box-body with it, upwardly and then rearwardly to its first position. This motion is effected by a single positive drive which drive also simultaneously acts to carry the box-bodies forwardly in their channel in which they are placed by the operator. The bodies are fed intermittently and progressively to the nests in the body disc 42 and as the body disc is rotated intermittently a predetermined distance, a vacant nest is being continually brought into alignment with the channel to receive a box-body. As quickly as one of the box-bodies is fed to the body disc another one is immediately brought into engagement with the spring-pressed stop 144 and into position for feeding. After the bodies are fed to the body disc they are carried thereby while the disc is rotated intermittently and while the several other operations are performed thereon and the box-cover hinged thereto to be presently described.

147 indicates a standard or post which is bolted to the table 14 of the frame in front and in alignment with which is a stationary supporting sleeve 148 provided with a vertical arm 149 which is likewise bolted to the table (Figs. 2, 4, 11 and 20). If so desired the parts just named may be cast as an integral structure. Fulcrumed to the upper forked end of said post 147 as at 150 is an actuating lever 151 having a reduced forward end 152. The rear end of said lever is pivoted as at 153 to an eccentric rod 154 connected to an eccentric strap 155 engaging an eccentric 156 which is mounted on the left-hand shaft 34. Mounted in said supporting sleeve 148 is a reciprocatory plunger 157 hollowed out or recessed at 158 and provided with a forked lower extension forming depending arms 159 and 160 joined together by a base 161 by means of suitable pins or screws as shown in Fig. 23.

The said plunger 157 has removably secured thereto by screws 162 a head or cap 163 having a slot 164 receiving the reduced forward end 152 of the actuating lever 151. 165 indicates a vertical spindle secured to the top of said head or cap 163 and carrying a cross-arm 166 with tension springs 167 joined to the ends thereof and to the sides of the stationary supporting sleeve 148 and which by their action tend to force the plunger downwardly within said sleeve. Extending longitudinally through said plunger 157 within the recess 158 is a reciprocating plunger rod 168 which likewise extends through an opening in the head or cap 163 and into the slot 164 thereof as indicated. Said plunger rod 168 is provided with a compression spring 169 bearing against a collar 170 on said rod and against the lower wall or base of the hollowed out portion or recess 158 and it tends by its action to retain said plunger rod in elevated or upper position as shown in Fig. 20. The said plunger rod has a lower flat reduced end 171 (Fig. 23) extending downwardly intermediate the arms 159 and 160 of the forked extension of the plunger 157.

172 indicates a bell-crank lever pivoted as at 173 to the arms 159 and 160 of the plunger 157. The horizontal arm of said bell-crank lever is forked forming members 174 which receive the flat reduced end 171 of the plunger rod therebetween while at the same time fitting intermediate the arms 159 and 160. The arms 159 and 160 of the plunger, the flat reduced end 171 of the plunger rod and the forked members 174 of the bell-crank lever are pivotally joined together by a pin 175 extending through a slot 176 with which the forked members 174 are provided to permit the bell-crank lever to be rocked on its pivot 173. The vertical arm of said bell-crank lever terminates in a solid head 177 loosely fitting within a slot or opening 178 of a male die 179 which is horizontally slidably supported on the base 161 (Figs. 22, 23, 24). The said male die is provided with punch members or protuberances 180 adapted to enter corresponding depressions 181 in the rear block 84 of the nests 83, said rear block acting as the female die for this operation.

When the box-bodies supported in the nests reach the "station" or position in their travel immediately beneath the plunger 157 they are more firmly held in their nests and against the rear block 84 thereof by the hooks 93 which are brought into gripping engagement with the front wall of the body due to the engagement of the rollers 94 with the raised surface 97 on the shoulder 95 of the annular plate 47 and the consequent forward rocking of the grippers on their pivots as has been explained.

As soon as a box-body has been brought directly beneath the said plunger 157 by the partial rotation of the body disc it is held there momentarily while the first operation is performed thereon and before the body disc has again been rotated through an angle of 36°. The plunger is in the position shown in Fig. 20 with the reduced end 152 of the actuating lever 151 holding it in raised or inoperative position against the action of the springs 167. The left-hand shaft 34 meanwhile is rotating and the eccentric action of the eccentric 156 rocks the actuating lever 151 forwardly on its pivot 150 thereby permitting the springs 167 to force the plunger 157 downwardly so that the lower end and base 161 thereof enter and engage the box-body. The reduced end 152 of the actuating lever 151 thereupon forces the plunger rod 168 downwardly by the aforesaid eccentric action and against the action of the spring 169, thus causing the bell-crank lever 172 to rock on its pivot 173 in a counter-clockwise direction, as is obvious, thereby forcing or sliding the die 179 forwardly on the base 161 and pressing the punch members or protuberances 180 of the die 179 into the metal of the front wall of the box-body to form or press out the tit 3 and opening lug 4, which tit and opening lug enter the depressions 181 in the rear block 84 of the nest 83 (Fig. 22).

After the tit 3 and opening lug 4 have been formed or pressed out on the front wall of the box-body the eccentric action of the eccentric 156 rocks the actuating lever 151 on its pivot in an opposite direction permitting the plunger rod 168 to be raised within the plunger 157 by the action of its spring 169 and causing the bell-crank lever 172 to rock in a clockwise direction to force the die 179 rearwardly, thereby disengaging the punch members 180 from the tit and opening lug which they have pressed out. The actuating lever 151 then continues to be positively rocked in the same direction to raise the plunger 157 upwardly against the action of the springs 167 and into inoperative position shown in Fig. 20. From the foregoing description it will be seen that the plunger is carried downwardly into the box-body by a spring action to wit: the springs 167, the actual punching or pressing out of the tit and opening lug on the box-body are performed by the eccentric action, the raising of the plunger rod is performed by a spring action to wit: spring 169 and the raising of the plunger is performed by the eccentric action. It is found in practice that the best results are secured by lowering the plunger by a spring action rather than by an eccentric or positive action as in the latter case the parts must be timed too carefully to permit the device to operate in a practical manner.

182 indicates a post or standard (Figs. 4 and 27) bolted to the table 14 and provided with an arm 183 joining it with the post 147. A vertical arm 184 which may be integral with said post 182 if so desired is likewise bolted to the table and it carries a supporting sleeve 185. The upper end of post 182 is forked and it has fulcrumed thereto as at 186 an actuating lever 187 having a reduced forward end 188. Said lever 187 is pivoted as at 189 to an eccentric rod 190 connected to an eccentric strap 191 which engages an eccentric 192 mounted on the left-hand shaft 34. A plunger 193 capable of reciprocation in said supporting sleeve 185 is provided with a cap or head 194 having a slot 195 therein in which slot the reduced end 188 of lever 187 extends. Said cap or head is removably fastened as by the screws 196 (Fig. 28) to the plunger 193 and it is provided with a vertical spindle 197 extending upwardly therefrom having a cross-arm 198 fastened thereto, the ends of which are connected by tension springs 199 to said supporting sleeve (Figs. 2 and 29).

The said plunger 193 is provided with a hollowed out portion or recess 200 and has mounted therein a plunger rod 201 extending longitudinally through the plunger as well as through an opening in the head or cap 194 and protrudes into the slot 195. Said plunger rod 201 is provided with a lower beveled end 202 and with a collar 203. A compression spring 204 engages said collar 203 and the base of said opening 200 and tends by its action to force the plunger rod upwardly. The lower end of the plunger 193 is slotted as at 205 to form downwardly depending supporting arms 206 and 207 which are provided with lower transverse slots 207' cut therethrough (Fig. 30). 208 and 209 indicate die-holding jaws which have secured to the lower ends thereof in suitable depressions and by screws 208' and 209' as shown in Fig. 28, the female and male dies 210 and 211 respectively, being thus mounted on the die-holding jaws in juxtaposition.

Said die-holding jaws 208 and 209 are forked at their upper ends as at 212 and 213 and are provided with rollers 214 and 215 respectively pivoted within said forked ends, which rollers engage the beveled lower end 202 of the plunger rod 201. The die-holding jaws are also provided with interfitting hinge extensions 216 pivotally joined together by a pivot 217 extending therethrough and fastened to the downwardly depending supporting arms 206 and 207 of the plunger as shown in Fig. 29. The said die-holding jaws are also connected together by a tension spring 218 the ends of which are fastened to pins 219 mounted in openings 220 with which the die-holding jaws are provided. The function of said spring 218 is to retain the rollers 214, 215 in engagement with the beveled end 202 of the plunger rod 201 and to swing the upper forked ends 212, 213 of the die-holding jaws inwardly towards each other on the pivot 217 so as to leave a space between or open the female and male dies 210 and 211 as shown in Fig. 27. The said male die 211 is provided with a rectangular-shaped protuberance or punch member 221 and with depressions 222 adjacent the sides thereof while the female die is provided with a corresponding rectangular-shaped depression 223 and protuberances or punch members 224.

When a box-body is carried by the body disc 42 beneath the plunger 185 it is held there momentarily before the body disc is rotated through a further angle of 36° and while the second operation is being performed thereon. The plunger is then in raised or inoperative position as shown in Fig. 27 and is held in said position by the actuating lever 187 but the eccentric action of the eccentric 192 immediately rocks said actuating lever 187 on its pivot 186, thereby permitting the tension springs 199 to force the plunger 193 bodily downwardly whereby the right-hand portions (Figs. 28 and 30) of the downwardly depending supporting arms 206 and 207 will enter the box-body and the left-hand portions of said supporting arms will be free and will lie exterior to said box-body. The rear wall or side of the box-body, that is the wall or side opposite the wall or side which has had the tit 3 and opening lug 4 formed thereon, will be interposed between the jaws 208 and 209 and the slots 207'. The eccentric action of the eccentric 192 then causes the reduced end 188 of the actuating lever 187 to press or force the plunger rod 201 downwardly thereby closing the lower ends of the jaws against the action of the spring 218 due to the engagement of the rollers 214, 215 with the beveled end 202 of the plunger rod and in an obvious manner. The closing of said jaws in the manner described presses the dies 210, 211 against either side of the rear wall of the box-body and because of the protuberances 221, 224 and depressions 222 and 223 on said dies, presses out or forms a depression 5, perforations 6 and pintle-bearings or ears 7 in the wall of the body such as shown in Fig. 35.

Upon the completion of the second operation on the box-body the eccentric action of the eccentric 192 rocks the actuating lever 187 in an opposite direction thus permitting the spring 204 to raise the plunger rod 201, whereby the jaws 208 and 209 are swung into open position on pivot 217 by the action of the spring 218 in an obvious manner. The continued movement of the actuating lever 187 in the same direction causes the end 188 thereof to lift or raise the plunger 193 bodily into the extreme upper and inoperative position shown in Fig. 27.

225 indicates the base of a movable wire-feeder bracket (Figs. 36 and 37) provided with flanges 226 interfitting with flanged guides 227 which are bolted or screwed to the table 14 as shown. 228 indicates the U shaped head of said bracket the longer parallel arm 229 of which is connected with said base 225 and is preferably integral therewith. Pivoted to the arms of said U-shaped head 228 as at 230 is a bell-crank lever 231 having a laterally extending perforated arm 232 and a vertical arm 233 the lower end of which is forked as shown in Fig. 37. The lower forked end of said vertical arm 233 has loosely pivoted thereto as at 234, but off-center as respects the pivot 230, a wire-feeding block 235 adapted to feed a wire 236 laterally as will be described. Said wire 236 may be supported on any suitable reel or other support (not shown) at or adjacent the left-hand side of the machine.

237 indicates a wire-feeder actuating-arm pivoted by a screw-threaded pivot 238 to a post 239 mounted on the table 14, and which is provided with a forward forked-end 239', the forked members 239'' of which are pivotally connected by a pivot 240 to the laterally extending perforated arm 232 of the bell-crank lever. The rear end of said actuating arm 237 terminates in a post 241 hollowed out or provided with an annular opening 242 receiving a rod 243 having fastened thereto or integral therewith a spindle 244 which extends upwardly through an opening in the top of said post and which carries on the end thereof a knob 245.

246 indicates a roller carried by the lower end of the rod 243 and which engages the side walls of the cam slot 247 of a drum cam 248 which is carried by the upper rear shaft 22. A compression spring 249 encircles the spindle 244 within the opening 242 and one end thereof engages a shoulder 250 in said opening while the other end bears against the top of the rod 243. The spring therefore obviously tends to retain the roller 246 in engagement with the cam slot 247. The spindle 244 is provided with a pin 251 normally engaging a groove 252 in the upper end of the post 241. When it is desired to draw and hold the roller 241 from engagement with the cam slot 247, the knob 245 may be pulled up manually and then rotated so that the pin 251 seats on or engages the top of the post 241.

A rotation of the upper rear shaft 22 effects a horizontal oscillation or rocking of the actuating lever 237 on its pivot 238 due to the engagement of the roller 246 with its cam slot 247 as is manifest. This causes a horizontal reciprocation of the bracket 225 bodily in the flanged guides 227 as well as a rocking of the bell-crank lever 231 on its pivot 230 due to the manner in which the several parts are mounted and connected together as hereinbefore described. On the forward movement or movement to the right of the bracket 225 the lower end of the vertical arm 233 of the bell-crank lever is swung to the right on pivot 230 and causes the wire-feeding block 235 to engage the wire 236 and carry the wire along with it a predetermined distance limited by the length of travel or forward stroke of the bracket 235. At the end of the forward stroke the actuating arm 237 rocks in an opposite direction, due to the cam action of the drum cam 248, to return or carry the bracket back to the rear or first position. As soon as the bracket begins its return movement the bell-crank lever 233 is rocked in an opposite or clockwise direction on its pivot 230 and a lower edge of the wire-feeding block 235 is "kicked" up or raised, due to the fact that the pivot 234 is off-center as respects the pivot 230, so that said wire-feeding block is readily returned with the other parts but grippingly disengaged from the wire 236. If so desired I may provide a set-screw 253 extending through the U-shaped head 228 of the bracket and provided with the usual locking nut, said set-screw being adapted to engage the bell-crank lever 231 to limit the swing or throw thereof on its pivot 230.

It is desirable that after every forward stroke of the wire-feeder bracket 225 and its consequent feeding forwardly of the wire 236 a predetermined distance that the wire be clamped tightly while the bracket is returning to its first position and while other operations are being performed on the wire to be presently described. I have accordingly provided a wire-clamping table 254 which is bolted or screwed to the table 14 of the frame having a case-hardened plate 255 countersunk therein and secured thereto by suitable screws 256 and also having a perforated guiding extension 257 screwed thereto as shown and through the perforation of which the wire extends (Fig. 38). Pivoted as at 258 to the pivot bearings 259 (Figs. 4 and 36) is a wire-clamping lever 260 having a clamping head 261 adapted to engage and clamp the wire 236 against the plate 255 of the clamping table. The rear end of said lever 260 is forked as at 262 and has mounted thereon a roller 263 engaging the cam-periphery of a step cam 264 carried by the upper rear shaft 22. The rotation of the shaft 22 due to the cam action of the step cam 264 obviously rocks the lever 260 on its pivot 258 to effect a clamping or unclamping of the clamping head 261 with the wire 236.

265 indicates a wire block which is screwed or bolted to the table 14 of the frame (Figs. 4, 36, 40, 41, 42 and 44). Said wire block contains two chambers, a lower stationary chamber 266 which may be integral with the block itself and an upper slidable chamber 267 supported on said lower stationary chamber 266. Mounted in a channel 268 in the lower stationary chamber 266 is a compression spring 269 engaging the rear wall of said chamber and fastened to a pin 270 carried by said upper chamber and extending within said channel 268. The function of said spring is to slide or move the upper chamber forwardly on the lower chamber and in an obvious manner. The upper chamber is provided with an annular opening 271 therein through which a spindle 272 extends longitudinally, said spindle also extending through the front wall of the chamber. Said spindle is provided with an enlarged rear end 273 slidable within said annular opening 271 and terminating in a squared head 274 which protrudes within a slot 275 in the end of the upper chamber 267 and which acts as a stop to limit the forward movement of the spindle in the opening 271.

A compression spring 276 encircles said spindle 272 and engages the rear end 273 thereof as well as the front wall of the chamber and it acts to hold the spindle in said opening 271 in retracted position shown in Fig. 41. Pivoted to suitable pivot-bearings 277 on the movable upper chamber is a cover plate 278 provided with an extension 279 forming with a lower extension 280, integral with said upper chamber 267, a supporting slot 281 for the wire 236 (Fig. 41). Said extensions 279 and 280 are grooved out as at 281' (Fig. 36) to provide a hole to receive the forward end of the spindle 272. A spring 282 is fastened to the upper chamber and it engages the top of the extension 279 of the cover plate 278 to retain it in downward or closed position. The purpose of having said cover plate movable is to permit access to be had to the forward end of the spindle 272 when so desired or to the wire 236 within the slot 281 should it become caught or jammed therein.

283 indicates a wire-block actuating lever fulcrumed as at 284 to a downwardly depending standard 285 which is fastened to the underside of the table 14. Said lever extends upwardly through a slot 286 (Fig. 41) in said table and the reduced end 287 thereof protrudes within the slot 275 in the upper chamber 267 of the wire block. The lower end of said lever has pivoted thereto as at 288 a cam rod 289 having a fork member 290 connected thereto, the forked arms 291 of which span the lower or main driving shaft 19 intermediate a face cam 292 and a collar 293 which are carried by said shaft. The forked end 290 carries a roller 294 engaging a cam slot 295 in the side of said face cam. The rotation of the shaft 19 causes the lever 283 to rock on its pivot 284 due to the cam action of the roller 294 in the cam slot 295. The movement of the various parts of the wire-block when the lever 283 is rocked will be presently explained.

296 indicates a wire-cutter support mounted on the table 14 in front of the wire-block 265 and immediately adjacent the extensions 279 and 280 of the wire-block previously described. (Figs. 36, 39 and 40). Said support has mounted therein a transversely extending guide-bushing 297 in alignment with the slot 281 intermediate said extensions 279 and 280 and which receives the wire 236. 298 indicates a wire-cutting lever (Figs. 39, 40 and 44) supported in an open bearing 299 fastened to the table of the frame, the forward end of which is provided with a head 300 pivoted as at 301 to the side of the support 296 and carrying a wire-cutting blade 302. The rear end of said wire-cutting lever 298 is provided with a hook 303 (Fig. 44) adapted to engage a lug or pin 304 extending laterally from one side of a face cam 305 which is carried by the upper rear shaft 22. For every revolution of said face cam the lug or pin 304 strikes the hook 303 of the wire-cutting lever 298 and causes said lever to rock on its pivot 301, thereby rotating the wire-cutting blade 302 against the side of the support 296 a distance sufficient to cut off the wire 236 at that point.

306 indicates a vertical standard (Fig. 44) bolted to the table 14 and having fulcrumed to the forked end thereof as at 307, a pintle-pusher actuating lever 308 having a reduced end 308'. Pivoted to the opposite rear end of said lever as at 309 is a vertical cam rod 310 connecting with a fork member 311 the arms of which 312 span the upper rear shaft 22 intermediate the face cam 305 and a collar 313 which are carried by said shaft. The fork member 311 carries a roller 314 engaging a cam slot 315 in the side of said face cam 305. An arm 316 is also bolted or otherwise fastened to the table 14 and has secured thereto, or it may be integral therewith, a supporting sleeve 316' receiving a reciprocating plunger 317 hollowed out or recessed as at 318.

A cap or head 319 is removably fastened to said plunger 317 as by screws 320. Extending upwardly from said cap or head and fastened thereto is a spindle 321 carrying a cross-arm 322 which is connected by the tension springs 323 to the supporting sleeve 316. Mounted in said plunger is a reciprocating plunger rod 324 provided with a beveled end 325 and with a collar 326. A compression spring 327 encircles said plunger rod within the recess 318 and bears against the base of said recess and against said collar 326. The action of said spring tends to retain the plunger rod in upward and inoperative position shown in Fig. 45. The lower portion of said plunger is provided with an opening 328 and a slot 329 communicating therewith.

330 indicates a lever constituting a pintle-pusher which is mounted on a pivot 331 journalled in pivot bearings 332 provided with shanks 333 which are screwed in the side of the plunger 317. (Figs. 44, 45, 46 and 47.) Said pintle-pusher is provided with a lower reduced transverse end 334 adapted to engage and push forwardly a pintle 8 into one of the pintle-bearings or ears 7 on the rear wall of the box-body. The said pintle-pusher is also provided with a horizontal arm 335 having a rounded end normally engaging the beveled end 325 of the plunger rod 324. A spindle 336 extends through a slot 337 in the pintle-pusher and is screwed into the side of the plunger 317. Said spindle is provided with a collar 338 adapted to engage the pintle-pusher and it is also provided with a thumb-piece 339 screwed on the forward end thereof. A compression spring 340 engages said thumb-piece 339 and bears against said pintle-pusher and by its action the rounded end of the horizontal arm 335 is held in engagement with the plunger rod 324 or the lower beveled end thereof. The strength or compression of the spring 340 may be varied by turning or rotating the thumb-piece in the proper direction and in an obvious manner.

Before the pintle 8 for the box-body is formed or cut, the wire 236 extends over the wire feeder 225, through the guiding extension 257 of the clamping table 254, over said clamping table and into the transversely extending guide-bushing 297 of the wire-cutter support 296, the end of said wire being flush with that side of said wire-cutter support to which the wire-cutting lever 298 is pivoted. When the wire-feeder 225 is moved laterally by the actuating lever 237, or immediately prior thereto, the box-body disc is partially rotated through 36° to bring one of the box-bodies in its body-holding nest directly beneath the plunger 317 (Fig. 45).

The lateral movement or movement towards the wire-block 265 of the wire-feeder 225 by the actuating lever 237 carries the wire 236 with it in the manner previously described. Simultaneously with said movement the wire-block actuating lever 283 is rocked on its pivot 284 due to the cam action of the roller 294 in the cam slot 295 of the face cam 292, thereby permitting the spring 269 in the lower chamber 266 of the wire-block 265 to move the upper chamber 267 forwardly, and the wire is fed through the supporting slot 281 formed by the extensions 279 and 280 and its end is inserted in one of the pintle-ears or bearings 7 through the perforation 6 in the rear wall of the box-body and into the box-body as shown in Fig. 40, the upper chamber continuing its movement until the ends of said extensions engage or almost engage said wall of the box-body as shown in Fig. 42.

The wire-clamping lever 260 is thereupon rocked on its pivot in the proper direction to bring the clamping head 261 into clamping engagement with the wire as previously described whereupon the wire-cutting lever 298 is rocked on its pivot to actuate the blade 302 to cause the same to cut the wire to form a pintle 8 for the box-body, the blade 302 being then returned to normal position as the lever 298 immediately rocks in an opposite direction after the cutting operation is performed. The cam action of the roller 294 in the cam slot of the face cam 292 then moves the reduced end 287 of the actuating lever 283 forwardly positively whereby it engages the squared head 274 of the spindle 272 and moves or forces said spindle forwardly against the action of the spring 276. The forward end of said spindle thereupon engages the pintle 8 and forces it forwardly almost into engagement with the depression 5 of the box-body with the disengaged end of said pintle in alignment with the second pintle-bearing or ear 7 and its perforation 6, in which position it is held momentarily by said spindle (Fig. 42).

The pintle-pusher actuating lever 308 is thereupon rocked on its pivot 307 by the cam action of the roller 314 in the cam slot 315 of the face cam 305, thus permitting the springs 323 to carry the plunger 317 downwardly bodily into the box-body. Figs. 44 and 45). The aforesaid cam action thereupon causes the end of the actuating lever 308 to positively force the plunger rod 324 downwardly rocking the pintle-pusher lever 330 on its pivot 331 against the action of the spring 340 due to the engagement of the beveled end 325 of said plunger rod with the rounded end of arm 335, and causing the lower reduced end 334 of said pintle-pusher to engage and push the end of the pintle 8 which extends within the box-body to force the free or disengaged end of said pintle into the second pintle-bearing or ear 7 and through its perforation 6 (Fig. 46).

The wire-block actuating lever 283 is thereupon rocked in an opposite direction on its pivot 284 permitting the spindle 272 to be retracted by its spring 276 and from engagement with the pintle. The movement of said actuating lever continues in the same direction and the reduced end 287 thereof positively forces or moves the upper slidable chamber 267 rearwardly against the action of the spring 269 on the lower stationary chamber 266. The pintle-pusher actuating lever 308 is then rocked on its pivot in an opposite direction to permit the spring 327 to raise the plunger rod 324 within the plunger 317, thus permitting the pintle-pusher 330 to be rocked on its pivot 331 by the spring 340 and to release the lower reduced end 334 thereof from engagement with the end of the pintle 8. The continued movement of the actuating lever 308 in the same direction positively raises the plunger from within the box-body against the action of the springs 323 and in an obvious manner. Meanwhile the wire-feeder 225 has been returned to its first position in the manner previously described and the clamping head 261 of the wire-clamping lever 260 has been released from its clamping engagement with the wire so that all of the "wire" or "pintle" parts are in their first positions, the same cycle of operations being thereupon repeated.

341 indicates a lever fulcrumed as at 342 to a suitable standard or post 343 which is bolted to the table 14 of the frame (Figs. 3 and 6). Said lever is provided with a forked end 344 (Fig. 67) and with a downwardly depending rear arm 345 terminating in a forked member the arms 346 of which span the upper rear shaft 22. Said forked member also carries a roller 347 engaging a cam slot (not shown) in the side of a face cam 348 which is carried by said rear shaft 22. A rotation of said shaft rocks the lever 341 on its pivot 342 in an obvious manner. Bolted to the upper stationary annular plate 47 is an outwardly extending arm 349 carrying a stationary plunger supporting sleeve 350 which is preferably integral therewith (Figs. 2, 67, 74 and 86).

Mounted in the supporting sleeve 350 is a reciprocating pintle-backer plunger 351 hollowed out or recessed as at 352 and provided with a removable cap or head 353 secured thereto by screws 354 and slotted as at 355. 356 indicates a pintle-backer plunger rod mounted and adapted to reciprocate in said recess 352 and extending through the top of said plunger and having a reduced upper end 357 protruding within the slot 355 of the head. The upper end 357 is pivoted by a pin 358 to the forked end 344 of the lever 341 which also extends within the slot. The said plunger rod 356 is provided with an enlarged or body portion 359 fitting snugly within the recess 352 and having a flat reduced end 360 provided with a slot 361 therein.

The lower end of said supporting sleeve 350 is transversely slotted as at 362 forming side walls 362' joined together by a base 363 and having extensions 364 to which is pivoted, as at 365, a bell-crank lever 366 having a forked portion 367 receiving the flat reduced end 360 of the plunger rod and pivoted thereto and to the sides 362' of the slot 362 by a pin 368 which extends through the slot 361 in the reduced end 360. Said bell-crank lever is provided with a downwardly depending pintle-backer actuating arm 369 fitting within an opening 370 (Fig. 72) of a pintle-backer block 371. Said block 371 is slidably mounted on the base 363 intermediate the side walls 362' of the slot 362 and is provided with projecting arms 372 adapted to engage the pintle adjacent the ends thereof which extend through the perforations 6 in the rear wall of the box-body. Obviously, a vertical reciprocation of the plunger rod 356 rocks the bell-crank lever 366 on its pivot 365 thus causing the actuating arm 369 to horizontally reciprocate the pintle-backer block 371 on the base 363. The plunger 350 is provided at the bottom of the recess 352 with a shoulder 373 acting as a stop to limit the downward movement of the plunger rod.

Encircling the plunger rod 356 and within the recess 352 is a compression spring 374 engaging the upper wall of the recess as well as the enlarged body portion 359 of the plunger rod and it tends by its action to force the plunger rod into downward position from its raised or inoperative position in which it is normally held by the lever 341. A vertical spindle 375 is fastened to the cap or head 353 and is loosely supported in a bearing 376 integral with a bearing-arm 377 mounted on and secured to the outwardly extending arm 349. 378 indicates a compression spring interposed between said bearing 376 and the top of the cap or head 353 the action of which is to force the plunger 351 bodily downwardly. After the box-body has had the pintle 8 inserted therein it is carried by the body disc, which is being rotated intermittently through 36° as has been explained, through two idle "stations" (see Fig. 1) where no operation is performed on said box-body. The partial rotation of the body disc through an additional 36° thereupon carries the box-body directly beneath the pintle-backer plunger 351 which is held in raised position by the lever 341. The cam action of the face cam 348 then rocks said lever 341 on its pivot permitting the spring 378, which has been considerably compressed between the cap or head 353 and the bearing 376 and which is of sufficient strength to overpower the spring 374 to force the plunger 351 downwardly into the box-body, the spring 374 thereupon acting to force the plunger rod 356 downwardly. This swings the bell-crank lever 366 in a counter-clockwise direction (Fig. 67) on its pivot 365 to slide or move the pintle-backer block 371 forwardly on the base 363 whereby the projecting arms 372 of said pintle-backer block will engage the pintle 8 adjacent both ends thereof, which extend through the perforations 6 in the rear wall of the box-body and will push the pintle forwardly into the pintle-ears or bearings 7 and from its engagement with the depression 5 of the box-body (Fig. 68), the box-body at the same time being held from forward movement in its nest by the angle-hooks 93.

The pintle is held or backed in the position just described by the action of the spring 374 while the hinging operation is partially taking place, which will be presently described, the action of the spring 378 holding the plunger 350 in downward or lower position. After the partial completion of the hinging operation the cam action of the face cam 348 rocks the lever 341 to cause the same to positively raise the plunger rod 356 against the action of its spring 374, to raise or lift the plunger 350 against the action of spring 378 and to hold the parts in raised position until another box-body has been carried beneath said plunger, whereupon the same operations are repeated in the same sequence.

379 indicates the vertical members of an open frame which are fastened to the table 14 by suitable screws as shown and which are connected by the horizontal member 380 (Figs. 3, 49 and 50). Screwed to said horizontal member 380 is the base 381 of the box-cover channel or chute the sides of which comprise the upper ends of said vertical members 379 and said upper ends being provided with overhanging flanges 382 whereby guides are formed for the box-covers. Mounted on suitable roller-supports 383 on the left of the box-cover channel adjacent the ends thereof and intermediate said ends are flanged rollers 384 connected by an endless belt 385. The belt 385 passes along the left-hand side of the channel or chute beneath its overhanging flange 382.

Bolted to the table 14 is a bracket 386 having parallel upper and lower horizontal arms 387 and 387' respectively supporting and acting as bearings for a vertical shaft 388 which is mounted therein. (Figs. 3, 6, 48, 49 and 50.) A gear 389 and a sprocket 390 are carried by said shaft 388. Said gear 389 meshes with a gear 391 mounted on the table 14. The shaft 388 also carries a flanged roller 392 which is fast thereon and terminates in a head 393 having an upstanding neck 394 provided with an actuating finger 395 extending outwardly therefrom. At the right-hand side of the box-cover channel or chute adjacent the forward end and center thereof are roller supports 396 on which are mounted the flanged rollers 397. Said flanged rollers and the roller 392 are connected together by an endless belt 398 which extends along the right-hand side of the channel or chute beneath its overhanging flange. The shafts carrying the flanged rollers 384 and 397 at the forward end of the channel are interconnected by a crossed belt 399 whereby motion is imparted to both endless belts when the vertical shaft 388 is rotated and in an obvious manner.

400 indicates a vertical U-shaped bracket bolted to the table 14 and in the arms 401 of which is mounted a vertical shaft 402, said arms acting as bearings for the shaft. The shaft is capable of partial rotation as well as vertical reciprocation in its bearings and the lower end thereof is beveled as at 403. A block 404 is fastened to said shaft 402 and it carries a horizontal operating arm 405 provided with an extension 406 which is slotted as at 407 (Figs. 6, 48 and 50). A lever 408 is pivotally mounted as at 409 within said slot 407 and its free end carries an adjustable screw 410 extending through the slot with the head thereof spanning the same thereby limiting the downward movement of the lever on its pivot. 411 indicates a spring fastened to the extension 406 and bearing against the lever 408 and tends by its action to retain the lever in lower position as shown in Fig. 50 with the head of the screw 410 engaging the extension 406.

A vertical rod 412 is mounted in the end of the operating arm 405 and is vertically adjustable therein. The lower end of said rod 412 carries a square feed block or shoe 413. 414 indicates a compression spring encircling the shaft 402 one end of which is fastened to the upper arm 401 of the bracket 400 and the other end of which is fastened to the block 404. The action of said spring tends not only to force the rod 402 downwardly but to swing and retain the operating arm 405 towards the front of the frame so that the feed block or shoe 413 engages a stop 415 which is secured to one side of a flanged extension 415' of the channel or chute 381 (Fig. 53).

A cam support 416 is fastened to the table 14 beneath the arms 401 of bracket 400. Pivotally secured to said cam support by a screw-threaded pivot 417 is a cam plate 418 having a beveled or cam face as illustrated (Fig. 50) which is at all times engaged by the lower beveled end 403 of the shaft 402. Said cam plate 418 carries a gear 419 meshing with the gear 391.

Bolted to the right-hand side 16 of the frame (Fig. 3) is a bracket 420 having arms 421 constituting bearings for a vertical shaft 422 which is mounted therein. Said shaft 422 carries a bevel gear 423 on its lower end which meshes with a bevel gear 424 carried on the end of the right-hand shaft 30. Fastened to the upper end of said vertical shaft 422 is a sprocket 425 which is connected to the sprocket 390 by an endless chain 426.

From the foregoing description and the interconnection of the various parts it will be obvious that a rotation of shaft 30 will effect a rotation of the shaft 388 and of the cam plate 418. The operation of the other various parts described is obvious and requires no detailed description and they are acted on and move in substantially the same manner and have the same function as the corresponding parts for the box-bodies and as previously described. The box-covers are placed in the channel or chute 381 with the upwardly extending flange 11 thereof facing the front of the frame as shown in Figs. 49 and 50 and they are fed forwardly in the channel by the frictional engagement of their sides with the belts 385 and 398. When they reach the end or flanged extension 415' of the channel they are held momentarily by the hooked end of a stop 427 which is pivoted to the channel as at 428 and which is held in normal position by a spring 429 fastened to the under side of the channel and bearing against an adjustable screw 430 carried by said stop.

The feed block acts to feed the box-covers forwardly progressively and intermittently to their respective nests, the construction of which will be presently described, in precisely the same manner as the feed block 114 for the box-bodies. The path of motion of said feed block 413 is a rectangular one as in the previous case and is downwardly into the box-cover, forwardly against the action of the spring 429 and over the stop 427 and carrying the box-cover with it to the nest of the box-cover, upwardly and then rearwardly to its first position. The feeding is accomplished as in the case of the box-bodies by a single positive drive which drive also acts simultaneously to carry the box-covers forwardly in their channel.

431 indicates the side wall and 432 the base of an enclosure preferably integral with the table 14 of the frame and provided with supporting ribs 433 connecting with said table (Figs. 2 and 18). Said enclosure is provided with a central hub 434 supporting a fixed shaft 435 on the upper end of which a rotatable disc 436 is mounted hereinafter called the box-cover disc or cover disc. The shaft also carries at its upper end a plate 437 counter-sunk in an upper stationary annular plate 438 while the lower screw-threaded end of the shaft is provided with nuts 439 bearing against the underside of the base 432.

The cover disc is provided with a plurality of annular openings 440 extending therethrough, preferably eight in number, and equidistantly spaced apart. Said openings are shouldered as at 441 and each receives the body portion 442 of a box-cover holder or "unit", said body having a corresponding shoulder normally engaging the shoulder 441 (Figs. 2, 49, 67 and 69). 443 indicates the shank of the box-cover holder which is preferably integral with the body portion 442 and which extends downwardly within the enclosure 431. Said shank is slotted as at 444 and the end thereof is cut out to provide a hooked end 445. The body 442 is transversely slotted to provide an upper U-shaped end with parallel arms 446 (Fig. 52). Pivoted within said slot and to the arms 446 by pivot 447 is the head 448 of the box-cover holder. Said head is provided with flanged guides 449 forming a slot therebetween, said flanged guides receiving an interfitting and correspondingly flanged base 450 of a slidable plate 451. 452 indicates stops on the top of the flanged guides 449 which are adapted to engage the forward portion of slidable plate 451 to limit its backward sliding movement on the head 448.

The forward portion of the slidable plate 451 is considerably wider than the rear portion (Fig. 70) thereof and is provided with a cover-holding nest 453 (Figs. 48 and 49) having a rear block 454 fastened therein and comprising the rear wall of the nest as well as the female die for the first cover operation to be presently described. The nest is provided at either side thereof with a slotted block 455 which blocks are fastened to the plate 451. Extending through the slots of said blocks 455 are positioning plates having rear stops 456 and overhanging guide flanges 457. The ends of said positioning plates are adapted to engage and support a box-cover when said box-cover is in position in the nest with the overhanging guide flanges 457 extending over and engaging the tops of the side walls of the box-cover as shown in Figs. 48, 49 and 70. 458 indicates tension springs which are fastened to the blocks 455 and to the stops 456 and act to retain the ends of the positioning plates in engagement with the sides of the box-cover whereby the box-cover will be firmly held in the nest.

Extending vertically through each body portion 442 is a rod 459 having an upper flattened or reduced end 460 and lower forked end 461. The upper reduced end 460 extends upwardly into the transverse slot intermediate the arms 446 of the body and into a slot 462 with which the head 448 is provided, said slot 462 forming side arms 463 each having a slot 464 extending therethrough. The end 460 carries a pin or pivot 465 extending through the slots 464 of said side arms 463 (Fig. 52). The lower forked end 461 of the rod 459 receives a flattened rod 466 provided with a slot 467. 468 indicates a pin extending through the slot 467 and fastened to the members comprising the forked end 461.

Each of said rods 466 is pivoted as at 469 to a downwardly depending angle support 470 screwed in the lower side of the cover disc 436 adjacent an annular opening 440. The inner end of said rod 466 carries a roller 471 which engages the upper flange 472 of a continuous annular wall 473 the lower flange 473' of which is bolted to the base 432 of the enclosure. The height of said annular wall 473 gradually increases at the rear of the enclosure as shown in Figs. 2 and 52 and it is provided at this point with a lower rim 474 screwed thereto (Figs. 2 and 67) which forms with the upper flange 472 a slot 475 for the roller 471 whereby the rod 459 may be raised in the body 442 to be hereinafter described.

Bolted or screwed to the base 432 of the enclosure is a locking plate 476 (Figs. 18 and 67) adapted to be engaged by the hooked end 445 of the shank 443 of the box cover holder. 477 indicates a downwardly depending arm fastened to the underside of the table to which is pivoted as at 478 a lifting rod or lever 479 for the box-cover holder (Figs. 18, 19 and 67). Said lever extends through an opening 480' in the side wall 431 of the enclosure and the forward end 479′ thereof is adapted to engage the lower hooked ends 445 of the shanks 443. The rear end of the lever 479 carries a roller 480 engaging the face of a step cam 481 carried by the main driving shaft 19.

When the box-cover holders are in normal or horizontal position or that position shown in Fig. 49 to have the box-covers fed to the nests 453 thereon, the head engages the shoulder 441 of the opening 440, the rod 459 is in lower position and the rear end of the head 448 engages a flat extension 482 with which the head is provided. The slidable plate 451 is also in its rear position and engages the stops 452 on the flanged guides 449. Each of said slidable plates it will be noted is provided with a roller 483 mounted on the top thereof.

The periphery of the cover disc 436 is provided with eight sets of upper and lower notches 484 and 485 respectively, which sets are equidistantly spaced apart. (Figs. 6, 7 and 9.) A crank 486 (Figs. 2, 3, 6 and 7) is connected to the right-hand shaft 30 in the usual manner. The connecting rod 487 of said crank is pivotally connected with a link 488 fulcrumed as at 489 to a downwardly depending arm 490 bolted or otherwise secured to the underside of the table 14. The upper end of said link 488 is slotted as at 491 and is connected by a pin 492 which extends through said slot with a cross-head 493 adapted to be reciprocated in a flanged guideway 494 secured to the upper wall or table of the frame. Pivotally held to the cross-head 493, as by the screw-threaded pivot 495, is a driving lever 496 having a hooked end 497 lying in the same horizontal plane as the plane of the lower notches 485 of the cover disc.

A guide plate 498 is screwed to the top of the table 14 and is adapted to prevent the driving lever 496 from being forced upwardly during its driving operation. 499 indicates a spring carried by said guide plate 498 and bearing against the side of the lever 496, its function being to retain the hooked end 497 of said lever in engagement with the periphery of the cover disc 436 or one of the lower notches 485 thereof.

The cover disc is driven by the crank 486 in a counter-clockwise direction and for each revolution of the crank, the cover disc rotates one-eighth of a revolution or 45°. When the shaft 30 is rotated, the crank 486 revolves thereby forcing or moving the cross-head 493 forwardly in the guideway 494 and causing the lever 496 to partially rotate the cover disc due to the engagement of the hooked end 497 of said lever with a lower notch 485. Upon the return stroke of the crank the hooked end 497 is carried along the periphery of the cover disc by the action of spring 499 and it is then forced into the next succeeding lower notch 485 and same operation repeated.

As in the case of the body disc it is important that the cover disc should be positively locked for each partial rotation thereof through 45° so that the covers may be accurately brought into the proper position while the several operations are performed thereon to be presently described. I have therefore provided a lock which releases the cover disc at or immediately prior to every stroke of the crank 486 and which positively locks the cover disc from further movement after it has been partially rotated the predetermined distance.

Referring more particularly to Figs. 6, 9 and 10, a flat locking bar is indicated at 500 and the forward end thereof is adapted to enter the upper notches 484 in the cover disc to lock said cover disc against movement. Said locking bar is slidably mounted in a supporting casing 501 the lower portion of which is slotted as at 502. 503 indicates a pin carried by said bar which extends within said recess 502 and to which is fastened a compression spring 504 and backing up against the rear wall of said recess. The said spring acts, obviously, to force the end of the bar into engagement with the periphery of the cover disc or one of the notches 484.

Pivoted as at 505 to a downwardly depending bracket or support 506 which is fastened to the underside of the table 14 is an actuating lever 507 which extends through a slot 508 in the table and enters a slot 509 in the end of the locking bar 500. A cam rod 510 is pivoted to the lower end of said lever 507 and said cam rod carries a fork 511 the arms 512 of which straddle the main shaft 19 intermediate a collar 513 and a face cam 514. Said face cam is provided with a cam slot 515 engaged by a roller 516 carried by the fork 511.

The parts just described are so timed that immediately prior to the forward movement of the cross-head 493 and the consequent partial rotation of the cover disc by the driving lever 496 as has been explained, the actuating lever 507 is rocked on its pivot 505 by the cam action of the roller 516 in the cam slot 515, thereby positively withdrawing the end of the locking bar 496 from its engagement with an upper notch 484 into the position shown in Figs. 6 and 9 and against the action of the spring 504. After the cover disc has begun its partial rotation but before it has completed said rotation the predetermined distance, the lever 507 is rocked by the cam action hereinbefore described in an opposite direction, thereby permitting the spring 504 to project the bar 500 forwardly so that the end thereof engages the periphery of the cover discs and rides against said periphery until the succeeding notch has been reached and the partial rotation of the cover disc has been completed, whereupon the end of the bar is projected by the spring into said succeeding notch in an obvious manner to lock the cover disc against further movement until the end of the bar is again withdrawn in the manner described.

Bolted to the table 14 on the righthand side of the frame is a post or standard 517 in front of which and over the cover disc is a stationary supporting sleeve 518 carried by a vertical arm 519 which is likewise bolted to the table (Figs. 2, 3, 6, 55 and 56). Fulcrumed to the upper forked end of said post or standard 517 as at 520 is an actuating lever 521 the rear end of which is pivoted as at 522 to an eccentric rod 523 connected to an eccentric strap 524 which is bolted to an eccentric 525 mounted on the right-hand shaft 30. A reciprocating plunger 526 provided with a recess 527 therein is mounted on said sleeve 518. The lower end of said plunger is forked (Fig. 58) to form depending parallel arms 528, 529 connected by a base 530.

A plunger head or cap 531 is removably fastened to said plunger by suitable screws 532. Said head is slotted as at 533 which slot receives a reduced forward end 534 of the actuating lever 521. A vertical spindle 535 is secured to said head and carries a cross-arm 536 to the end of which tension springs 537 are fastened, which are likewise fastened to the stationary sleeve 518 (Fig. 2). The action of said springs tends to force the plunger 526 downwardly in the supporting sleeve 518 and to retain the same in lower position.

Extending longitudinally through said plunger 526 is a plunger rod 538 the upper end of which extends through the head or cap 531 and into the slot 533. The lower end of said plunger rod is flattened as indicated at 539 and it extends within the slot intermediate the parallel arms 529, 530 of the plunger 526. Encircling said plunger rod within the recess 527 is a compression spring 540 bearing against a collar on the plunger rod as well as against the lower wall or base of the recess 527. Said spring tends by its action to retain the plunger rod in elevated or raised position within the plunger as shown in Fig. 55.

A bell-crank lever 542 is pivoted as at 543 to and intermediate the arms 528, 529 of the plunger 526. The horizontal arm of said lever is forked to form members 544 receiving the flattened end 539 of the plunger rod 538 therebetween. The arms 528, 529 of the plunger 526, the flattened end 539 of the plunger rod 538 and the members 544 of the lever are connected by a pin or pivot 545 extending through slots 546 with which the members 544 are provided whereby the bell crank lever may be rocked on its pivot 543 in an obvious manner.

The vertical arm of said bell-crank lever 542 terminates in a lower solid head 547 fitting within a slot or opening 548 of a male die 549 which is horizontally slidably supported on the base 530 (Figs. 55 to 59 inclusive). The said male die is provided with a punch member or protuberance 550 adapted to enter a corresponding depression (not shown) in the rear block or wall 454 of the nests 453, said rear block acting as a female die.

When the box-covers are fed to the nests on the cover disc and said disc is rotated in a counter-clockwise direction as has been explained, the nests holding the covers are brought into vertical alignment with the plunger 526 and the cover disc is locked momentarily before being again rotated through an angle of 45°. The eccentric action of the eccentric 525 thereupon rocks the actuating lever 521 forwardly on its pivot 520 thus permitting the springs 537 to force the plunger 526 downwardly from the position shown in Fig. 55 and into the box-cover. The reduced end 534 of the actuating lever 521 thereupon bears against the plunger rod 538 forcing the same downwardly by the aforesaid eccentric action on the plunger 526 against the action of the compression spring 540. This rocks the bell-crank lever 542 on its pivot 543 as shown in Fig. 56 to slide or force the die 549 forwardly on the base 530 and pressing the punch member or protuberance 550 of the die into the metal of the front wall of the box-cover. The tit 13 (Fig. 60) on the front wall of said box-cover is thus pressed out, which tit enters in the depression on the rear block or wall 454 of the nest 453. When the box-body and box-cover are joined together to form the completed box the tit 13 thus formed is adapted to frictionally engage the corresponding tit 3 on the box-body to form a clasp for the box.

After this first operation has been performed on the box-cover the actuating lever 521 is rocked in an opposite direction by the eccentric action of the eccentric 525. This permits the plunger rod 538 to be raised by the action of its own spring 540 into elevated position within the plunger 526 which obviously rocks the bell-crank lever 542 in an opposite direction on its pivot 543 to slide the die 549 on the base 530 backwardly into normal position. The aforesaid eccentric action then raises the end 534 of the actuating lever 521 carrying the plunger 526 bodily with it, said plunger being brought or carried into elevated or inoperative position against the action of the springs 537.

551 indicates a vertical post or standard bolted to the table 14 (Figs. 2, 3, 6 and 61). A stationary supporting sleeve 552 provided with vertical supporting arms 553 which may be integral with the post 551 is suspended over the box-cover disc as illustrated. Fulcrumed to the upper forked end of said post 551 as at 554 is an actuating lever 555 provided with a reduced forward end 556. The rear end of said actuating lever is pivoted as at 557 to a vertical cam rod 558 carrying a fork 559, the arms 560 of which straddle the right-hand shaft 30 intermediate a face cam 561 and a collar 562 which are carried by said shaft 30. Said face cam 561 is provided with a cam slot or groove 563 engaged by a roller 564 mounted on or carried by the fork 559.

565 indicates a plunger which is supported by and capable of reciprocation in said supporting sleeve 552. Said plunger is provided with a recess 566 and a slot 567 in its side wall and communicating with said recess. (Fig. 62.) A cap or head 568 is removably fastened to said plunger 565 by screws 569 and it is provided with a slot 570 receiving the end 556 of the actuating lever 555. A vertical spindle 571 (Figs. 2 and 61) is fastened to said cap or head 568 and it carries a cross-arm 572 the ends of which are connected to the supporting sleeve 552 by the tension springs 573.

Mounted in the plunger 565 is a plunger rod 574. Said rod extends upwardly through the cap or head and into the slot 570. The lower end 575 of said rod is beveled and is provided with a flat side 576. A compression spring 577 encircles said plunger rod within the recess 566 and bears against the base of said recess and against a collar 578 on said plunger rod and its action obviously is to retain said rod in elevated or raised position. Mounted in said collar 578 is a horizontal pin or key 579 the end of which engages the slot 567 and prevents said plunger rod 574 from rotation in said plunger 565 but at the time permits vertical reciprocation thereof.

The lower end of the plunger 565 is slotted as at 580 to form downwardly depending arms 581, 581' which are transversely slotted as at 582 at or adjacent the center of their lower extremities as shown in Figs. 62 and 64. The beveled end 575 of the plunger rod 574 extends within said slot 580. 583, 584 indicate die-holding jaws which have secured by screws, as shown, to the lower ends of said jaws in suitable depressions the male and female dies 585, 586 respectively, which are thus mounted on said jaws in juxtaposition. The operating face of the male die 585 is provided with tapered meeting sides 587 while the female die is provided with correspondingly shaped inwardly extending meeting faces to form a groove 588 adapted to interfit with the sides 587 of the male die (Fig. 65).

The said die-holding jaws 583, 584 are forked at their upper ends and have pivoted thereto rollers 589 and 590 respectively engaging the beveled end 575 of the plunger rod 574. The jaws are also provided with interfitting hinged extensions 591 joined together by a pivot 592 extending therethrough which pivot is also held in the downwardly depending arms 581, 581' of the plunger as shown in Fig. 64. The die-holding jaws are also connected together by a tension spring 593 the ends of which are fastened to pins 594 mounted in openings 595 with which the jaws are provided. Said spring tends by its action to retain the rollers 589, 590 in engagement with the lower beveled end 575 of the plunger rod 574 so that the lower ends of said jaws carrying the dies 585 and 586 will be spread apart when the plunger rod is in raised position.

When a box-cover is carried in its nest beneath the plunger 565 it is held there momentarily while the second operation is performed thereon and before the cover disc is rotated through a further angle of 45°. The plunger is then in raised and inoperative position shown in Fig. 61 in which it is held by the actuating lever 555. The cam action of the roller 564 in the cam slot or groove 563 of the face cam 561 then immediately rocks the actuating lever 555 on its pivot 554, thereby permitting the springs 573 to force or draw the plunger 565 bodily downwardly within the supporting sleeve 552 whereby the rear wall of the box-cover or that wall provided with the flange 11 will enter the slots 582 in the lower ends of arms 581, 581' of the plunger and will likewise be interposed between the jaws 583, 584 and the dies 585 and 586 carried thereby. The cam action just referred to then causes the reduced end 556 of the actuating lever to force the plunger rod 574 downwardly within the plunger against the action of its spring 577. This rocks the jaws on the pivot 592 due to the engagement of the rollers 589, 590 with the lower beveled end of the plunger rod whereby the lower ends of said jaws carrying the dies 585 and 586 are brought together against the flange 11 of the box-cover and against the action of the spring 593.

It will be noted that when the jaws are closed in the manner just described the jaw 584 carrying the female die 586 acts before the jaw 583 carrying the male die 585 due to the flat side 576 of the beveled end 575 of the plunger rod which is engaged by the roller 590. This precludes the possibility of the interlocking or catching of the dies with each other or with the flange 11 on the box-cover particularly after the completion of the operation and when the parts are returned to normal and inoperative position. The plunger rod 574 is prevented from rotation by the pin 579 and slot 567 connection previously described so that the roller 590 will always engage said flat side 576 for each operation. The closing of the jaws, as is obvious, presses the dies together against either face of the rear wall of the box-cover, thereby turning the lower portion of the flange 11 of said box-cover diagonally outwardly away from said cover and the upper portion diagonally inwardly as shown in Fig. 66 due to the configuration of the operating faces of the male and female dies as previously described.

Upon the completion of this second operation or flange turning operation on the box-cover, the aforesaid cam action rocks the actuating lever 555 in an opposite direction on its pivot and permits the spring 577 to raise the plunger rod 574 upwardly. This permits the jaws to open by the action of the spring 593. Continued movement of the actuating lever in the same direction causes the end 556 thereof to lift or raise the plunger 565 bodily against the action of the spring 573 into extreme upper and inoperative position shown in Fig. 61.

A flattened actuating lever for the slidable plates 451 of the box-cover holders is indicated at 596 (Figs. 3 and 6). The fulcrumed portion of said lever is half-turned as at 597 and is pivoted to the inclined face of a post 598 which is fastened to the table 14. The rear end of the lever is provided with a roller 599 engaging the sides of a cam slot 600 of a drum cam 601 mounted on the upper rear shaft 22. The forward end 602 of said lever is squared or thickened and is provided with a circular groove 603 in its under-side (Figs. 2, 67, 69, 70 and 73). Said groove is adapted to receive the rollers 483 on the slidable plates whereby said plates will be reciprocated on the heads 448, when the shaft 22 rotates, by the cam action of the roller 599 of the actuating lever 596 in the cam slot 600.

Referring particularly to Figs. 2, 6, 67, 69, 74, 74ª and 70, 604 indicates a vertical post mounted in the table 14 the upper U-shaped end of which has pivoted therein as at 605 a box-cover supporting lever 606 having an upturned end 607 adapted to engage the underside of the box-cover 9 adjacent the rear side of said box-cover or that side provided with the upstanding flange 11 as shown. Said post 604 is provided with a stroke-regulating arm 608 acting as a stop to limit the rocking movement of said lever 606 on its pivot. A rod 609 is likewise fastened to or mounted in the table 14 and the upper end extends freely through an opening 610 adjacent the rear end of said supporting lever 606. A light compression spring 611 encircles said rod 609 and engages the table 14 and the underside of the lever 606.

612 indicates a rod the upper end of which is rigidly secured to an extension 613 fastened to the pintle-backer actuating lever 341. The lower end of the rod 612 is slotted to form members 614 spanning the lever 606. Said members 614 have lugs or rigid flanges 615 secured thereto which provide seats or supports for a washer 616 carried by said rod 612. A compression spring 617 encircles said rod and bears against the extension 613 and the washer 616 and when compressed acts to rock the supporting lever 606 on its pivot to raise the upturned end 607 thereof.

A bracket 618 is also fastened to the lever 341 and has secured thereto a rigid supporting barrel 619 holding a box-cover pressing rod 620 having a headed end 621 fitting within a recess 622 with which the tube is provided and normally engaging the base thereof, which acts as a stop to limit the downward movement of said rod. The said barrel 619, as shown in Fig. 69, extends diagonally downwardly in front of the supporting sleeve 350 at an angle from the vertical. A compression spring 623 engages the top of said recess 622 and the head 621 and tends by its action to retain the rod 620 in its lowest position.

After the second operation on the box-cover has been completed, that is, the turning of its flange 11 in the proper directions, it is carried through two idle "stations" where no operation is performed thereon (Fig. 6). When it reaches the first of said idle "stations" or that one directly opposite the box-cover channel or chute 381, the roller 471 on the end of flattened rod 466 engages the slot 475 of the annular wall (Figs. 2, 52, and 67). Upon the rotation of the cover disc 436 the rod 466 thus is swung upwardly on its pivot, thereby raising the rod 459 within the body portion 442 of the box-cover holder in an obvious manner. This swings the head 448 upwardly on its pivot 447 due to the pin 465 and slot 464 connection between the head and the rod 459, forcing it to assume a position inclined from the horizontal. Simultaneously, however, the hooked end 445 of the shank 443 of the box-cover holder engages the locking plate 476 which prevents the body 442 from also being raised when the rod 459 is raised.

When the cover has been carried to that "station" directly opposite the supporting sleeve 350 of the pintle-backer plunger for the box-body, the roller 471 is on the high point in the slot 475 and the rod 459 is in extreme upper position where it is momentarily held against vertical movement as either end of the flattened rod 466 is temporarily "fixed" to substantially "lock" it against such movement. Meanwhile the hooked end 445 of the shank 443 has become released from engagement with the locking plate 476 to permit the body portion 442 to be raised as will be described and said hooked end then receives the reduced end 479' of the actuating lever 479.

As the cover is being brought directly opposite the pintle-backer "unit" the roller 483 enters the groove 603 in the underside of the squared end 602 of the actuating lever 596. When the cover is directly opposite said "unit," said actuating lever is rocked on its pivot by the cam action of the roller 599 in the cam slot 600 of the drum cam 601. This draws the slidable plate forwardly on the head 448 and into the position shown in Fig. 67 with the box-body and box-cover in juxtaposition and with the cover at an angle to the horizontal, whereby the upstanding flange 11 thereof is directly beneath the pintle 8 of the box-body. The pintle-backer actuating lever 341 is thereupon rocked on its pivot in the manner previously described to push the pintle 8 forwardly or "back" it away from engagement with the depressed portion 5 of the box-body and to momentarily thus support it (Fig. 64).

The rocking of the actuating lever 341 on its pivot to actuate the pintle-backer lowers that end of said lever 341 adjacent said pintle-backer. This obviously forces the rod 612 downwardly to compress its spring 617 and permit said spring to force the washer 616 against the box-cover supporting lever 606 whereby said lever will be rocked on its pivot 605 against the action of the light compression spring 611 and will force the upturned end 607 thereof to engage and support the box-cover adjacent its rear side. Moreover, simultaneously, the cover presser rod 620 is brought into engagement with the inner side of the box-cover against the action of its spring 623 as the barrel 619 is also lowered with the lowering of the end of the actuating lever 341.

When the above described operations have taken place the lifting rod or lever 479 is rocked on its pivot 478 due to the engagement of its roller 480 with the step cam 481. This raises the reduced end 479' thereof which lifts the box-cover holder bodily and from its normal position in engagement with the shoulder 441 on the opening 440, (Fig. 69) as said reduced end then engages the hooked end 445 of the shank 443. The head 448 is likewise raised with the body 442 but as the rod 459 is then temporarily "fixed" as has been described, the head 448 is swung or rocked slightly in a clockwise direction on the pivot 465. This double movement of said head brings or slips the flange 11 of the box-cover behind the pintle 8 of the box-body and intermediate said pintle and the depressed wall 5 of the body, the pintle having been pushed or backed away from the depressed wall in the manner previously described (Fig. 71). The rocking of the head on the pivot 465 at this point is made possible as there is a slight clearance between the roller 483 and the groove 603 in the end of the actuating lever 596.

The box-cover having been connected or partially hinged to the box-body as previously described, the slidable plate actuating lever 596 is thereupon rocked in an opposite direction on its pivot and the slidable plate 451 is drawn rearwardly on the head 448 into engagement with the stops 452 due to the engagement of the roller 483 with the groove 603. This draws the cover from its nest as is obvious, as the cover has been connected to the box-body. The spring-pressed rod 620 is at the same time pressing the cover downwardly, which, when the cover is free from its nest, has the effect of assisting or forcing the flange 11 of the cover completely behind the pintle 8 in the event that it has become caught and only partially moved in the connecting operation previously described. The cover meanwhile is being supported by the upturned end 607 of the supporting lever 606 which at this moment acts as a fulcrum on which the cover swings and which prevents the pressing action of the rod 620 from disconnecting the cover from the body. The cover is pressed downwardly by the rod 620 into substantially horizontal position shown in dotted lines in Fig. 69 and it engages the head of the box-cover holder.

Meanwhile the actuating lever 479 is rocked in an opposite direction on its pivot by the aforesaid cam action to lower the body 442 of the box-cover holder into engagement with the shoulder 441 in the opening 440 in an obvious manner. This carries the head 448 downwardly with it and as the rod 459 is still fixed, said head is rocked slightly on the pivot 465 in a counter-clockwise direction. The pintle-backer actuating lever 341 is then rocked in an opposite direction on its pivot by the cam action of its roller in the face cam 348 to return the pintle-backer parts to normal position. The rocking of the lever 341 in this direction raises the end of the lever adjacent the pintle-backer and the barrel 619 with it and consequently releases the presser rod 620 from engagement with the inside of the cover. The raising of said end of said lever 341 also carries the rod 612 upwardly with it, thereby permitting the washer 616 to engage its flanges 615 and permitting the spring 611 to rock the supporting lever 606 on its pivot 605 whereby the upturned end 607 will be released from supporting engagement with the underside of the box-cover and will be brought to its lower inoperative position.

Both discs are thereupon partially rotated the predetermined distance in opposite directions and the same operations repeated to connect another box-body and box-cover which are brought into juxtaposition. The rotation of the box-cover disc causes the roller 471 of the rod 466 of the box-cover holder from which the cover has been withdrawn to again travel in the slot 475, the direction of which slot is diagonally downwardly from this point. This lowers the vertical rod 459 in an obvious manner and causes the head 448 to rock in a clockwise direction on its pivot 447 so that when the box-cover holder has again been carried by its disc to the "station" in front of the cover channel 381, the head 448 is perfectly horizontal and engages the flat extension 482 of the head 448. The box-cover holder is then ready for having another cover fed thereto and the same operations in the same sequence are again performed as respects said new cover.

Referring particularly to Figs. 1, 3, 4, 19ª, 75 to 81 inclusive and 86, 624 indicates a post or standard bolted to the table provided with a supporting arm 625 to which is fastened a stationary supporting sleeve 626. The upper end of said post is forked and has fulcrumed thereto as at 627 an actuating lever 628 provided with a forward reduced end 629. The rear end of said lever is pivoted as at 630 to a cam rod 631 extending downwardly through a slot 632 in the table. Secured to the lower end of said cam rod is a fork 633 the arms 634 of which straddle the lower front shaft 37 intermediate a double-faced cam 635 and a collar 636 carried by said shaft. A roller 637 is carried by said fork 633 and engages a cam slot or groove 638 in one side of the cam 635.

The said supporting sleeve 626 is divided into two chambers separated by a wall 639 which is preferably integral with said sleeve. One of the chambers receives and supports a reciprocating plunger 640 recessed as at 641 and provided with a cap or head 642 removably secured thereto by the screws 643. 644 is a vertical spindle fastened to said cap or head and carrying a cross-arm 645 connected by tension springs 646 to the sides of the supporting sleeve 626. The cap or head 642 is provided with a slot 647 receiving the reduced end 629 of the actuating lever 628.

648 indicates a plunger rod extending longitudinally through the plunger and having its upper end protrude within the slot 647 in the cap or head. A compression spring 649 encircles said plunger rod within the recess 641 and bears against the base of said recess as well as against a collar 650 on said rod. The plunger rod adjacent its lower end is slotted as at 651.

652 indicates a slot extending through the lower portion of the plunger 640 and forming side members 653. The said slot 652 receives the lower end of the plunger rod 648 and is enlarged or grooved out at that portion as at 654 for that purpose (Fig. 78). Pivoted to the side members 653 adjacent their forward ends by a pivot 655 is a bell-crank lever 656. The horizontal arm of said bell-crank lever is provided with a slot 657 and it is connected to the plunger rod 648 by a pivot 658 carried by the plunger rod and which extends through a transverse slot 659 in the side members 653 and through the slot 657 in the bell-crank lever 656. The ends of said pivot 658 carry cotter pins 660 to prevent withdrawal of the pivot through the transverse slot 659. The vertical arm of said bell-crank lever terminates in a solid head 661 fitting within an opening 662 of a closing or curling die 663 having a grooved face 664. Said die is supported by a base 665 on which it is slidably mounted and which connects the forward end of the side members 654. The said side members are also provided with a transverse slot 666 substantially intermediate their ends as shown in Figs. 75 and 78.

667 indicates a vertical post or standard bolted to the table 14 at the side of the post or standard 624. Fulcrumed to the upper forked end of said post as at 668 is a lever 669 having a forward forked end 670 (Fig. 75) to which is pivoted by the screw-threaded pivot 671 a flat bending tool 672 extending downwardly through the second chamber of the supporting sleeve 626. The lower end of said bending tool is tapered as at 673. Slidably mounted in said second chamber and engaging said flat bending tool is a bar 674 provided with a slot 675 the open side of which is covered or closed by the bending tool 672. Said slot receives a compression spring 676 which engages the base thereof and is fastened to a pin 677 carried by the bending tool 672.

The rear end of the said lever 669 is pivoted as at 678 to a cam rod 679 carrying a fork 680 the arms or members 681 of which straddle the front shaft 37 intermediate a collar 682 carried by said shaft and the double-faced cam 635. The fork 680 carries a roller 683 engaging a cam slot or groove in the side of the double-faced cam 635. The bending tool 672 which is actuated by the lever 669 is provided with a shoulder 684 adapted to engage a corresponding shoulder 685 on the bar 674 when said bar is in lowest position whereby the downward movement of said bending tool 672 will be limited.

After the box-cover has been connected to the box-body in the manner hereinbefore described, the body disc is rotated another 36°. During such rotation the lower side of the box-cover is unsupported momentarily as there is a space or depression in the table at this point as indicated in Figs. 2 and 6. The cover, however, does not fall away from the body due to the peculiar configuration of the turned flange 11 which has been inserted behind the pintle 8, but it merely swings slightly on said pintle and the lower portion of the rear wall thereof engages the lower portion of the rear wall of the box-body. As the body-disc is completing said further partial rotation through 36° the box-cover again slides onto the table 14 by which it is supported. At the end of said partial rotation, when the body-disc is momentarily locked against further movement as has been explained, the box-body and the box-cover connected thereto lie directly beneath the stationary supporting sleeve 626 with the box-body in alignment with the bar 674 and the box-cover in alignment with the forward end of the plunger 640.

When the box-body with the box-cover connected thereto are in the position just described the rotation of the front shaft 37 rocks the lever 669 on its pivot 668 due to the cam action of the roller 637 in the cam slot of the double-faced cam 635. This lowers the forward end 670 of the lever 669 to force the bending tool 672 downwardly; the downward movement of said bending tool compresses the spring 676 the action of which forces the bar 674 downwardly into the box-body in an obvious manner and as shown in Fig. 75. Meanwhile the lever 628 is rocked on its pivot 627 by the cam action of the roller 637 in the cam slot or groove 638 of the said double-faced cam 635, which permits the tension springs 646 to lower the plunger 640 bodily whereby the lower forward portion of the plunger will enter the box-cover as shown in Fig. 75 and the front wall of the box-cover will enter the transverse slot 666 in the side members 664.

The continued rocking of the lever 669 in the same direction forces the tapered end 673 of the bending tool to engage the end of the turned flange 11 of the box-cover (Fig. 79) and to bend the end of said flange over (Fig. 80) at right-angles to the rear wall of the box-body or parallel to its base. The lever 669 is then rocked in an opposite direction by the aforesaid cam action to draw the bending tool 672 upwardly, the bar 674 momentarily remaining in downward position.

As the bending tool 672 is being raised in the manner described, the cam action of the roller 637 in the cam groove 638 forces the end 629 of the lever 628 to push or press the plunger rod 648 downwardly against the action of its spring 649 whereby the bell-crank lever 656 will be rocked on its pivot 655 in an obvious manner and the closing or curling die 663 will be moved forwardly on the base 665 to press the grooved face 664 thereof against the end of the bent flange 11 to close or curl said flange around the pintle (Fig. 81) to complete the hinging operation.

The lever 628 is then immediately rocked in the opposite direction by the cam action previously described which permits the plunger rod 648 to be raised within the plunger by the action of the spring 649 whereby the bell-crank lever 656 is rocked in a counter-clockwise direction on its pivot 655 to slide the die 663 backwardly into normal position on its supporting base 665. The bending tool 672 has then reached the position in its upward movement where the pin 677 engages the top wall of the slot 675 and the continuing of the raising of said bending tool thus carries the bar 674 with it and back to normal and elevated position, whereby the end of said bar will be withdrawn from the box-body. The rocking of the lever 628 in the proper direction due to the cam action previously described then bodily raises the plunger 640 into elevated and inoperative position against the action of the springs 646. The parts are then all ready for a repetition of the same movements in the same sequence when another box-body with a box-cover connected therewith are brought into the same relative position previously described by the further partial rotation of the body-disc.

A downwardly depending supporting bracket 686 is bolted to the table 14 which carries a sleeve 687 supporting a rod 688 mounted therein and extending therethrough (Figs. 11, 87, 88 and 89). Said rod 688 is provided with a collar 689 on the lower end thereof having an outwardly extending arm 690 carrying a roller 691 at the end thereof. Fastened to the upper end of said rod 688 above the plane of the table 14 is a rectangular-shaped block 692 to which is fastened an angle arm 693 the lower end of which is slotted and has pivoted therein as at 694 an ejecting finger 695. (Fig. 90). The rear side of the upper end of said ejecting finger 695 is squared as at 696 while the front side is rounded as at 697 whereby the ejecting finger may be swung in but one direction on the pivot 694.

698 indicates a flat spring fastened to the angle arm 693 and bearing against the side of the ejecting finger 695 and tends to retain said finger in vertical position. A spring 699 encircles the rod 688 intermediate the sleeve 687 and the block 692 and the ends thereof are fastened to said sleeve and block. Said spring tends by its action to partially rotate the rod 688 whereby the angle-arm 693 is swung inwardly as shown in Figs. 87 and 88. A step cam 700 is carried by the front shaft 37 and is engaged by the roller 691.

When the completion of the hinging operation has been effected in the manner described the body disc is partially rotated to bring the box-body with the box-cover hinged thereto into the position or "station" shown in Fig. 11. The roller 691 at that time engages the high point of the step cam 700 to hold the angle-arm 693 in forward position as shown in dotted lines in Fig. 87, against the action of the spring 699. The roller 94 on the end of the box-body gripper 92 then engages the underside of the overhanging plate 96 whereby the box-body gripper 92 is swung on its pivot to release the angle-hooks 93 thereof from engagement with the front wall of the box-body. When the box-body and box-cover are brought into the position just described, however, the ejecting finger 695 is not interfered with by the box-cover as said box-cover lies in a lower plane than the box-body (Figs. 85 and 89) and the box-cover moves under said ejecting finger.

The roller 691 then engages the low portion of the step cam 700 which permits the rod 688 to be partially turned or rotated by the action of the spring 699 to swing the angle arm 693 rearwardly carrying the ejecting finger 695 with it which, when it strikes the rear wall of the box-body, is "kicked up" slightly on its pivot against the action of its spring 699 and rides over said wall. When the angle-arm has reached its extreme rear position the end of said ejecting finger extends downwardly in the box-body. The roller 691 then rides into engagement with the high portion of the step cam 700, thus positively swinging the angle-arm forwardly and causing the ejecting finger to engage the rear wall of the box-body and pull said body from its nest and from the body-disc. Rotation of said body-disc after ejection of the box-body with the box-cover hinged thereto then brings the nest in front of and in alignment with the channel 98 and another box-body is fed thereto.

What I claim as my invention is:

1. In an apparatus for hinging together a body member and a cover member, means for forming pintle ears on said body member, means for inserting a pintle in said ears, means for moving said pintle forwardly in said pintle ears and from engagement with said body member and means for hinging said cover to said pintle while it is in said forward position.

2. In an apparatus for hinging together a body member having a vertical wall and a cover member having a flange, means for providing the vertical wall with pintle ears, means for inserting a pintle in said pintle ears, means for turning the flange of the cover member away from and then towards said cover member, means for inserting said turned flange behind said pintle, means for moving and holding said pintle forwardly in said ears and from engagement with the vertical wall while the turned flange is inserted therebehind and means for closing said flange around said pintle.

3. In an apparatus for hinging together a body member having a vertical wall and a cover member having a flange, a carrier for said body member, a plunger above said body member adapted to be brought into engagement with the body member and having means for pressing out pintle ears in the vertical wall thereof, means for inserting a pintle in said pintle ears, means for imparting motion to said carrier to bring the body member and cover member into juxtaposition, means for connecting the flange of said cover member to said pintle and means for closing said flange around said pintle.

4. In an apparatus for hinging together a body member having a vertical wall and a cover member having a flange, a carrier supporting said body member, a holder supporting said cover member, a reciprocating plunger adapted to be brought into engagement with said body member and having means for pressing out pintle ears in the vertical wall thereof, means for inserting a pintle in said pintle ears, means for imparting motion to said carrier to bring the body member and cover member into juxtaposition, means for moving said holder whereby said flange will be inserted behind said pintle and means for closing said flange around said pintle.

5. In an apparatus for hinging together a body member having a vertical wall and a cover member having a flange, a carrier supporting said body member, a holder supporting said cover member, a reciprocating plunger having means adapted to engage and press out pintle ears in the vertical wall of the body member, means for inserting a pintle in said pintle ears, means for imparting motion to said carrier to bring the body member and cover member into juxtaposition, means for moving said holder whereby said flange will be inserted behind said pintle and means for closing said flange around said pintle.

6. In an apparatus for hinging together a body member having a vertical wall and a cover member having a flange, a carrier supporting said body member, a holder supporting said cover member, a reciprocating plunger above said body member having means adapted to engage and press out pintle ears in the vertical wall of the body member, means for inserting a pintle in said pintle ears, means for imparting motion to said carrier to bring the body member and cover member into juxtaposition, means for turning the flange of the cover member, means for moving said holder whereby said turned flange will be brought beneath and then behind said pintle and means for closing said flange around said pintle.

7. In an apparatus for hinging together a body member having a vertical wall and a cover member having a flange, a carrier supporting said body member, a holder supporting said cover member, a reciprocating plunger carrying dies adapted to engage and press out pintle ears and perforations in the vertical wall of the body member, means for inserting a pintle in said pintle ears and through said perforations, means for imparting motion to said carrier to bring the body member and cover member into juxtaposition, means for turning the flange of the cover member away from and then towards said cover member, means for moving said holder whereby said turned flange is inserted behind said pintle, means for bending said flange and means for closing the bent end thereof around said pintle.

8. In an apparatus for hinging together a body member having a vertical wall and a cover member having a flange, a carrier supporting said body member, a holder supporting said cover member, a reciprocating plunger above said carrier and carrying dies adapted to engage and press out pintle ears in the vertical wall of the body member, means for inserting a pintle in said pintle ears, means for bringing the body member and cover member into juxtaposition, means for moving and holding said pintle forwardly in the pintle ears and from engagement with the vertical wall of the body, means for moving said holder whereby the flange of said cover member will be connected to said pintle and means for closing said flange around said pintle.

9. In an apparatus for hinging together a body member having a vertical wall and a cover member having a flange, a frame, a carrier supporting said body member, a holder supporting said cover member, a reciprocating plunger mounted on said frame, a pair of jaws pivoted together and connected to said plunger, dies mounted on said jaws adapted to engage and press out pintle ears in the vertical wall of the body member, means for inserting a pintle in said pintle ears, means for bringing the box member and cover member into juxtaposition, means for moving said holder whereby the flange of said cover member is connected to the pintle and means for closing said flange around said pintle.

10. In an apparatus for hinging together a body member having a vertical wall and a cover member having a flange, a frame, a carrier supporting said body member, a holder supporting said cover member, a reciprocating plunger mounted on said frame, means for moving said plunger into engagement with said box-body, a pair of jaws carried by said plunger and pivoted together, dies mounted on said jaws, means for actuating said jaws whereby said dies will engage and press out pintle ears in the vertical wall of the body member, means for inserting a pintle in said pintle ears, means for moving said holder whereby the flange of said cover member is connected to the pintle and means for closing said flange around said pintle.

11. In an apparatus for hinging together a body member having a vertical wall and a cover member having a flange, a frame, a carrier supporting said body member, a holder supporting said cover member, a reciprocating plunger mounted on said frame over said carrier, a plunger rod mounted in said plunger, a pair of jaws pivoted to said plunger and engaging said plunger rod, dies mounted on said jaws, means for carrying said plunger downwardly within the body member, means for actuating said plunger rod whereby said dies will engage and press out pintle ears in the vertical wall of the body member, means for inserting a pintle in said pintle ears, means for moving said holder whereby the flange of the cover member is connected to the pintle and means for closing said flange around said pintle.

12. In an apparatus for hinging together a body member having a vertical wall and a cover member having a flange, a frame, a carrier supporting said body member, a holder supporting said cover member, a reciprocating plunger mounted on said frame, a plunger rod carried by said plunger, means for holding said plunger rod in elevated position, a pair of jaws pivoted together and connected with said plunger and engaging said plunger rod, dies mounted on said jaws, a tension spring for normally holding said jaws in inoperative position, means for carrying said plunger downwardly within the body member, means for actuating said plunger rod whereby the dies will be brought together against the action of said spring and will engage and press out pintle ears in the vertical wall of the body member, means for inserting a pintle in said pintle ears, means for moving said holder whereby the flange of the cover member is connected to the pintle and means for closing said flange around said pintle.

13. In an apparatus for hinging together a body member having a vertical wall and a cover member having a flange, a frame, a carrier mounted on said frame and supporting said body member, a holder supporting said cover member, a reciprocating plunger mounted on said frame and extending over said carrier, a plunger rod carried by said plunger, means for retaining said plunger rod in elevated and inoperative position, a pair of jaws pivoted together and connected to said plunger, rollers carried by said dies and engaging said plunger rod, dies mounted on said jaws, a spring connecting said jaws and normally retaining said dies spread apart, means for actuating said plunger rod whereby the jaws will be swung on their pivot and the dies will be brought together against the action of said spring and will engage and press out pintle ears in the vertical wall of the body member, means for inserting a pintle in said pintle ears, means for moving said holder whereby the flange of the cover is connected to the pintle and means for closing said flange around said pintle.

14. In an apparatus for hinging together a body member having a vertical wall and a cover member having a flange, a frame, a carrier mounted on said frame and supporting said body member, a holder supporting said cover member, a reciprocating plunger mounted on said frame, a plunger rod carried by said plunger, means adapted to retain the plunger rod in elevated position, a pair of jaws pivoted to said plunger and engaging said plunger rod, dies carried by said jaws, an actuating lever for both raising said plunger and for actuating said plunger rod whereby the jaws will be swung on their pivot and the dies will engage and press out pintle ears in the vertical wall of the body member, means for inserting a pintle in said pintle ears, means for moving said holder whereby the flange of the cover is connected to the pintle and means for closing said flange around said pintle.

15. In an apparatus for hinging together a body member having a vertical wall and a cover member having a flange, a frame, a carrier mounted on said frame and supporting said body member, a holder supporting said cover member, a reciprocating plunger mounted on said frame, spring means for forcing said plunger downwardly into the box-body, a plunger rod carried by said plunger, jaws pivoted to said plunger, dies carried by said jaws, an actuating lever for raising the plunger and holding the same in raised position and for actuating said plunger rod whereby the jaws will be swung on their pivot and the dies will engage and press out pintle ears in the vertical wall of the body member, means for inserting a pintle in said pintle ears, means for moving said holder whereby the flange of the cover is connected to the pintle and means for closing said flange around said pintle.

16. In an apparatus for hinging together a body member having a vertical wall and a cover member having a flange, a frame, a carrier mounted on said frame and supporting said body member, a holder supporting said cover member, a reciprocating plunger mounted on said frame, spring means for forcing said plunger downwardly into the box-body, a plunger rod extending through said plunger, jaws pivoted to said plunger, dies carried by said jaws, a tension spring connecting said jaws and acting to hold them in engagement with the plunger rod, an actuating lever for raising the plunger and holding the same in raised position and for actuating said plunger rod whereby the jaws will be swung on their pivot against the action of said tension springs and the dies will engage the vertical wall of the body member between them and will press out pintle ears in said vertical wall, means for inserting a pintle in said pintle ears, means for moving said holder whereby the flange of the cover is connected to the pintle and means for closing said flange around said pintle.

17. In an apparatus for hinging together a body member having a vertical wall and a cover member having a flange, a frame, a carrier mounted on said frame and supporting said body member, a holder supporting said cover member, means connected to said frame for providing the vertical wall of the body member with a depression and with pintle ears, means for inserting a pintle in said pintle ears and in front of said depression, means for moving said holder whereby the flange of the cover is connected to the pintle and means for closing said flange around said pintle.

18. In an apparatus for hinging together a body member having a vertical wall and a cover member having a flange, a frame, a carrier mounted on said frame and supporting said body member, a holder supporting said cover member, means connected to said frame for providing the vertical wall of the body member with a depression and pintle ears, means for inserting a pintle in said pintle ears and in front of said depression, means for moving said holder whereby the flange of the cover is connected to the pintle and means for closing said flange around said pintle.

19. In an apparatus for hinging together a body member having a vertical wall and a cover member having a flange, a frame, a carrier mounted on said frame and supporting said body member, a holder supporting said cover member, means connected to said frame for simultaneously providing the vertical wall of the body member with a depression and with perforations and pintle ears at either side of said depression, means for inserting a pintle through said perforations and in said pintle ears in front of said depression, means for moving said holder whereby the flange of the cover is connected to the pintle and means for closing said flange around said pintle.

20. In an apparatus for hinging together a body member having a vertical wall and a cover member having a flange, a frame, a carrier mounted on said frame and supporting said body member, a holder supporting said cover member, means for providing the vertical wall of the body member with a depression and with pintle ears at either side of said depression, means for inserting a pintle in said pintle ears, means for moving said pintle forwardly in said pintle ears and from engagement with said depression and holding it in this position, means for moving said box-cover holder whereby the flange of the cover is inserted intermediate the depression and the pintle and means for closing said flange around said pintle.

21. In an apparatus for hinging together a body member having a vertical wall and a cover member having a flange, a frame, a carrier mounted on said frame and supporting said body member, a holder supporting said cover member, means fastened to the frame for providing the vertical wall of the body member with a depression and with pintle ears at either side of said depression, means for inserting a pintle in said pintle ears in front of said depression, means connected to the frame for turning the flange of the cover member, means for moving said holder whereby the said turned flange is inserted intermediate the depression and the pintle and means for closing said flange around said pintle.

22. In an apparatus for hinging together a body member and a cover member, a plunger, an actuating lever connecting with said plunger adapted to raise said plunger and support it in raised position, a plunger rod mounted in said plunger, jaws pivoted to said plunger and adapted to be actuated by said plunger rod and dies carried by said jaws as and for the purpose described.

23. In an apparatus for hinging together a body member and a cover member, a plunger, an actuating lever connecting with said plunger, a plunger rod extending through said plunger, jaws pivoted to said plunger and engaging said plunger rod and dies carried by said jaws as and for the purpose described.

24. In an apparatus for hinging together a body member and a cover member, a plunger, a pivoted actuating lever connecting with said plunger, a shaft, means connecting said shaft and said actuating lever whereby said lever will be rocked on its pivot when said shaft is rotated, a plunger rod mounted in said plunger, jaws pivoted to said plunger and adapted to be rocked on their pivot by said plunger rod and dies carried by said jaws as and for the purpose described.

25. In an apparatus for hinging together a body member and a cover member, a plunger, a pivoted actuating lever connecting with said plunger, a shaft, means connecting said shaft and said actuating lever whereby said lever will be rocked on its pivot when said shaft is rotated, a plunger rod mounted in said plunger, jaws pivoted together and to said plunger and adapted to be rocked on their pivot by said plunger rod and dies carried by said jaws as and for the purpose described.

26. In an apparatus for hinging together a body member and a cover member, a plunger, a supporting sleeve in which said plunger is slidably mounted, means connecting said plunger and supporting sleeve to draw said plunger downwardly, jaws pivoted to said plunger, means for rocking said jaws on their pivot and dies carried by said jaws as and for the purpose described.

27. In an apparatus for hinging together a body member and a cover member, a reciprocating plunger, a supporting sleeve in which said plunger is mounted, a spring connecting said plunger and supporting sleeve to draw said plunger downwardly, jaws pivoted to said plunger, a plunger rod supported in said plunger and adapted to rock said jaws on their pivot and dies carried by said jaws as and for the purpose described.

28. In an apparatus for hinging together a body member and a cover member, a plunger provided with a recess, a slotted cap or head connected to said plunger, an actuating lever extending within the slot of said cap or head, a plunger rod extending longitudinally through said plunger, means within said recess for normally holding said plunger rod in raised position, jaws pivoted to said plunger and adapted to be actuated by said plunger rod to rock them on their pivot and dies carried by said jaws as and for the purpose described.

29. In an apparatus for hinging together a body member and a cover member, a plunger, a slotted cap or head connected to said plunger, an actuating lever extending within the slot of said cap or head, a plunger rod extending longitudinally through said plunger and within the slot of the cap or head and provided with a beveled end, jaws pivoted together and carried by said plunger, rollers on the ends of said jaws engaging the beveled end of said plunger rod and dies carried by said jaws as and for the purpose described.

30. In an apparatus for hinging together a body member and a cover member, a plunger provided with a recess, a slotted cap or head connected to said plunger, an actuating lever extending within the slot of said cap or head, a plunger rod extending longitudinally through said plunger and within the slot of the cap or head and provided with a beveled end, means within said recess for normally retaining said plunger rod in raised position, jaws pivoted together and to said plunger, rollers carried by said jaws and engaging the beveled end of said plunger rod and dies carried by said jaws as and for the purpose described.

31. In an apparatus for hinging together a body member and a cover member, a plunger provided with a recess, a supporting sleeve in which said plunger is mounted, a spring connecting said plunger and supporting sleeve, a slotted cap or head connected to said plunger, a pivoted actuating lever extending within said slot, a shaft, means connecting said shaft and said actuating lever whereby said lever will be rocked on its pivot when said shaft is rotated, a plunger rod extending longitudinally through said plunger and within the slot of the cap or head, a spring within said recess for normally retaining said plunger rod in raised position, jaws pivoted to said plunger and adapted to be rocked on their pivot by said plunger rod and dies carried by said jaws as and for the purpose described.

32. In an apparatus for hinging together a body member and a cover member, a plunger provided with a recess, a supporting sleeve in which said plunger is mounted, a spring connecting said plunger and supporting sleeve, a slotted cap or head connected to said plunger, a pivoted actuating lever extending within said slot, a shaft, means connecting said shaft and said actuating lever whereby said lever will be rocked on its pivot when said shaft is rotated, a plunger rod extending longitudinally through said plunger and within the slot of the cap or head and provided with a beveled end, a spring encircling said plunger rod within said recess for normally retaining said plunger rod in raised position, jaws pivoted together and to said plunger, rollers carried by said jaws and engaging the beveled end of said plunger rod and dies carried by said jaws as and for the purpose described.

33. In an apparatus for hinging together a body member and a cover member having a flange, a plunger provided with a recess, a slot in said plunger communicating with said recess, a plunger rod extending longitudinally through said plunger, a pin carried by said plunger rod and engaging said slot whereby rotation of said plunger rod in said plunger is prevented, jaws connected to said plunger and adapted to be actuated by said plunger rod and dies carried by said jaws as and for the purpose described.

34. In an apparatus for hinging together a body member and a cover member having a flange, a plunger provided with a recess, a slot in said plunger communicating with said recess, a plunger rod extending longitudinally through said plunger and said recess and provided with a beveled end one side of which is flattened, a pin carried by said plunger rod and engaging said slot whereby rotation of said plunger rod is prevented, jaws pivoted together and to said plunger, rollers carried by said jaws and engaging the beveled end of said plunger rod and the flattened side thereof and dies carried by said jaws as and for the purpose described.

35. In an apparatus for hinging together a body member and a cover member having a flange, a frame, a carrier supporting said body member, a holder supporting said cover member, means for forming pintle ears on said body member, means for inserting a pintle in said ears, means for turning the flange of the cover member comprising a plunger mounted on said frame, actuating means for said plunger, a plunger rod mounted in said plunger, jaws connected to said plunger and adapted to be actuated by said plunger rod and dies carried by said jaws adapted to be pressed against the flange of the cover member, means for moving said holder whereby the turned flange of the cover member is connected to the pintle and means for closing said flange around said pintle.

36. In an apparatus for hinging together a body member and a cover member having a flange, a frame, a carrier supporting said body member, a holder supporting said cover member, means for forming pintle ears on said body member, means for inserting a pintle in said ears, means for turning the flange of the cover member comprising a plunger mounted on said frame, actuating means for said plunger, a plunger rod mounted in said plunger, jaws pivoted together and to said plunger and engaging said plunger rod and adapted to be actuated thereby and dies carried by said jaws adapted to be pressed against the flange of the cover member, means for moving said holder whereby the turned flange of the cover member is connected to the pintle and means for closing said flange around said pintle.

37. In an apparatus for hinging together a body member and a cover member having a flange, a frame, a carrier supporting said body member, a holder supporting said cover member, means for forming pintle ears on said body member, means for inserting a pintle in said ears, means for turning the flange of the cover member comprising a reciprocating plunger mounted on said frame, an actuating lever connected with said plunger, a plunger rod extending longitudinally through said plunger, pivoted jaws connected to said plunger and engaging said plunger rod and dies carried by said jaws and adapted to be pressed against the flange of the cover member, means for moving said holder whereby the turned flange of the cover member is connected to the pintle and means for closing said flange around said pintle.

38. In an paparatus for hinging together a body member and a cover member having a flange, a frame, a carrier supporting said body member, a holder supporting said cover member, means for forming pintle ears on said body member, means for inserting a pintle in said ears, means for turning the flange of the cover member comprising a reciprocating plunger mounted on said frame, a pivoted actuating lever connected with said plunger, a shaft, means connecting with said shaft and said actuating lever to rock said lever on its pivot when said shaft is rotated, a plunger rod extending longitudinally through said plunger, means for normally holding said plunger rod in raised position, pivoted jaws connected to said plunger and engaging said plunger rod and dies carried by said jaws and adapted to be pressed against the flange of the cover member, means for moving said holder whereby the turned flange of the cover member is connected to the pintle and means for closing said flange around said pintle.

39. In an apparatus for hinging together a body member and a cover member having a flange, a frame, a carrier supporting said body member, a holder supporting said cover member, means for forming pintle ears on said body member, means for inserting a pintle in said ears, means for turning the flange of the cover member comprising a reciprocating plunger mounted on said frame, a slotted cap or head secured to said plunger, a pivoted actuating lever mounted on the frame and extending through the slot in the cap or head, means for rocking said actuating lever on its pivot, a plunger rod extending longitudinally through said plunger and within the slot of the cap or head and provided with a beveled end, jaws pivoted together and to said plunger and engaging said plunger rod and dies carried by said jaws and adapted to be pressed against the flange of the cover, means for moving said holder whereby the turned flange of the cover member is connected to the pintle and means for closing said flange around said pintle.

40. In an apparatus for hinging together a body member and a cover member having a flange, a frame, a carrier on said frame supporting said body member, a holder supporting said cover member, means for forming pintle ears on said body member, means for inserting a pintle in said ears, means for turning the flange of the cover member comprising a sleeve mounted on said frame, a reciprocating plunger in said sleeve, a pivoted actuating lever connected with said plunger, means for rocking said plunger on its pivot, a spring connecting said sleeve and plunger, a plunger rod carried by said plunger, means for normally holding said plunger rod in inoperative position, jaws connected to said plunger and adapted to be actuated by said plunger rod and dies carried by said jaws and adapted to be pressed against the flange of the cover, means for moving said holder whereby the turned flange of the cover member is connected to the pintle and means for closing said flange around said pintle.

41. In an apparatus for hinging together a body member and a cover member having a flange, a frame, a carrier on said frame supporting said body member, a holder supporting said cover member, means for forming pintle ears on said body member, means for inserting a pintle in said ears, means for turning the flange of the cover member comprising a plunger provided with a recess, a slot in said plunger communicating with said recess, a plunger rod carried by said plunger, a pin connected to said plunger rod and engaging said slot whereby rotation of said plunger rod in said plunger is prevented, jaws connected to said plunger and engaging said plunger rod and dies carried by said jaws and adapted to be pressed against the flange of the cover, means for moving said holder whereby the turned flange of the cover member is connected to the pintle and means for closing said flange around said pintle.

42. In an apparatus for hinging together a body member and a cover member having a flange, a frame, a carrier on said frame supporting said body member, a holder supporting said cover member, means for forming pintle ears on said body member, means for inserting a pintle in said ears, means for turning the flange of the cover member comprising a plunger provided with a recess, a slot in said plunger communicating with said recess, a plunger rod carried by said plunger and provided with a beveled end one side of which is flattened, a pin connected to said plunger rod and engaging said slot whereby rotation of said plunger rod is prevented, jaws pivoted and connected to said plunger and engaging the beveled end of said plunger rod and the flattened side thereof and dies carried by said jaws and adapted to be pressed against the flange of the cover, means for moving said holder whereby the turned flange of the cover member is connected to the pintle and means for closing said flange around said pintle.

43. In an appartus for hinging together a body member and a cover member provided with vertical walls, a frame, a carrier disc mounted on the frame and provided at or adjacent its periphery with a plurality of countersunk nests equidistantly spaced apart and each adapted to receive one of said members therein and to support the vertical walls of said member and means for rotating said disc.

44. In an apparatus for hinging together a body member and a cover member, a frame, a carrier disc mounted on the frame and adapted to support one of said members, means for intermittently and partially rotating said disc a predetermined distance and means for locking said disc, said locking means being adapted to engage the disc before the completion of each partial rotation and to be automatically projected into locking position upon the completion thereof.

45. In an apparatus for hinging together a body member and a cover member, a frame, a carrier disc mounted on said frame, means for intermittently and partially rotating said disc a predetermined distance, a locking rod, spring-pressed means for projecting said rod forwardly into engagement with said disc, a shaft, a pivoted actuating lever, means connected to said shaft and said actuating lever for rocking said lever on its pivot to retract said spring-pressed means and hold said spring-pressed means in retracted position.

46. In an apparatus for hinging together a body member and a cover member, a frame, a carrier disc mounted on the frame and provided with a plurality of nests equidistantly spaced apart each adapted to receive and support one of said members, a plurality of notches in said disc equal in number to the number of said nests and means adapted to engage said notches to rotate said disc.

47. In an apparatus for hinging together a body member and a cover member, a frame, a rotatable carrier disc mounted on the frame and a plurality of nests in said carrier disc each adapted to receive and support one of said members and having overhanging flanges extending over said members.

48. In an apparatus for hinging together a body member and a cover member, a frame, a rotatable carrier disc mounted on the frame, a plurality of nests in said carrier disc each adapted to receive and support one of said members and positioning plates adapted to engage the sides of said members and having overhanging flanges extending over said members.

49. In an apparatus for hinging together a body member and a cover member, a frame, a rotatable carrier disc mounted on the frame, a plurality of nests in said carrier disc each adapted to receive and support one of said members, slidable positioning plates adapted to engage the sides of said members and having overhanging flanges extending over said members and springs for holding said plates in engagement with said members.

50. In an apparatus for hinging together a body member and a cover member, a frame, a rotatable carrier disc mounted on the frame, a plurality of nests in said carrier disc equidistantly spaced apart and each adapted to receive and support one of said members, positioning plates adapted to engage the sides of said members when said members are supported within said nests and means for holding said plates in engagement with said members.

51. In an apparatus for hinging together a body member and a cover member, a frame, a carrier disc mounted on said frame, means on said carrier disc adapted to receive and support one of said members and gripping means provided with hooks for engaging said members to hold them from withdrawal from said receiving and supporting means.

52. In an apparatus for hinging together a body member and a cover member, a frame, a carrier disc mounted on said frame, a plurality of nests in said carrier disc each adapted to receive and support one of said members and a pivoted member-gripper mounted on said disc provided with hooks for engaging said members to hold them from withdrawal from said nests.

53. In an apparatus for hinging together a body member and a cover member, a frame, a rotatable carrier disc mounted on said frame, a plurality of nests in said carrier disc each adapted to receive and support one of said members, a stationary plate and a pivoted member-gripper mounted on said disc provided with hooks for engaging said members and with a roller engaging said plate.

54. In an apparatus for hinging together a body member and a cover member, a frame, a rotatable carrier disc mounted on said frame, a plurality of nests in said carrier disc each adapted to receive and support one of said members, a stationary plate provided with elevated portions, an overhanging plate and a pivoted member-gripper mounted on said disc provided with hooks for engaging said members and with a roller engaging said stationary plate and adapted to engage said overhanging plate.

55. In an apparatus for hinging together a body member and a cover member, a frame, a rotatable carrier disc mounted on said frame, a plurality of nests in said carrier disc each adapted to receive and support one of said members, a pivoted member-gripper provided with hooks for engaging said members, means for rocking said member-gripper in one direction and means for rocking said member-gripper in the other direction.

56. In an apparatus for hinging together a body member and a cover member, a frame, a rotatable carrier disc mounted on said frame, a plurality of nests carried by said discs each adapted to receive and support one of said members and blocks with depressions therein in said nests, said blocks constituting female dies.

57. In an apparatus for hinging together a body member and a cover member each provided with a vertical wall, a frame, means for forming a tit or clasp member on said vertical walls comprising a plunger supported on said frame, a plunger rod mounted in said plunger, a bell-crank lever pivoted to said plunger, and to said plunger rod, and a die connected to said bell-crank lever and adapted to be pressed against said vertical wall.

58. In an apparatus for hinging together a body member and a cover member each provided with a vertical wall, a frame, means for forming a tit or clasp member on said vertical walls comprising a reciprocating plunger supported on said frame, a plunger rod mounted in said plunger, a bell-crank lever pivoted to said plunger and said plunger rod and a die connected to said bell-crank lever and adapted to be pressed against said vertical wall.

59. In an apparatus for hinging together a body member and a cover member each provided with a vertical wall, a frame, a carrier mounted on said frame, a nest in said carrier provided with a block constituting a female die, means for forming a tit or clasp member on said vertical walls comprising a plunger supported on said frame, a plunger rod mounted in said plunger, a bell-crank lever pivoted to said plunger and connected to said plunger rod and a die connected to said bell-crank lever and adapted to be pressed against said vertical wall and said female die.

60. In an apparatus for hinging together a body member and a cover member each provided with a vertical wall, a frame, means for forming a tit or clasp member on said vertical walls comprising a plunger supported on said frame, an actuating lever adapted to raise said plunger and hold it in raised position, a plunger rod mounted in said plunger, a bell-crank lever pivoted to said plunger and said plunger rod and a die connected to said bell-crank lever and adapted to be pressed against said vertical wall.

61. In an apparatus for hinging together a body member and a cover member each provided with a vertical wall, a frame, means for forming a tit or clasp member on said vertical walls comprising a plunger supported on said frame and having a slotted end forming side members, a base connecting said side members, a plunger rod mounted in said plunger, a bell-crank leaver pivoted to said plunger rod and said side members and a die supported on said base and connected to said bell-crank lever and adapted to be pressed against said vertical wall.

62. In an apparatus for hinging together a body member and a cover member each provided with a vertical wall, a frame, means for forming a tit or clasp member on said vertical wall comprising a plunger supported on said frame, a pivoted actuating lever connecting with said plunger, a shaft, means connecting said shaft and said actuating lever to rock said lever on its pivot when said shaft is rotated, a plunger rod mounted in said plunger, a bell-crank lever pivoted to said plunger and said plunger rod and adapted to be actuated by said plunger rod and a die connected to said bell-crank lever and adapted to be pressed against said vertical wall.

63. In an apparatus for hinging together a body member and a cover member each provided with a vertical wall, means for forming a tit or clasp member on said vertical walls comprising a plunger, a supporting sleeve in which said plunger is slidably mounted, means connecting said plunger and said supporting sleeve to draw said plunger downwardly, a bell-crank lever pivoted to said plunger, means for actuating said bell-crank lever and a die connected to said bell-crank lever and adapted to be pressed against said vertical wall.

64. In an apparatus for hinging together a body member and a cover member each provided with a vertical wall, means for forming a tit or clasp member on said vertical walls comprising a reciprocating plunger, a supporting sleeve in which said plunger is mounted, a spring connecting said plunger and supporting sleeve to draw said plunger downwardly, a bell-crank lever pivoted to said plunger, a plunger rod to which said bell-crank lever is pivoted and adapted to actuate said bell-crank lever and a die connected to said bell-crank lever and adapted to be pressed against said vertical wall.

65. In an apparatus for hinging together a body member and a cover member each provided with a vertical wall, means for forming a tit or clasp member on said vertical walls comprising a plunger provided with a recess, a slotted cap or head connected to said plunger, an actuating lever extending within the slot of said cap or head, a plunger rod extending longitudinally through said plunger, means within said recess for normally holding said plunger rod in raised position, a bell-crank lever pivoted to said plunger and to said plunger rod and adapted to be actuated by said plunger rod and a die connected to said bell-crank lever and adapted to be pressed against said vertical wall.

66. In an apparatus for hinging together a body member and a cover member each provided with a vertical wall, means for forming a tit or clasp member on said vertical walls comprising a plunger provided with a recess, a supporting sleeve in which said plunger is mounted, a spring connecting said plunger and said supporting sleeve, a slotted cap or head connected to said plunger, a pivoted actuating lever extending within said slot, a shaft, means connecting said shaft and said actuating lever whereby said lever will be rocked on its pivot when said shaft is rotated, a plunger rod extending longitudinally through said plunger and within the slot of the cap or head, a spring within said recess for normally retaining said plunger rod in raised position, a bell-crank lever pivoted to said plunger and said plunger rod and adapted to be actuated by said plunger rod and a die connected to said bell-crank lever and adapted to be pressed against said vertical wall.

67. In an apparatus for hinging together a body member and a cover member, a frame, a carrier mounted on said frame, a shaft, means connected to said shaft for moving said carrier, a second shaft connected to said first shaft and means connected to said second shaft for feeding the members to said carrier.

68. In an apparatus for hinging together a body member and a cover member, a frame, a carrier mounted on said frame, a shaft means connected to said shaft for intermittently moving said carrier a predetermined distance, a second shaft connected to said first shaft and means connected to said second shaft for progressively and intermittently feeding the members to said carrier.

69. In an apparatus for hinging together a body member and a cover member, a frame, a carrier mounted on said frame, a channel or chute on said frame, and means for intermittently and progressively feeding the members from said channel or chute to said carrier.

70. In an apparatus for hinging together a body member and a cover member, a frame, a carrier mounted on said frame, means for intermittently moving said carrier a predetermined distance, a channel or chute, means for moving said members through said channel or chute and for feeding one of said members to said carrier for each movement thereof.

71. In an apparatus for hinging together a body member and a cover member, a frame, a carrier disc mounted on said frame and provided with a plurality of nests, means for intermittently and partially rotating said carrier disc a predetermined distance, a channel or chute and means for feeding said members singly from said channel or chute and to one of said nests for each partial rotation of said carrier disc.

72. In an apparatus for hinging together a body member and a cover member, a frame, a carrier disc mounted on said frame and provided with a plurality of nests equidistantly spaced apart, a channel or chute, means for intermittently and partially rotating said carrier disc a predetermined distance whereby a nest is brought into alignment with said channel or chute and means for feeding said members from said channel or chute to said nests.

73. In an apparatus for hinging together a body member and a cover member, a frame, a carrier mounted on said frame and provided with a plurality of nests equidistantly spaced apart, a channel or chute, means for moving said carrier a predetermined distance whereby a nest is brought into alignment with said channel or chute and means for simultaneously moving said members through said channel or chute and feeding said members to said nests.

74. In an apparatus for hinging together a body member and a cover member, a frame, a carrier mounted on said frame and a feed block adapted to be brought downwardly within the members and to feed said members to said carrier.

75. In an apparatus for hinging together a body member and a cover member, a frame, a carrier mounted on said frame and a feed block adapted to be brought downwardly within the members and to intermittently and progressively feed said members to said carrier.

76. In an apparatus for hinging together a body member and a cover member, a frame, a carrier mounted on said frame and a feed block mounted on said frame for feeding the members to said carrier and capable of movement in a rectangular path.

77. In an apparatus for hinging together a body member and a cover member, a frame, a carrier mounted on said frame, a channel or chute receiving said members and a feed block capable of movement in a rectangular path for feeding the members to said carrier.

78. In an apparatus for hinging together a body member and a cover member, a frame, a carrier mounted on said frame, a channel or chute receiving said members and a feed block adapted to engage said members and feed them from the channel or chute to the carrier and capable of reciprocation both vertically and horizontally.

79. In an apparatus for hinging together a body member and a cover member, a frame, a carrier mounted on said frame, a channel or chute receiving said members, means on the end of said channel or chute for holding said members against movement and a feed block for feeding the members from said channel or chute and to said carrier against the action of said holding means.

80. In an apparatus for hinging together a body member and a cover member, a frame, a carrier mounted on said frame, a channel or chute receiving said members, means for moving said members through said channel or chute, means at the end of said channel for holding the members against further movement and a feed block for feeding the members to said carrier against the action of said holding means.

81. In an apparatus for hinging together a body member and a cover member, a frame, a carrier mounted on said frame, a channel or chute receiving said members and having side walls with flanges providing guides for said members, means within said channel for frictionally engaging said members whereby they are moved forwardly therein to a position adjacent said carrier and means fastened to the end of said channel for holding said members against further forward movement.

82. In an apparatus for hinging together a body member and a cover member, a frame, a carrier mounted on said frame, a channel or chute receiving said members and having side walls with flanges providing guides for said members, an endless belt passing beneath said flanges and adapted to frictionally engage said members and carry them forwardly in said channel to a position adjacent said carrier and a spring-pressed stop fastened to said channel for holding said members against further movement.

83. In an apparatus for hinging together a body member and a cover member, a frame, a carrier mounted on said frame, a channel or chute receiving said members, means within said channel for frictionally engaging said members whereby they are moved forwardly therein to a position adjacent said carrier, a feed block mounted on said frame for feeding the members to said carrier and means for simultaneously actuating said means within said channel for moving the members forwardly therein and said feed block.

84. In an apparatus for hinging together a body member and a cover member, a frame, a carrier mounted on said frame, a feed block for feeding the members to the carrier, a shaft, means connected to said shaft for swinging the feed block forwardly and raising the same and means for returning said feed block and lowering the same.

85. In an apparatus for hinging together a body member and a cover member, a frame, a carrier mounted on said frame, a feed block for feeding the members to the carrier, a shaft, a channel or chute receiving said members, means within said channel for moving the members forwardly therein, means connected to said shaft for actuating said means for moving said members, for swinging the feed block forwardly and for raising the same and means for returning the feed block and for lowering the same.

86. In an apparatus for hinging together a body member and a cover member, a frame, a carrier mounted on said frame, a driving shaft, a bracket, a reciprocating shaft mounted in said bracket, a cam engaged by said reciprocating shaft, a feed block connected to said reciprocating shaft for feeding the members to the carrier, an actuating finger for swinging said feed block forwardly and connected to said driving shaft and said cam.

87. In an apparatus for hinging together a body member and a cover member, a frame, a carrier mounted on said frame, a driving shaft, a bracket, a reciprocating shaft mounted in said bracket, a cam plate supporting said reciprocating shaft, a feed block connected to said reciprocating shaft for feeding the members to the carrier, a rotatable actuating finger for swinging the feed block forwardly and connected to said driving shaft and said cam plate and a spring for returning said feed block.

88. In an apparatus for hinging together a body member and a cover member, a frame, a carrier mounted on said frame, a driving shaft, a bracket secured to said frame, a reciprocating shaft mounted in said bracket, a cam plate engaging said reciprocating shaft, a feed block connected to said reciprocating shaft for feeding the members to the carrier, a second bracket secured to said frame, a rotatable shaft mounted therein and connected to said cam plate and said driving shaft, an actuating finger carried by said rotatable shaft for swinging the feed block forwardly and a spring for returning said feed block.

89. In an apparatus for hinging together a body member and a cover member, a frame, a carrier mounted on said frame, a driving shaft, a reciprocating shaft mounted in a suitable support, a cam plate engaging said reciprocating shaft, a feed block connected to said reciprocating shaft for feeding the members to the carrier, a rotatable shaft mounted in a suitable support and connected to said cam plate and said driving shaft, an actuating finger carried by said rotatable shaft for swinging the feed block forwardly, a spring carried by said reciprocating shaft for returning said feed block and a stop for limiting the return movement of said feed block.

90. In an apparatus for hinging together a body member and a cover member, a frame, a carrier mounted on said frame, a driving shaft, a reciprocating shaft mounted in a suitable support and having a beveled end, a cam plate engaging said reciprocating shaft, a feed block connected to said reciprocating shaft for feeding the members to the carrier, a rotatable shaft mounted in a suitable support and connected to said cam plate and said driving shaft, a channel or chute, means connected to said rotatable shaft for moving the members forwardly in said channel or chute, an actuating finger carried by said rotatable shaft for swinging the feed block forwardly, a spring for returning said block and for retaining the beveled end of said reciprocating shaft in engagement with said cam plate and a stop for limiting the return movement of said cam plate.

91. In an apparatus for hinging together a body member and a cover member, a frame, a carrier mounted on said frame, an operating arm capable of reciprocation both vertically and horizontally, a feed block connected to said operating arm for feeding the members to the carrier, a lever pivoted to said operating arm and means for swinging the operating arm forwardly and adapted to engage said lever upon the return stroke to limit the rate of movement of said return stroke.

92. In an apparatus for hinging together a body member and a cover member, a frame, a carrier mounted on said frame, a driving shaft, a reciprocating shaft mounted on a suitable support, a cam plate engaging said reciprocating shaft, an operating arm connected to said reciprocating shaft, a lever pivoted to said operating arm, a feed block connected to said operating arm for feeding the members to the carrier, a rotatable shaft mounted in a suitable support and connected to said cam plate and said driving shaft and an actuating finger carried by said rotatable shaft for swinging the feed block forwardly and adapted to engage said lever upon the return movement of said feed block.

93. In an apparatus for hinging together a body member having a vertical wall and a cover member having a flange, a frame, means for providing said vertical wall with pintle ears, a feeder bracket mounted on said frame for feeding a wire forwardly whereby it will be inserted in one of said ears, a cutter for cutting the wire adjacent its inserted end to form a pintle, a spindle for moving said pintle in alignment with the other of said pintle ears, means for pushing the free or disengaged end of the pintle in said other ear, means for connecting the flange of the cover member to said pintle and means for closing said flange around said pintle.

94. In an apparatus for hinging together a body member having a vertical wall and a cover member having a flange, a frame, means for providing said vertical wall with pintle ears, a feeder bracket mounted on said frame for feeding a wire forwardly whereby it will be inserted in one of said ears, a wire-block mounted on said frame supporting said wire while the end thereof is thus inserted, a cutter for cutting the wire adjacent its inserted end to form a pintle, a spindle carried by said wire-block for moving said pintle in alignment with the other of said ears, means for pushing the free or disengaged end of the pintle in said other ear, means for connecting the flange of the cover member to said pintle and means for closing said flange around said pintle.

95. In an apparatus for hinging together a body member having a vertical wall and a cover member having a flange, a frame, means for providing said vertical wall with pintle ears, a feeder bracket mounted on said frame for feeding a wire forwardly whereby it will be inserted in one of said ears, a wire-block mounted on said frame provided with movable means adapted to support the wire while the end thereof is thus inserted, a clamp for clamping said wire against movement after insertion, a cutter for cutting the wire adjacent its inserted end to form a pintle, a spindle carried by said wire-block for moving said pintle in alignment with the other of said ears and momentarily thus supporting it, a reciprocating pintle-pusher adapted to engage the inserted end of said pintle and push the same whereby the disengaged end thereof will be inserted in the other of said ears, means for connecting the flange of the cover member to said pintle and means for closing said flange around said pintle.

96. In an apparatus for hinging together a body member having a vertical wall and a cover member having a flange, a frame, means for providing said body member with pintle ears and perforations, a feeder bracket mounted on said frame for feeding a wire forwardly whereby it will be inserted in one of said ears and through one of said perforations, a clamp for clamping said wire against movement and after insertion, a wire block for supporting said wire while being inserted, a wire cutter for cutting the wire after insertion to form a pintle, a reciprocating spindle carried by said wire block for moving said pintle in alignment with the other of said ears and perforations and thus supporting it, a pintle-pusher adapted to engage the inserted end of said pintle and push the same whereby the disengaged end thereof will be inserted in said other ear and through said other perforation, means for connecting the flange of the cover member to said pintle and means for closing said flange around said pintle.

97. In an apparatus for hinging together a body member having a vertical wall and a cover member having a flange, a frame, means for providing the vertical wall with pintle ears, a feeder bracket mounted in a guide on said frame, a bell-crank lever pivoted by said bracket, a feeding block pivoted to said bell-crank lever, means for reciprocating said bracket whereby the block engages the wire to feed the same forwardly to insert the end thereof in one of said pintle ears, means for cutting the wire to form a pintle, means for inserting an end of the pintle in the other of said ears, means for connecting the flange of the cover member to said pintle and means for closing said flange around said pintle.

98. In an apparatus for hinging together a body member having a vertical wall and a cover member having a flange, a frame, means for providing the vertical wall of the body member with pintle ears, means for feeding a wire forwardly whereby the end thereof is inserted in one of said ears, means for cutting said wire when inserted to form a pintle, a movable wire-block mounted on said frame, means for moving said wire-block forwardly upon the insertion of said wire and providing a support for the pintle, a spindle mounted in said wire-block for engaging said pintle and for moving said pintle in alignment with the other of said ears, actuating means for forcing said spindle forwardly and for returning said wire-block to normal position and means for pushing the free or disengaged end of the pintle in the other of said ears.

99. In an apparatus for hinging together a body member having a vertical wall and a cover member, a frame, means for providing the vertical wall with pintle ears, means for inserting a pintle in one of said ears, a wire-block mounted on said frame, means for moving said wire-block forward whereby it will support the pintle, a spindle mounted on said wire, means for actuating said spindle whereby it will move said pintle in alignment with the other of said ears and means for pushing the free or disengaged end of the pintle in the other of said ears.

100. In an apparatus for hinging together a body member and a cover member, a frame, a slidable wire-block mounted on said frame adapted to support a pintle, means for moving said wire-block forwardly, a spindle mounted on said wire-block, means for holding said spindle in retracted or normal position and the same means for returning the block to retracted position and for moving the spindle forwardly.

101. In an apparatus for hinging together a body member and a cover member, a frame, a slidable wire-block mounted on said frame provided with an open slot adapted to support a pintle thereon, spring means for moving said wire-block forwardly, a spindle mounted in said wire-block, spring means for holding said spindle in retracted position and an actuating lever for moving said wire-block rearwardly and holding it in retracted position against the action of said first-named spring means and for forcing said spindle forwardly against the action of said second-named spring means.

102. In an apparatus for hinging together a body member and a cover member, a frame, a slidable wire-block mounted thereon and comprising a lower stationary chamber and an upper slidable chamber mounted on said lower chamber having a slot therein and provided with a forward extension adapted to support a pintle, a spindle extending longitudinally through said upper chamber, a spring within said upper chamber for holding the spindle in retracted position, a spring in said lower chamber for moving said upper chamber forwardly, an actuating lever pivoted to the frame and extending within the slot in the upper chamber, said actuating lever being adapted to return the upper chamber to retracted position and hold it in that position against the action of said second-named spring and to force the spindle forwardly against the action of said first-named spring and means for rocking said actuating lever on its pivot.

103. In an apparatus for hinging together a body member having a vertical wall, means for providing said vertical wall with pintle ears, a frame, means for inserting a pintle in one of said ears and means for inserting the free end of said pintle in the other of said ears and comprising a reciprocating plunger mounted on said frame, a plunger rod mounted in said plunger and a pintle-pusher lever carried by said plunger and adapted to be actuated by said plunger rod to cause it to engage and move said pintle.

104. In an apparatus for hinging together a body member having a vertical wall, means for providing said vertical wall with pintle ears, a frame, means for inserting a pintle in one of said ears and means for inserting the free end of said pintle in the other of said ears and comprising a reciprocating plunger mounted on said frame, a pintle-pusher lever carried by said plunger and adapted to engage and move said pintle and means carried by said plunger for actuating said pintle-pusher.

105. In an apparatus for hinging together a body member having a vertical wall, means for providing said vertical wall with pintle ears, a frame, means for inserting a pintle in one of said ears and means for inserting the free end of said pintle in the other of said ears and comprising a reciprocating plunger mounted on said frame, a pintle-pusher lever pivoted to said plunger and adapted to engage and move said pintle, means within said plunger for rocking said lever on its pivot means for actuating said rocking means and for raising said plunger and holding it in raised position and means for carrying said plunger downwardly into operative position.

106. In an apparatus for hinging together a body member having a vertical wall and a cover member, means for providing said vertical wall with pintle ears and perforations, a frame, means for inserting a pintle in one of said ears and through one of said perforations and means for inserting the free end of said pintle in the other of said ears and through the other perforation and comprising a reciprocating plunger mounted on said frame, a plunger rod extending longitudinally through said plunger, a pintle-pusher lever engaging said plunger rod, means for holding said pusher in engagement with said plunger rod, means for holding said plunger rod in retracted or raised position, a pivoted actuating lever mounted on said frame and adapted to raise said plunger and hold it in raised and inoperative position and adapted to force said plunger rod downwardly against its holding means whereby the pintle-lever is actuated.

107. In an apparatus for hinging together a body member having a vertical wall and a cover member, means for providing said vertical wall with pintle ears and perforations, a frame, means for inserting a pintle in one of said ears and through one of said perforations and means for inserting the free end of said pintle in the other of said ears and through the other perforation and comprising a reciprocating plunger mounted on said frame, a plunger rod extending longitudinally through said plunger, a pintle-pusher lever pivoted to said plunger and engaging said plunger rod, spring means for holding said lever in engagement with said plunger rod, a spring carried by said plunger rod for holding it in retracted or raised position, a pivoted actuating lever mounted on said frame and adapted to raise said plunger and hold it in raised and inoperative position and adapted to force said plunger rod downwardly against its spring whereby the pintle-pusher is rocked on its pivot, means for rocking said actuating lever on its pivot and spring means for drawing the plunger and pintle-pusher downwardly into operative position within the body member.

108. In an apparatus for hinging together a body member and a cover member, a carrier for said cover member and a holder for said member mounted in said carrier and comprising a body portion, a head pivoted to said body portion, a slidable plate mounted on said head and provided with a nest for receiving and supporting said cover member and a reciprocating rod mounted in said body portion and connected to said head.

109. In an apparatus for hinging together a body member and a cover member, a frame, a carrier for said cover member mounted on said frame and a holder for said member mounted in said carrier and comprising a body portion, a head pivoted to said body portion, a slidable plate mounted on said head and provided with a nest for receiving and supporting said cover member and a reciprocating rod mounted in said body portion and connected to said head, means for sliding said plate on said head and means for moving said carrier.

110. In an apparatus for hinging together a body member and a cover member, a frame provided with a slot, a carrier for said cover member mounted on said frame and a holder for said member mounted in said carrier and comprising a body portion, a head pivoted to said body portion, a slidable plate mounted on said head and provided with a nest for receiving and supporting said cover member, a reciprocating rod mounted in said body portion and connected to said head and a flattened rod having one end thereof pivoted to said carrier and the other end adapted to engage the slot in the frame, said flattened rod being also pivoted to said reciprocating rod.

111. In an apparatus for hinging together a body member and a cover member, a frame, a locking plate secured to said frame, a carrier for said cover member mounted on said frame and a holder for said member mounted in said carrier and comprising a body portion, a shank connected to said body portion and having a hooked end adapted to engage said locking plate, a head pivoted to said body portion, a slidable plate mounted on said head and provided with a nest for receiving and supporting said cover member and a reciprocating rod mounted in said body portion and connected to said head.

112. In an apparatus for hinging together a body member and a cover member, a frame provided with a slot, a locking plate secured to said frame, a carrier for said cover member mounted on said frame and a holder for said member mounted in said carrier and comprising a body portion, a shank connected to said body portion and having a hooked end adapted to engage said locking plate, a head pivoted to said body portion, a slidable plate mounted on said head and provided with a nest for receiving and supporting said cover member, a reciprocating rod mounted in said body portion and connected to said head and a flattened rod pivoted to said reciprocating rod and having one end thereof pivoted to said carrier and the other end adapted to engage the slot in the frame.

113. In an apparatus for hinging together a body member and a cover member, a frame, a carrier for said cover member and a holder for said member mounted in said carrier and comprising a body portion, a head pivoted to said body portion, a plate mounted on said head and provided with a nest for receiving and supporting said cover member, a reciprocating rod mounted in said body portion and connected to said head, means for actuating said plate, means for raising the body member bodily and means for actuating said reciprocating rod.

114. In an apparatus for hinging together a body member and a cover member, a carrier for said cover member, and a holder for said member mounted in said carrier and comprising a body portion, a head pivoted to said body portion, a slidable plate mounted on said head, means for limiting the movement of said plate on said head and means on said plate for receiving and supporting said cover member.

115. In an apparatus for hinging together a body member and a cover member, a carrier for said cover member and a holder for said member mounted in said carrier and comprising a body portion, a head pivoted to said body portion, a slidable plate mounted on said head, means on said plate for receiving and supporting said cover member and a reciprocating rod connected to said head by a pin and slot connection.

116. In an apparatus for hinging together a body member and a cover member, a carrier for said cover member and a holder for said member mounted in said carrier and comprising a body portion, a head pivoted to said body portion, a slidable plate on said head provided with means for receiving and supporting said cover member, a reciprocating rod connected to said head by a pin and slot connection for rocking said head on its pivot and means for raising said body portion bodily whereby the head will be simultaneously raised therewith and rocked on the pin of the pin and slot connection.

117. In an apparatus for hinging together a body member and a cover member, a carrier for said cover member and a holder for said member mounted in said carrier and comprising a body portion, a head pivoted to said body portion provided with means for receiving and supporting said cover member, means for driving said carrier, means connected to said head for rocking said head on its pivot simultaneously with the movement of said carrier and for locking said head against further rocking on its pivot when said carrier has reached a predetermined point and means for raising said body portion bodily whereby said head will be simultaneously raised with it and will be rocked on the connection between said rocking means and said head.

118. In an apparatus for hinging together a body member and a cover member, a carrier for said cover member and a holder for said member mounted in said carrier and comprising a body portion, a head pivoted to said body portion provided with means for receiving and supporting said cover member, means for driving said carrier, means connected to said head for rocking said head on its pivot simultaneously with the movement of said carrier, means for momentarily locking the body portion against movement when the head is so rocked and means for raising said body portion bodily whereby said head will be simultaneously raised with it and will be rocked on the connection between said rocking means and said head.

119. In an apparatus for hinging together a body member and a cover member, a carrier for said cover member and a holder for said member mounted in said carrier and comprising a body portion, a head pivoted to said body portion, a slidable plate mounted on said head provided with means for receiving and supporting said cover member, means for sliding said plate on said head, means for driving said carrier, means connected to said head for rocking said head on its pivot simultaneously with the movement of said carrier and means for raising said body portion bodily whereby said head will be simultaneously raised with it and will be rocked on the connection between said rocking means and said head.

120. In an apparatus for hinging together a body member and a cover member, a carrier for said cover member, a holder for said cover member carried by said carrier and comprising a body portion, a head pivoted to said body portion, a slidable plate mounted on said head and adapted to receive and support said cover member, a reciprocating rod connected to said head and means for reciprocating said rod.

121. In an apparatus for hinging together a body member and a cover member, a frame provided with a slot, a carrier for said cover member mounted on said frame, a holder for said member mounted in said carrier and comprising a body portion, a head pivoted to said body portion, a slidable plate mounted on said head and provided with means for receiving and supporting said cover member, a reciprocating rod connected to said head and a rod connected to said reciprocating rod and having one end thereof pivoted to said carrier and the other end adapted to engage the slot in said frame.

122. In an apparatus for hinging together a body member and a cover member, a frame provided with a slot, a carrier mounted on said frame, a holder for said cover member mounted in said carrier and comprising a body portion, a head pivoted to said body portion, a slidable plate mounted on said head and provided with means for receiving and supporting said cover member, a reciprocating rod connected to said head, a rod pivoted to said reciprocating rod and hav- 123. In an apparatus for hinging together a body member and a cover member, a frame provided with a slot, a carrier mounted on said frame, a holder for said cover member mounted in said carrier and comprising a body portion, a slidable plate mounted on said head and provided with means for receiving and supporting said cover member, a reciprocating rod connected to said head, a rod connected to said reciprocating rod and having one end thereof pivoted to said carrier and the other end adapted to engage the slot in said frame, locking means fastened to said frame for locking said body portion against movement when said head is rocked on its pivot and means for bodily raising said body portion.

124. In an apparatus for hinging together a body member and a cover member, a frame provided with a slot, a carrier mounted on said frame, a holder for said cover member mounted in said carrier and comprising a body portion, a slidable plate mounted on said head and provided with means for receiving and supporting said cover member, a reciprocating rod connected to said head, a rod connected to said reciprocating rod and having one end thereof connected to said carrier and the other end adapted to engage the slot in said frame, locking means fastened to said frame for locking said body portion against movement when said head is rocked on its pivot, means for bodily raising said body portion and means for actuating said slidable plate.

125. In an apparatus for hinging together a body member and a cover member, a frame provided with a slot, a carrier mounted on said frame, a holder for said cover member mounted in said carrier and comprising a body portion, a slidable plate mounted on said head and provided with means for receiving and supporting said cover member, a roller on said slidable plate, a reciprocating rod connected to said head, a rod connected to said reciprocating rod and having one end thereof pivoted to said carrier and the other end adapted to engage the slot in said frame, locking means fastened to said frame for locking said body portion against vertical movement when said head is rocked on its pivot, a lifting rod pivoted to the frame, means for actuating said rod to cause it to raise said body portion bodily, an actuating lever pivoted to said frame and provided with a groove therein adapted to receive the roller on said slidable plate and means for rocking said actuating lever on its pivot to reciprocate said slidable plate on said head.

126. In an apparatus for hinging together a body member and a cover member having a flange, a frame, means for forming pintle ears on said body member, means for inserting a pintle in said ears, a carrier mounted on said frame, a holder for said cover member carried by said carrier, a plate on said holder receiving and supporting said cover member, means for driving said carrier to bring said body member and cover member into juxtaposition, means for moving said holder to an angle inclined from the horizontal, means for raising and rocking said holder whereby the flange of the said cover member is connected to said pintle and means for closing said flange around said pintle.

127. In an apparatus for hinging together a body member and a cover member having a flange, a frame, means for forming pintle ears on said body member, means for inserting a pintle in said ears, a carrier mounted on said frame, a holder for said cover member carried by said carrier, a plate on said holder receiving and supporting said cover member, means for driving said carrier to bring said body member and cover member into juxtaposition, means for moving said holder to an angle inclined from the horizontal, means for reciprocating said plate on said holder, means for simultaneously raising and rocking said holder whereby the flange of the said cover member is connected to said pintle and means for closing said flange around said pintle.

128. In an apparatus for hinging together a body member and a cover member having a flange, a frame, means for forming pintle ears on said body member, means for inserting a pintle in said ears, a carrier mounted on said frame, a holder mounted in said carrier and receiving and supporting said cover member, means for raising and rocking said holder whereby the flange of the cover member is connected to said pintle and means for closing said flange around said pintle.

129. In an apparatus for hinging together a body member and a cover member having a flange, a frame, means for forming pintle ears on said body member, means for inserting a pintle in said ears, a carrier mounted on said frame, a holder mounted in said carrier and receiving and supporting said cover member, means for turning the flange of the cover member away from then towards said member, means for simultaneously raising and rocking said holder whereby the turned flange of the cover member is connected to the pintle and means for closing said flange around said pintle.

130. In an apparatus for hinging together a body member and a cover member having a flange, a frame, means for forming pintle ears on said body member, means for inserting a pintle in said pintle ears, a carrier mounted on said frame, a holder carried by said carrier and receiving and supporting said cover member, means for raising and rocking said holder whereby the flange of the cover member is connected to said pintle, a pintle-backer for moving said pintle forwardly in the pintle ears and thus holding said pintle while the flange of the cover member is thus being connected thereto and means for closing said flange around said pintle.

131. In an apparatus for hinging together a body member having pintle ears and a pintle mounted therein and a cover member having a flange, a frame, a pintle-backer mounted on said frame and adapted to be forced downwardly to engage said pintle and move the same forwardly in said pintle ears, means for connecting the flange of the cover to said pintle while it is thus moved forwardly and means for closing said flange around said pintle.

132. In an apparatus for hinging together a body member having pintle ears and a pintle monuted therein and extending in said body member and a cover member, a frame, means for moving said pintle forwardly in said pintle ears comprising a plunger mounted on said frame, a plunger rod carried by said plunger, a bell-crank lever pivoted to said plunger and connected to said plunger rod and a pintle-backer block connected to said bell-crank lever and having projecting arms adapted to engage said pintle.

133. In an apparatus for hinging together a body member having pintle ears and a pintle mounted therein and extending in said body member and a cover member, a frame, means for moving said pintle forwardly in said pintle ears comprising a plunger mounted on said frame, a plunger rod, a bell-crank lever pivoted to said plunger and connected to said plunger rod and a pintle-backer block connected to said bell-crank lever and having projecting arms adapted to engage the ends of said pintle within the body member.

134. In an apparatus for hinging together a body member having pintle ears and a pintle mounted therein and extending in said body member and a cover member, a frame, means for moving said pintle forwardly in said pintle ears comprising a plunger mounted on said frame, a plunger rod within said plunger, a bell-crank lever pivoted to said plunger and connected to said plunger rod, a pintle-backer block supported by said plunger and connected to said bell-crank lever and having projecting arms adapted to engage the ends of said pintle within the body member, spring means for carrying the plunger downwardly within the body member, spring means for carrying the plunger rod downwardly to actuate the bell-crank lever and an actuating lever pivotally mounted on said frame and adapted to raise the plunger and plunger rod into inoperative position against the action of both the aforesaid spring means.

135. In an apparatus for hinging together a body member having pintle ears and a pintle mounted therein and extending in said body member and a cover member, a frame, means for moving said pintle forwardly in said pintle ears comprising a plunger mounted on said frame, a plunger rod mounted within said plunger, a bell-crank lever pivoted to said plunger and connected to said plunger rod, a pintle-backer block supported by said plunger and connected to said bell-crank lever and having projecting arms adapted to engage the ends of said pintle within the body member, spring means for carrying the plunger downwardly within the body member, spring means for carrying the plunger rod downwardly to actuate the bell-crank lever, an actuating lever pivotally mounted on and connected to said plunger rod and adapted to raise the plunger and plunger rod into inoperative position against the action of both the aforesaid spring means and means for rocking said actuating lever on its pivot.

136. In an apparatus for hinging together a body member having pintle ears and a pintle mounted therein and a cover member having a flange, a frame, means for connecting the flange of the cover member to said pintle, an actuating lever pivotally mounted on said frame, means for rocking said lever on its pivot, a cover-presser carried by said actuating lever and adapted to engage and press the cover member downwardly to assist in the aforesaid connecting operation, means for supporting said cover member when it is thus pressed downwardly and means for closing said flange around said pintle.

137. In an apparatus for hinging together a body member having pintle ears and a pintle mounted therein and a cover member having a flange, a frame, means for connecting the flange of the cover member to said pintle, an actuating lever pivotally mounted on said frame, means for rocking said lever on its pivot, a spring-pressed cover-presser carried by said actuating lever and adapted to engage and press the cover member downwardly to assist in the aforesaid connecting operation, a lever pivoted to said frame and connected to said actuating lever and adapted to support said cover member when it is thus pressed downwardly and means for closing said flange around said pintle.

138. In an apparatus for hinging together a body member having pintle ears and a pintle mounted therein and a cover member having a flange, a frame, means for connecting the flange of the cover member to said pintle, an actuating lever pivotally mounted on said frame, a cover-presser carried by said actuating lever, means for rocking said actuating lever on its pivot whereby the cover-presser will engage and press the cover member downwardly to assist in the aforesaid connecting operation and means for closing said flange around said pintle.

139. In an apparatus for hinging together a body member having pintle ears and a pintle mounted therein and a cover member having a flange, a frame, means for connecting the flange of the cover member to said pintle, a spring-pressed cover-presser mounted on said frame, means for actuating said cover-presser whereby it will engage the cover member and press the same downwardly against the action of its spring to assist in the aforesaid connecting operation and means for closing said flange around said pintle.

140. In an apparatus for hinging together a body member having pintle ears and a pintle mounted therein and a cover member having a flange, a frame, means for connecting the flange of the cover member to said pintle, a spring-pressed cover-presser mounted on said frame, means for actuating said cover-presser whereby it will engage the cover member and press the same downwardly against the action of its spring to assist in the aforesaid connecting operation, means pivoted to said frame and adapted to support the cover member when it is thus pressed downwardly and means for closing said flange around said pintle.

141. In an apparatus for hinging together a body member having pintle ears and a pintle mounted therein and a cover member having a flange, a frame, means for connecting the flange of the cover member to said pintle, a cover-presser adapted to engage the cover member and press the same downwardly to assist in the connecting operation, an actuating lever pivotally mounted on said frame and carrying said cover-presser, means for rocking said actuating lever on its pivot, a supporting lever pivoted to said frame and connected to said actuating lever and adapted to support the cover member when it is thus pressed downwardly, spring-means for rocking said supporting lever on its pivot to bring the same into operative position when said actuating lever is rocked on its pivot, means for returning said supporting lever to inoperative position and means for closing said flange around said pintle.

142. In an apparatus for hinging together a body member having pintle ears and a pintle mounted therein and a cover member having a flange, a frame, means for connecting the flange of the cover member to said pintle, a pintle-backer mounted on said frame for engaging said pintle and moving the same forwardly during said connecting operation, an actuating lever pivotally mounted on said frame for holding said pintle-backer in inoperative position, a cover-presser carried by said actuating lever for pressing the cover downwardly to assist in the connecting operation, means connected to said actuating lever for supporting said cover member while it is thus pressed downwardly and means for closing said flange around said pintle.

143. In an apparatus for hinging together a body member having pintle ears and a pintle mounted therein and a cover member having a flange, a frame, means for turning said flange, means for connecting said turned flange to said pintle and means for closing said flange around said pintle comprising a plunger supported on said frame, a closing die carried by said plunger and adapted to engage said flange and an actuating lever connected to said plunger.

144. In an apparatus for hinging together a body member having pintle ears and a pintle mounted therein and a cover member having a flange, a frame, means for turning said flange, means for connecting said turned flange to said pintle, a reciprocating bar mounted on said frame and adapted to be brought downwardly within the body member, a bending tool connected with said reciprocating bar, means for actuating the bending tool whereby it will bend over the end of said turned flange and means for closing the end of said flange around the pintle.

145. In an apparatus for hinging together a body member having pintle ears and a pintle mounted therein and a cover member having a flange, a frame, means for turning said flange, means for connecting said turned flange to said pintle, a bending tool mounted on said frame adapted to engage and bend over the turned end of said flange, means for actuating said bending tool and means for closing the bent end of said flange around the pintle.

146. In an apparatus for hinging together a body member having pintle ears and a pintle mounted therein and a cover member having a flange, a frame, means for turning said flange, means for connecting said turned flange to said pintle, a reciprocating bar mounted on said frame and adapted to be brought downwardly within the body member, a reciprocating bending tool slidable against said bar and connected thereto and adapted to engage and bend over the end of said turned flange, spring means for carrying said bar downwardly, an actuating lever pivoted to said bending tool and adapted to actuate said bending tool and to raise said bar and means for closing the bent end of said flange around the pintle.

147. In an apparatus for hinging together a body member having pintle ears and a pintle mounted therein and a cover member having a flange, a frame, means for turning said flange, means for connecting said turned flange to said pintle, a reciprocating bar mounted on said frame provided with a slot therein, a reciprocating bending tool slidable against said bar and closing said slot, a pin carried by said bending tool and entering said slot, a spring in said slot engaging said pin, an actuating lever pivoted to the frame and to said bending tool, means for rocking said lever on its pivot whereby the bar is brought downwardly into the body member by its spring and the bending tool engages and bends over the end of the turned flange and means for closing said bent end around the pintle.

148. In an apparatus for hinging together a body member having pintle ears and a pintle mounted therein and a cover member having a flange, a frame, means for turning said flange, means for connecting said turned flange to said pintle, a shaft mounted on said frame, a pivoted actuating lever mounted on the frame, a bending tool connected to said actuating lever, a second pivoted actuating lever mounted on said frame, closing means connected to said second lever and means connecting said shaft and said actuating levers to rock them on their pivots whereby the bending tool will bend over the flange of the cover member and the closing means will close said bent flange around the pintle of the body member.

149. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a plunger rod connected to said plunger, a bell-crank lever pivoted to said plunger and said plunger rod and a closing die connected to said bell-crank lever.

150. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a plunger rod mounted in said plunger, a bell-crank lever pivoted to said plunger and said plunger rod and a closing die having a grooved face connected to said bell-crank lever and supported by said plunger.

151. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a pivoted actuating lever connecting with said plunger, a shaft, means connecting said shaft and said actuating lever to rock said lever on its pivot when said shaft is rotated, a plunger rod mounted in said plunger, a bell-crank lever pivoted to said plunger and said plunger rod and adapted to be actuated by said plunger rod and a closing die connected to said bell-crank lever.

152. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a plunger rod connected to said plunger and a closing die pivoted to said plunger and said plunger rod.

153. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a plunger rod mounted in said plunger, a closing die pivoted to said plunger and said plunger rod, spring means for drawing the plunger downwardly within the cover member, spring means for holding said plunger rod in raised position and an actuating lever mounted on said frame and adapted to hold the plunger in raised position and to actuate said plunger rod.

154. In an apparatus for hinging together a body member having pintle ears and a pintle mounted therein and a cover member having a flange, a frame, means for turning said flange, means for connecting said turned flange to said pintle and means for closing said flange around said pintle and comprising a plunger supported on said frame, a plunger rod mounted in said plunger, a closing die pivoted to said plunger and said plunger rod, spring means for drawing the plunger downwardly within the cover member, spring means within said plunger for holding said plunger rod in raised position and a pivoted actuating lever mounted on said frame and adapted to hold the plunger in raised position against the action of the first-named spring means and adapted to force the plunger downwardly against the action of the spring means within the plunger.

155. In an apparatus for hinging together a body member and a cover member, a frame and means for ejecting said members when hinged together comprising a rod mounted on said frame, an ejecting finger connected to said rod, means for rotating said rod in one direction and means for rotating said rod in the opposite direction.

156. In an apparatus for hinging together a body member and a cover member, a frame and means for ejecting said members when hinged together comprising a rod mounted on said frame, an ejecting finger pivoted to said rod, means for rotating said rod in one direction and spring means for rotating said rod in the other direction.

157. In an apparatus for hinging together a body member and a cover member, a frame and means for ejecting said members when hinged together comprising a rod mounted on said frame and an ejecting finger pivoted to said rod and adapted to be swung on its pivot by one of said members when said rod is rotated in one direction and to engage and eject one of said members when the rod is rotated in the opposite direction.

158. In an apparatus for hinging together a body member and a cover member, a frame and means for ejecting said members when hinged together comprising a rod mounted on said frame, an ejecting finger pivoted to said rod and capable of being swung in one direction only on its pivot, means for rotating said rod in one direction whereby said finger will be brought into engagement with said cover member and means for rotating said rod in the other direction whereby said finger will move said cover member for ejecting said members.

159. In an apparatus for hinging together a body member and a cover member, a frame and means for ejecting said members when hinged together comprising a rod mounted on said frame, an ejecting finger connected to said rod, a shaft mounted on said frame, means connecting said shaft and said rod for rotating said rod in one direction when said shaft is rotated and spring means for rotating said rod in the other direction.

160. In an apparatus for hinging together a body member and a cover member, a frame, a carrier mounted on said frame and supporting said body member with said cover member hinged thereto and means for ejecting said body member from said carrier comprising a rod mounted on said frame, an ejecting finger connected to said rod, means for rotating said rod in one direction and means for rotating said rod in the other direction.

161. In an apparatus for hinging together a body member and a cover member, a frame and means for ejecting said members when hinged together comprising a rod mounted on said frame, a shaft on said frame, a cam carried by said shaft, a roller on said rod engaging said cam and an ejecting finger pivoted to said rod.

162. In an apparatus for hinging together a body member and a cover member, a frame and means for ejecting said members when hinged together comprising a rod mounted on said frame, a shaft on said frame, a cam carried by said shaft and engaging said rod, spring means for rotating said rod and an ejecting finger pivoted to said rod and capable of being swung on its pivot in one direction only.

163. In an apparatus for hinging together a body member and a cover member, a frame and means for ejecting said members when hinged together comprising a rod mounted on said frame, an arm connected to said rod, an ejecting finger pivoted to said arm and capable of being swung on its pivot in one direction only, a spring fastened to said arm and engaging said finger, means for positively rotating said rod in one direction and a spring connected to said rod for rotating the same in the opposite direction.

Signed at Brooklyn in the county of Kings and State of New York this 31st day of August A. D. 1920.

MARCELLE KUGEL.